United States Patent
Pratt, Jr. et al.

(10) Patent No.: US 8,406,248 B2
(45) Date of Patent: Mar. 26, 2013

(54) PRIORITY-BASED SCHEDULING AND ROUTING IN A WIRELESS NETWORK

(75) Inventors: Wallace A. Pratt, Jr., Pflugerville, TX (US); Mark J. Nixon, Round Rock, TX (US); Eric D. Rotvold, West St. Paul, MN (US); Robin S. Pramanik, Karlsruhe (DE); Tomas P. Lennvall, Vasteras (SE); Terrence L. Blevins, Round Rock, TX (US)

(73) Assignee: Hart Communication Foundation, Austin, TX (US)

( * ) Notice: Subject to any disclaimer, the term of this patent is extended or adjusted under 35 U.S.C. 154(b) by 1072 days.

(21) Appl. No.: 12/101,054

(22) Filed: Apr. 10, 2008

(65) Prior Publication Data

US 2009/0010205 A1 Jan. 8, 2009

Related U.S. Application Data

(60) Provisional application No. 60/911,795, filed on Apr. 13, 2007.

(51) Int. Cl.
*H04B 7/212* (2006.01)
(52) U.S. Cl. .......................... 370/444; 370/322
(58) Field of Classification Search .................. 370/328, 370/344
See application file for complete search history.

(56) References Cited

U.S. PATENT DOCUMENTS

| | | | |
|---|---|---|---|
| 4,792,944 A | 12/1988 | Takahashi et al. | |
| 5,159,592 A | 10/1992 | Perkins | |
| 5,719,859 A | 2/1998 | Kobayashi et al. | |
| 5,926,531 A | 7/1999 | Petite | |
| 6,028,522 A | 2/2000 | Petite | |
| 6,198,751 B1 | 3/2001 | Dorsey et al. | |
| 6,218,953 B1 | 4/2001 | Petite | |
| 6,233,327 B1 | 5/2001 | Petite | |
| 6,236,334 B1 | 5/2001 | Tapperson et al. | |

(Continued)

FOREIGN PATENT DOCUMENTS

| CA | 2324563 A1 | 9/1999 |
|---|---|---|
| CN | 1170464 A | 1/1998 |

(Continued)

OTHER PUBLICATIONS

International Search Report and Written Opinion for corresponding International Application No. PCT/US2008/004749 (Jun. 23, 2009).

(Continued)

*Primary Examiner* — Mark Rinehart
*Assistant Examiner* — Matthew Hopkins
(74) *Attorney, Agent, or Firm* — Marshall, Gerstein & Borun LLP

(57) ABSTRACT

A method of routing data in a mesh communication network including a plurality of network devices and operating in a process control environment, including assigning one of a plurality of priority levels associated with the communication network to a data packet, sending the data packet from a source network device included in the plurality of network devices to a destination network device included in the plurality of network devices, and routing the data packet to a destination network device via at least one intermediate network device included in the plurality of network devices. The act of routing includes comparing, at each intermediate network device, the priority level of the data packet to a priority mask of the intermediate network device, and modifying at least one of scheduling or routing of the data packet if the priority level of the data packet is not associated with the priority mask of the intermediate network device.

21 Claims, 25 Drawing Sheets

U.S. PATENT DOCUMENTS

| | | |
|---|---|---|
| 6,298,377 B1 | 10/2001 | Hartikainen et al. |
| 6,430,268 B1 | 8/2002 | Petite |
| 6,437,692 B1 | 8/2002 | Petite et al. |
| 6,522,974 B2 | 2/2003 | Sitton |
| 6,578,047 B1 | 6/2003 | Deguchi |
| 6,594,530 B1 | 7/2003 | Glanzer et al. |
| 6,618,578 B1 | 9/2003 | Petite |
| 6,628,764 B1 | 9/2003 | Petite |
| 6,747,557 B1 | 6/2004 | Petite et al. |
| 6,801,777 B2 | 10/2004 | Rusch |
| 6,836,737 B2 | 12/2004 | Petite et al. |
| 6,891,838 B1 | 5/2005 | Petite et al. |
| 6,914,533 B2 | 7/2005 | Petite |
| 6,914,893 B2 | 7/2005 | Petite |
| 6,920,171 B2 * | 7/2005 | Souissi et al. ............. 375/133 |
| 6,959,356 B2 | 10/2005 | Packwood et al. |
| 6,970,909 B2 | 11/2005 | Schulzrinne |
| 6,996,100 B1 | 2/2006 | Haartsen |
| 7,002,958 B1 | 2/2006 | Basturk et al. |
| 7,053,767 B2 | 5/2006 | Petite et al. |
| 7,079,810 B2 | 7/2006 | Petite et al. |
| 7,103,511 B2 | 9/2006 | Petite |
| 7,110,380 B2 | 9/2006 | Shvodian |
| 7,137,550 B1 | 11/2006 | Petite |
| 7,209,840 B2 | 4/2007 | Petite et al. |
| 7,263,073 B2 | 8/2007 | Petite et al. |
| 7,292,246 B2 | 11/2007 | Goldschmidt |
| 7,295,128 B2 | 11/2007 | Petite |
| 7,346,463 B2 | 3/2008 | Petite et al. |
| 7,375,594 B1 | 5/2008 | Lemkin et al. |
| 7,397,907 B2 | 7/2008 | Petite |
| 7,420,980 B1 * | 9/2008 | Pister et al. ............. 370/401 |
| 7,468,661 B2 | 12/2008 | Petite et al. |
| 7,529,217 B2 | 5/2009 | Pister et al. |
| 7,602,741 B2 | 10/2009 | Tapperson et al. |
| 7,650,425 B2 | 1/2010 | Davis et al. |
| 7,675,935 B2 | 3/2010 | Samudrala et al. |
| 7,680,033 B1 | 3/2010 | Khan et al. |
| 7,697,492 B2 | 4/2010 | Petite |
| 7,848,827 B2 | 12/2010 | Chen |
| 7,853,221 B2 | 12/2010 | Rodriguez et al. |
| 7,978,059 B2 | 7/2011 | Petite et al. |
| 8,013,732 B2 | 9/2011 | Petite et al. |
| 8,064,412 B2 | 11/2011 | Petite |
| 2001/0030957 A1 | 10/2001 | McCann et al. |
| 2001/0041591 A1 | 11/2001 | Carroll |
| 2002/0007414 A1 | 1/2002 | Inoue et al. |
| 2002/0013679 A1 | 1/2002 | Petite |
| 2002/0031101 A1 | 3/2002 | Petite et al. |
| 2002/0067693 A1 | 6/2002 | Kodialam et al. |
| 2002/0111169 A1 | 8/2002 | Vanghi |
| 2002/0120671 A1 | 8/2002 | Daffner et al. |
| 2003/0014535 A1 | 1/2003 | Mora |
| 2003/0026268 A1 * | 2/2003 | Navas ............. 370/400 |
| 2003/0040897 A1 | 2/2003 | Murphy et al. |
| 2003/0074489 A1 | 4/2003 | Steger et al. |
| 2003/0169722 A1 | 9/2003 | Petrus et al. |
| 2003/0198220 A1 | 10/2003 | Gross et al. |
| 2003/0236579 A1 | 12/2003 | Hauhia et al. |
| 2004/0028023 A1 | 2/2004 | Mandhyan et al. |
| 2004/0053600 A1 | 3/2004 | Chow et al. |
| 2004/0095951 A1 | 5/2004 | Park |
| 2004/0117497 A1 | 6/2004 | Park |
| 2004/0148135 A1 | 7/2004 | Balakrishnan et al. |
| 2004/0174904 A1 | 9/2004 | Kim et al. |
| 2004/0183687 A1 | 9/2004 | Petite et al. |
| 2004/0203973 A1 | 10/2004 | Khan |
| 2004/0257995 A1 * | 12/2004 | Sandy et al. ............. 370/235 |
| 2004/0259533 A1 * | 12/2004 | Nixon et al. ............. 455/414.1 |
| 2005/0013253 A1 | 1/2005 | Lindskog et al. |
| 2005/0018643 A1 | 1/2005 | Neilson et al. |
| 2005/0025129 A1 | 2/2005 | Meier |
| 2005/0030968 A1 | 2/2005 | Rich et al. |
| 2005/0049727 A1 | 3/2005 | Tapperson et al. |
| 2005/0078672 A1 | 4/2005 | Caliskan et al. |
| 2005/0085928 A1 | 4/2005 | Shani |
| 2005/0114517 A1 | 5/2005 | Maffeis |
| 2005/0125085 A1 | 6/2005 | Prasad et al. |
| 2005/0160138 A1 | 7/2005 | Ishidoshiro |
| 2005/0164684 A1 | 7/2005 | Chen et al. |
| 2005/0190712 A1 | 9/2005 | Lee et al. |
| 2005/0192037 A1 | 9/2005 | Nanda et al. |
| 2005/0213612 A1 | 9/2005 | Pister et al. |
| 2005/0228509 A1 | 10/2005 | James |
| 2005/0239413 A1 | 10/2005 | Wiberg et al. |
| 2005/0249137 A1 | 11/2005 | Todd et al. |
| 2005/0276233 A1 | 12/2005 | Shepard et al. |
| 2005/0282494 A1 | 12/2005 | Kossi et al. |
| 2006/0007927 A1 | 1/2006 | Lee et al. |
| 2006/0029060 A1 | 2/2006 | Pister |
| 2006/0029061 A1 | 2/2006 | Pister et al. |
| 2006/0045016 A1 | 3/2006 | Dawdy et al. |
| 2006/0062192 A1 | 3/2006 | Payne |
| 2006/0067280 A1 | 3/2006 | Howard et al. |
| 2006/0077917 A1 | 4/2006 | Brahmajosyula et al. |
| 2006/0120384 A1 | 6/2006 | Boutboul et al. |
| 2006/0174017 A1 | 8/2006 | Robertson |
| 2006/0182076 A1 | 8/2006 | Wang |
| 2006/0213612 A1 | 9/2006 | Perron et al. |
| 2006/0215582 A1 | 9/2006 | Castagnoli et al. |
| 2006/0245440 A1 | 11/2006 | Mizukoshi |
| 2006/0253584 A1 | 11/2006 | Dixon et al. |
| 2007/0016724 A1 | 1/2007 | Gaither et al. |
| 2007/0070943 A1 | 3/2007 | Livet et al. |
| 2007/0074489 A1 | 4/2007 | Erhardt et al. |
| 2007/0076600 A1 * | 4/2007 | Ekl et al. ............. 370/229 |
| 2007/0078995 A1 | 4/2007 | Benard et al. |
| 2007/0109592 A1 | 5/2007 | Parvathaneni et al. |
| 2007/0118604 A1 | 5/2007 | Costa Requena |
| 2007/0121531 A1 | 5/2007 | Lee et al. |
| 2007/0140245 A1 | 6/2007 | Anjum et al. |
| 2007/0143392 A1 | 6/2007 | Choe et al. |
| 2007/0161371 A1 | 7/2007 | Dobrowski et al. |
| 2007/0237094 A1 | 10/2007 | Bi et al. |
| 2007/0243879 A1 | 10/2007 | Park et al. |
| 2007/0280144 A1 | 12/2007 | Hodson et al. |
| 2007/0280286 A1 | 12/2007 | Hodson et al. |
| 2007/0282463 A1 | 12/2007 | Hodson et al. |
| 2007/0283030 A1 | 12/2007 | Deininger et al. |
| 2008/0075007 A1 | 3/2008 | Mehta et al. |
| 2008/0082636 A1 | 4/2008 | Hofmann et al. |
| 2008/0084852 A1 | 4/2008 | Karschnia |
| 2008/0098226 A1 | 4/2008 | Zokumasui |
| 2008/0117836 A1 | 5/2008 | Savoor et al. |
| 2008/0120676 A1 | 5/2008 | Morad et al. |
| 2008/0148296 A1 | 6/2008 | Chen et al. |
| 2008/0192812 A1 | 8/2008 | Naeve et al. |
| 2008/0198860 A1 | 8/2008 | Jain et al. |
| 2008/0215773 A1 | 9/2008 | Christison et al. |
| 2008/0285582 A1 | 11/2008 | Pister |
| 2009/0059855 A1 | 3/2009 | Nanda et al. |
| 2009/0068947 A1 | 3/2009 | Petite |
| 2009/0097502 A1 | 4/2009 | Yamamoto |
| 2009/0154481 A1 | 6/2009 | Han et al. |
| 2010/0194582 A1 | 8/2010 | Petite |
| 2010/0312881 A1 | 12/2010 | Davis et al. |
| 2011/0264324 A1 | 10/2011 | Petite et al. |
| 2011/0309953 A1 | 12/2011 | Petite et al. |
| 2011/0320050 A1 | 12/2011 | Petite et al. |

FOREIGN PATENT DOCUMENTS

| | | |
|---|---|---|
| CN | 1804744 A | 7/2006 |
| EP | 1169690 A2 | 1/2002 |
| EP | 1236075 A2 | 9/2002 |
| EP | 1370958 A1 | 12/2003 |
| EP | 1376939 A2 | 1/2004 |
| EP | 2388708 A1 | 11/2011 |
| GB | 2 403 043 A | 12/2004 |
| JP | 2005143001 | 6/2005 |
| KR | 1020010076781 | 8/2001 |
| KR | 1020040048245 | 6/2004 |
| KR | 1020050028737 | 3/2005 |
| KR | 1020060066580 | 6/2006 |
| KR | 1020050026891 | 9/2006 |
| KR | 1020060111318 | 10/2006 |
| KR | 1020070026600 | 3/2007 |
| WO | WO-00/55825 A1 | 9/2000 |

| WO | WO-01/35190 A2 | 5/2001 |
| WO | WO-02/05199 A1 | 1/2002 |
| WO | WO-02/13036 A1 | 2/2002 |
| WO | WO-02/13412 A1 | 2/2002 |
| WO | WO-02/13413 A1 | 2/2002 |
| WO | WO-02/13414 A1 | 2/2002 |
| WO | WO-02/075565 A1 | 9/2002 |
| WO | WO-2005079026 A1 | 8/2005 |
| WO | WO-2005/096722 A2 | 10/2005 |
| WO | WO-2006121114 A1 | 11/2006 |

OTHER PUBLICATIONS

European Search Report for 08826273.8 mailed Jun. 29, 2010.
Wong, "A Fuzzy-Decision-Based Routing Protocol for Mobile Ad Hoc Networks," Networks, 2002. ICON 2002. 10th IEEE International Conference on Aug. 27-30, 2002, Piscataway, NJ, USA, IEEE, Aug. 27, 2002, pp. 317-322.
Alandjani et al., "Fuzzy Routing in Ad Hoc Networks," Conference Proceedings fo the 2003 IEEE International Performance, Computing, and Communications Conference. Phoenix, AZ, Apr. 9-11, 2003, IEEE, vol. Conf. 22, Apr. 9, 2003, pp. 525-530.
Thomas et al., "Anthoc—QoS: Quality of 1-7 Service Routing in Mobile Ad Hoc Networks Using Swarm Intelligence" Mobile Technology, Applications and Systems, 2005 2nd International Conference on Guangzhou, China Nov. 15-17, 2005, Piscathaway, NJ, USA, IEEE, Piscathaway, NJ, USA Nov. 15, 2005, pp. 1-8.
International Preliminary Report on Patentability from corresponding International Application No. PCT/US08/04749 (Oct. 13, 2009).
Office Action for CN 200880018355.6 mailed Aug. 25, 2011.
Kastner et al., "Communication Systems for Building Automation and Control," Proceedings of the IEEE, vol. 93, No. 6, Jun. 1, 2005, pp. 1178-1203.
Thomesse, J., "Fieldbus Technology in Industrial Automation," Proceedings of the IEEE, vol. 93, No. 6, Jun. 1, 2005, pp. 1073-1101.
Cleveland, F., "IEC TC57 Security Standards for the Power System's Information Infrastructure—Beyond Simple Encryption," May 21, 2006, pp. 1079-1087.
Matkurbanov et al., "A Survey and Analysis of Wireless Fieldbus for Industrial Environments," SICE-ICCAS 2006 International Joint Conference, 5555-5561 (2006).
Lopez et al., "Wireless communications deployment in industry: a review of issues, options and technologies," Computers in Industry, Elsevier Science, 56:29-53 (2005).
Shen et al., "Wireless Sensor Networks for Industrial Applications," WCICA, 15-19 (2004).
"A Survey and Analysis of Wireless Field bus for Industrial Environments", Pulat Matkurbanov, SeungKi Lee, Dong-Sung Kim; Dept. of Electron. Eng., Kumoh Nat. Inst. of Technol., Gumi. This paper appears in: SICE-ICASE, 2006. International Joint Conference: Issue Date: Oct. 18-21, 2006, on pp. 55555-55561; Print ISBN: 89-950038-4-7.
"D1100 SmartMesh Network Release 1.0 Engineering Software Specifications," Dust Networks, Dec. 17, 2011, 36 pages.
"D1100 SmartMesh Network Release 1.0 Engineering Software Specifications," Dust Networks, 36 pages.
"Multiple Interpenetrating MultiDiGraphs," Dust Incorporated, 12 pages. (Powerpoint).
Office Action for EP 08 826 273.8 dated Dec. 27, 2011.
Deering et al., "Internet Protocol, Version 6 (IPv6) Specification; rfc1883.txt", IETF Standard, Internet Engineering Task Force, IETF, CH, Dec. 1, 1995, XP015007667.
"SmartMesh-XT CLI Commands Guide," Dust Networks, Inc., Jun. 27, 2007, 36 pages.
SmartMesh-XT KT1030/KT2135/KT2030 Evaluation Kit Guide, Dust Networks, Inc., Nov. 2, 2007, 58 pages.
"SmartMesh-XT M2135-2, M2030-2 2.4 GHz Wireless Analog/Digital/Serial Motes," Dust Networks, Inc., Mar. 28, 2007, 33 pages.
SmartMesh-XT Manager XML API Guide, Dust Networks, Inc., Apr. 4, 2007, 148 pages.
"System Description for Security Review SmartMesh Alba," Dust Networks, 36 pages.
Berlemann, Software Defined Protocols Based on Generic Protocol Functions for Wired and Wireless Networks, Nov. 2033, RWTH Aachen University.
Qu et al., "A web-enabled distributed control application platform for industrial automation", Emerging Technologies and Factory Automation, Proceedings, 2:129-32 (Sep. 16, 2003).
Willig (ed.), "An architecture for wireless extension of PROFIBUS", IECON 2003—Proceedings of the 29th Annual Conference of the IEEE Industrial Electronics Society, New York, vol. 3, pp. 2369-2375 (Nov. 2-6, 2003).
Zheng, "ZigBee wireless sensor network in industrial applications", SICE-ICCAS 2006 International Joint Conference, IEEE, New Jersey, pp. 1067-1070 (Oct. 1, 2006).

* cited by examiner

450 — 1 SECOND UPDATE

| OFFSET | TS0 | TS1 | TS2 | TS3 | TS4 | TS5 | TS6 | TS7 | TS8 | ... | TS99 |
|---|---|---|---|---|---|---|---|---|---|---|---|
| 0 | B->A | B->A |  |  |  |  |  |  |  |  |  |
| 1 |  |  | C->A | C->A |  |  |  |  |  |  |  |
| 2 |  |  |  |  |  |  |  |  |  |  |  |
| 3 |  |  |  |  |  |  |  |  |  |  |  |

470 — 4 SECOND UPDATE

| OFFSET | TS0 | TS1 | TS2 | TS3 | TS4 | TS5 | TS6 | TS7 | TS8 | ... | TS399 |
|---|---|---|---|---|---|---|---|---|---|---|---|
| 0 |  |  | D->B | D->B | D->C |  |  |  |  |  |  |
| 1 |  |  |  |  | B->A | B->A | C->A | C->A |  |  |  |
| 2 |  |  |  |  |  |  |  |  |  |  |  |
| 3 |  |  |  |  |  |  |  |  |  |  |  |

FIG. 15

ADVERTISEMENTS

| OFFSET | TS0 | TS1 | TS2 | TS3 | TS4 | TS5 | TS6 | TS7 | TS8 | ... | TS399 |
|---|---|---|---|---|---|---|---|---|---|---|---|
| 0 | | | | | | | | | | | |
| 1 | | | | | | | *->B | | *->A | | |
| 2 | *->C | | | | | | | | | | |
| 3 | *->D | | | | | | | | | | |

JOIN REQUESTS

| OFFSET | ... | TS7 | TS8 | TS9 | TS10 | TS11 | TS12 | TS13 | TS14 | ... | TS399 |
|---|---|---|---|---|---|---|---|---|---|---|---|
| 0 | | | | | | | | | | | |
| 1 | | | | B->A | C->A | B->A | | | | | |
| 2 | | | | | | | | | | | |
| 3 | | D->B | | | | | | | | | |

JOIN RESPONSES

| OFFSET | ... | TS11 | TS12 | TS13 | TS14 | TS15 | TS16 | TS17 | TS18 | ... | TS399 |
|---|---|---|---|---|---|---|---|---|---|---|---|
| 0 | | | | | | | | | | | |
| 1 | | | A->B | A->C | A->B | B->D | B->D | | | | |
| 2 | | | | | | | | | | | |
| 3 | | | | | | | | | | | |

| FRAME ID | TIME SLOT | OFFSET | DEVICE | LINK OPTIONS | LINK TYPE |
|---|---|---|---|---|---|
| 1 | 0 | 0 | B | RECEIVE | NORMAL |
| 1 | 1 | 0 | B | RECEIVE | NORMAL |
| 1 | 2 | 1 | C | RECEIVE | NORMAL |
| 1 | 3 | 1 | C | RECEIVE | NORMAL |
| 4 | 4 | 1 | B | RECEIVE | NORMAL |
| 4 | 5 | 1 | B | RECEIVE | NORMAL |
| 4 | 6 | 1 | C | RECEIVE | NORMAL |
| 4 | 7 | 1 | C | RECEIVE | NORMAL |
| 0 | 8 | 0 | * | RECEIVE | ADVERTIZE |
| 0 | 9 | 1 | B | RECEIVE | NORMAL |
| 0 | 10 | 2 | C | RECEIVE | NORMAL |
| 0 | 11 | 1 | B | RECEIVE | NORMAL |
| 0 | 12 | 0 | B | TRANSMIT | NORMAL |
| 0 | 13 | 0 | C | TRANSMIT | NORMAL |
| 0 | 14 | 0 | B | TRANSMIT | NORMAL |
| 0 | 15 | 0 | B | RECEIVE | NORMAL |
| 0 | 16 | 2 | C | RECEIVE | NORMAL |
| 0 | 17 | 1 | B | RECEIVE | NORMAL |
| 0 | 18 | 1 | B | RECEIVE | NORMAL |
| 0 | 19 | 0 | B | TRANSMIT | NORMAL |
| 0 | 20 | 0 | B | TRANSMIT | NORMAL |
| 0 | 21 | 1 | C | TRANSMIT | NORMAL |

*FIG. 17*

| FRAME ID | TIME SLOT | OFFSET | DEVICE | LINK OPTIONS | LINK TYPE |
|---|---|---|---|---|---|
| 1 | 0 | 0 | A | TRANSMIT | NORMAL |
| 1 | 1 | 0 | A | TRANSMIT | NORMAL |
| 1 | 2 | 0 | D | RECEIVE | NORMAL |
| 1 | 3 | 0 | D | RECEIVE | NORMAL |
| 4 | 4 | 1 | A | TRANSMIT | NORMAL |
| 4 | 5 | 1 | A | TRANSMIT | NORMAL |
| 0 | 6 | 1 | * | RECEIVE | ADVERTIZE |
| 0 | 7 | 3 | D | RECEIVE | NORMAL |
| N/A | 8 | N/A | N/A | UNASSIGNED | NORMAL |
| 0 | 9 | 1 | A | TRANSMIT | NORMAL |
| N/A | 10 | N/A | N/A | UNASSIGNED | NORMAL |
| 0 | 11 | 1 | A | TRANSMIT | NORMAL |
| 0 | 12 | 0 | A | RECEIVE | NORMAL |
| N/A | 13 | N/A | N/A | UNASSIGNED | NORMAL |
| 0 | 14 | 0 | A | RECEIVE | NORMAL |
| 0 | 15 | 1 | D | TRANSMIT | NORMAL |
| 0 | 16 | 3 | D | RECEIVE | NORMAL |
| 0 | 17 | 1 | A | TRANSMIT | NORMAL |
| 0 | 18 | 1 | A | TRANSMIT | NORMAL |
| 0 | 19 | 0 | A | RECEIVE | NORMAL |
| 0 | 20 | 0 | A | RECEIVE | NORMAL |
| 0 | 21 | 1 | D | TRANSMIT | NORMAL |

*FIG. 18*

| FRAME ID | TIME SLOT | OFFSET | DEVICE | LINK OPTIONS | LINK TYPE |
|---|---|---|---|---|---|
| 0 | 0 | 2 | * | RECEIVE | ADVERTIZE |
| N/A | 1 | N/A | N/A | UNASSIGNED | NORMAL |
| 1 | 2 | 1 | A | TRANSMIT | NORMAL |
| 1 | 3 | 1 | A | TRANSMIT | NORMAL |
| 4 | 4 | 0 | D | RECEIVE | NORMAL |
| N/A | 5 | N/A | N/A | UNASSIGNED | NORMAL |
| 4 | 6 | 1 | A | TRANSMIT | NORMAL |
| 4 | 7 | 1 | A | TRANSMIT | NORMAL |
| N/A | 8 | N/A | N/A | UNASSIGNED | NORMAL |
| N/A | 9 | N/A | N/A | UNASSIGNED | NORMAL |
| 0 | 10 | 2 | A | TRANSMIT | NORMAL |
| N/A | 11 | N/A | N/A | UNASSIGNED | NORMAL |
| N/A | 12 | N/A | N/A | UNASSIGNED | NORMAL |
| 0 | 13 | 0 | A | RECEIVE | NORMAL |
| N/A | 14 | N/A | N/A | UNASSIGNED | NORMAL |
| N/A | 15 | N/A | N/A | UNASSIGNED | NORMAL |
| 0 | 16 | 2 | A | TRANSMIT | NORMAL |
| N/A | 17 | N/A | N/A | UNASSIGNED | NORMAL |
| N/A | 18 | N/A | N/A | UNASSIGNED | NORMAL |
| N/A | 19 | N/A | N/A | UNASSIGNED | NORMAL |
| N/A | 20 | N/A | N/A | UNASSIGNED | NORMAL |
| 0 | 21 | 0 | A | RECEIVE | NORMAL |

| FRAME ID | TIME SLOT | OFFSET | DEVICE | LINK OPTIONS | LINK TYPE |
|---|---|---|---|---|---|
| 0 | 0 | 3 | * | RECEIVE | ADVERTIZE |
| N/A | 1 | N/A | N/A | UNASSIGNED | NORMAL |
| 4 | 2 | 0 | B | TRANSMIT | NORMAL |
| 4 | 3 | 0 | B | TRANSMIT | NORMAL |
| 4 | 4 | 0 | C | TRANSMIT | NORMAL |
| N/A | 5 | N/A | N/A | UNASSIGNED | NORMAL |
| N/A | 6 | N/A | N/A | UNASSIGNED | NORMAL |
| 0 | 7 | 3 | B | TRANSMIT | NORMAL |
| N/A | 8 | N/A | N/A | UNASSIGNED | NORMAL |
| N/A | 9 | N/A | N/A | UNASSIGNED | NORMAL |
| N/A | 10 | N/A | N/A | UNASSIGNED | NORMAL |
| N/A | 11 | N/A | N/A | UNASSIGNED | NORMAL |
| N/A | 12 | N/A | N/A | UNASSIGNED | NORMAL |
| N/A | 13 | N/A | N/A | UNASSIGNED | NORMAL |
| N/A | 14 | N/A | N/A | UNASSIGNED | NORMAL |
| 0 | 15 | 1 | B | RECEIVE | NORMAL |
| 0 | 16 | 3 | B | TRANSMIT | NORMAL |
| N/A | 17 | N/A | N/A | UNASSIGNED | NORMAL |
| N/A | 18 | N/A | N/A | UNASSIGNED | NORMAL |
| N/A | 19 | N/A | N/A | UNASSIGNED | NORMAL |
| N/A | 20 | N/A | N/A | UNASSIGNED | NORMAL |
| 0 | 21 | 1 | B | RECEIVE | NORMAL |

*FIG. 20*

PRIORITY-BASED SCHEDULING AND ROUTING IN A WIRELESS NETWORK

CROSS-REFERENCE TO RELATED APPLICATIONS

This application is based on and claims the benefit of priority to U.S. Provisional Application No. 60/911,795, entitled "Routing, Scheduling, Reliable and Secure Operations in a Wireless Communication Protocol" filed Apr. 13, 2007, the entire disclosure of which is hereby expressly incorporated herein by reference.

FIELD OF TECHNOLOGY

The present patent relates generally to wireless communications and, more particularly, to scheduling communications in a wireless network in view of data priority.

BACKGROUND

Communication protocols rely on various routing techniques to transfer data between communication endpoints on a communication network. Communication or network protocols and the corresponding routing strategies are typically selected in view of such factors as knowledge of network topology, size of the network, type of medium used as a signal carrier, security and reliability requirements, tolerable transmission delays, and types of devices forming the network. Due to a large number of such factors, a typical routing technique meets some of the design objectives at the expense of the others. For example, a certain routing technique may provide a high level of reliability in data delivery but may also require a relatively high overhead. Thus, while there are many known approaches to routing and many protocols compatible with these routing methods, there remain communication networks with the specific requirements that are not fully satisfied by any of the available routing methods and protocols. Moreover, as new types of communication networks, with the increasing demands for efficiency, throughput, and reliability, emerge in various industrial and commercial applications, the architects and developers frequently encounter new problems which are not easily addressed by the existing protocols and the associated routing techniques.

Generally speaking, a communication network includes nodes which are the senders and recipients of data sent over communication paths (either hardwired or wireless communication paths) connecting the nodes. Additionally, communication networks typically include dedicated routers responsible for directing traffic between nodes, and, optionally, include dedicated devices responsible for configuring and managing the network. Some or all of the nodes may be also adapted to function as routers so as to direct traffic sent between other network devices. Network devices may be inter-connected in a wired or wireless manner, and network devices may have different routing and transfer capabilities than certain nodes within the network. For example, dedicated routers may be capable of high volume transmissions while some nodes may only be capable of sending and receiving relatively little traffic over the same period of time. Additionally, the connections between nodes on a network may have different throughput capabilities and different attenuation characteristics. A fiber-optic cable, for example, may be capable of providing a bandwidth several orders of magnitude higher than a wireless link because of the difference in the inherent physical limitations of the medium.

In order for a node to send data to another node on a typical network, either the complete path from the source to the destination or the immediately relevant part of the path must be known. For example, the World Wide Web (WWW) allows pairs of computer hosts to communicate over large distances without either host knowing the complete path prior to sending the information. Instead, hosts are configured with the information about their assigned gateways and dedicated routers. In particular, the Internet Protocol (IP) provides network layer connectivity to the WWW. The IP defines a sub-protocol known as Address Resolution Protocol (ARP) which provides a local table at each host specifying the routing rules. Thus, a typical host connected to the WWW or a similar Wide Area Network (WAN) may know to route all packets with the predefined addresses matching a pre-configured pattern to host A and route the rest of the packets to host B. Similarly, the intermediate hosts forwarding the packets, or "hops," also execute partial routing decisions and typically direct data in the general direction of the destination.

In most network protocols, most or all network devices are assigned sufficiently unique addresses to enable hosts to exchange information in an unambiguous manner. At least in case of unicast (one-to-one) transmissions, the destination address must be specified at the source. For this reason, network protocols typically define a rigid addressing scheme. As one of ordinary skill in the art will recognize, modifying or expanding addressing schemes is a complicated and expensive process. For example, the transition from version 4 of the IP protocol (IPv4) to version 6 (IPv6) requires significant updates to much of the infrastructure supporting IPv4. On the other hand, defining addressing schemes with large capability for small networks creates an unnecessary overhead. Thus, a network protocol ideally suited for a particular application offers a sufficient number of possible addresses without an excessive overhead in data transmission.

In short, a number of factors influence the implementation of particular protocols in particular industries. In the process control industry, it is known to use standardized communication protocols to enable devices made by different manufacturers to communicate with one another in an easy to use and implement manner. One such well known communication standard used in the process control industry is the Highway Addressable Remote Transmitter (HART) Communication Foundation protocol, referred to generally as the HART® protocol. Generally speaking, the HART® protocol supports a combined digital and analog signal on a dedicated wire or set of wires, in which on-line process signals (such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. However, the HART protocol currently requires the use of dedicated, hard-wired communication lines, resulting in significant wiring needs within a process plant.

There has been a move, in the past number of years, to incorporate wireless technology into various industries including, in some limited manners, the process control industry. However, there are significant hurdles in the process control industry that limit the full scale incorporation, acceptance and use of wireless technology. In particular, the process control industry requires a completely reliable process control network because loss of signals can result in the loss of control of a plant, leading to catastrophic consequences, including explosions, the release of deadly chemicals or gases, etc. For example, Tapperson et al., U.S. Pat. No. 6,236, 334 discloses the use of a wireless communications in the process control industry as a secondary or backup communication path or for use in sending non-critical or redundant communication signals. Moreover, there have been many advances in the use of wireless communication systems in general that may be applicable to the process control industry, but which have not yet been applied to the process control industry in a manner that allows or provides a reliable, and in some instances completely wireless, communication network within a process plant. U.S. Patent Application Publication Numbers 2005/0213612, 2006/0029060 and 2006/0029061 for example disclose various aspects of wireless communication technology related to a general wireless communication system.

Similar to wired communications, wireless communication protocols are expected to provide efficient, reliable and secure methods of exchanging information. Of course, much of the methodology developed to address these concerns on wired networks does not apply to wireless communications because of the shared and open nature of the medium. Further, in addition to the typical objectives behind a wired communication protocol, wireless protocols face other requirements with respect to the issues of interference and co-existence of several networks that use the same part of the radio frequency spectrum. Moreover, some wireless networks operate in the part of the spectrum that is unlicensed, or open to the public. Therefore, protocols servicing such networks must be capable of detecting and resolving issues related to frequency (channel) contention, radio resource sharing and negotiation, etc.

In the process control industry, developers of wireless communication protocols face additional challenges, such as achieving backward compatibility with wired devices, supporting previous wired versions of a protocol, providing transition services to devices retrofitted with wireless communicators, and providing routing techniques which can ensure both reliability and efficiency. Meanwhile, there remains a wide number of process control applications in which there are few, if any, in-place measurements. Currently these applications rely on observed measurements (e.g. water level is rising) or inspection (e.g. period maintenance of air conditioning unit, pump, fan, etc) to discover abnormal situations. In order to take action, operators frequently require face-to-face discussions. Many of these applications could be greatly simplified if measurement and control devices were utilized. However, current measurement devices usually require power, communications infrastructure, configuration, and support infrastructure which simply is not available.

In yet another aspect, the process control industry requires that the communication protocol servicing a particular process control network be able to accommodate field devices with different data transmission requirements, priorities, and power capabilities. In particular, some process control systems may include measurement devices that frequently (such as several times per second) report measurements to a centralized controller or to another field device. Meanwhile, another device in the same system may report measurements, alarms, or other data only once per hour. However, both devices may require that the respective measurement reports propagate to a destination host, such as a controller, a workstation, or a peer field device, with as little overhead in time and bandwidth as possible.

SUMMARY

A mesh communication network for use in, for example, process control plants includes a plurality of network devices transmitting and receiving data according to a network schedule defined as a set of concurrent overlapping superframes and in view of a priority assigned to data packets. In some embodiments, an originating network device assigns priority to a header or a trailer of each data packet, and each intermediate network device forwards the data packet according to the priority specified in the data packet. A forwarding network device or a destination network device processes an incoming data packet only if the priority of the data packet is consistent with a priority of the network device. In one such embodiment, the forwarding network device or the destination network device processes the data packet if the priority of the data packet is equal to or higher than the priority of the network device.

In one aspect, the communication network may support several levels of priority corresponding to several types of data transferred between the network devices. In one such embodiment, data associated with network diagnostics, network configuration, or network control may correspond to one priority level while data associated with process control or network statistics may correspond to another, possibly lower, level of priority. Additionally, data associated with alarm or event reporting may correspond to yet another level of priority. In an embodiment, the communication network may also define a distinct level of priority for all other types of data which the network devices may transmit or receive.

In some embodiments, a network manager residing in or outside the communication network dynamically controls priority settings at each network device operating in the communication network. The network manager may adjust the priority setting at an individual device due to network congestion, an emergency or other critical condition, or due another abnormal circumstance. In some embodiments, the network manager also may adjust priority settings to decrease latency in data packet delivery, increase reliability, and optimize or at least improve other aspects of the network performance. Additionally, one or several network devices may be provisioned with a permanent priority setting via a maintenance port or a similar interface providing secure, manual-only, or otherwise limited access.

In other embodiments, the network manager may adjust the priority setting of a connection resource linking a pair of network devices instead of (or in addition to) adjusting the priority setting at one or more network devices. In accordance with these embodiments, a network device may use only those connection resources which have an appropriate priority setting for sending a data packet via the connection resource. Further, more than one connection resource may connect the same pair of network devices, and these connection resources may differ in one or more of a timing, a physical channel characteristic (e.g., radio frequency), an access category (e.g., dedicated, shared, etc.), a routing associating (e.g., graph-based routing), etc.

In some embodiments, the network manager may adjust a priority setting at a selected set of network devices or connection resources to optimize the scheduling and/or routing of data in the communication network. In alternative embodiments, the network manager may broadcast a command to temporarily disable the transmission of data of a certain priority in all network devices and/or connection resources. Preferably, the network manager disables the data associated with one or several priorities in response to detecting a critical global condition and, upon the resolution of the critical condition, re-enables the data of all priorities in the communication network.

In another aspect, each superframe includes several communication timeslots of a predetermined duration and each superframe repeats immediately as a new superframe cycle after the occurrence of all communication timeslots in the previous superframe cycle. The network manager may analyze such factors as transmission requirements, power availability, signal quality, etc. at each network device to define a network schedule, which specifies transmission and reception opportunities at the network devices, as dedicated or shared timeslots within superframes. Consequently, the network manager may forward a respective relevant part of the network schedule to each network device which may then store, maintain, and conform to a device-specific schedule.

In at least some of the embodiments, the mesh communication network is a wireless network which may include one or multiple communication channels such as carrier radio frequencies. Further, each network device may transmit data along at least one of several graphs defining communication paths between pairs of network devices, with some pairs of network devices sharing direct wireless connections defining edges of one or more graphs. The network manager may define the graphs by analyzing the topology of the network and such factors as power capability at each node, signal strength at each node, etc. In one particularly useful embodiment, the graphs are directed graphs and, accordingly, the communication paths are unidirectional communication paths. If desired, the network manager may define the network schedule in view of the defined graphs to further optimize the performance of the network. The network manager may conceptually combine at least some of direct wireless connections, communication channels, and communication timeslots into link resources.

During operation of the wireless network, the network devices may select link resources for receiving and transmitting data based on, in part, data priority of an individual data packet or a group of data packets. In some embodiments, a data packet may include multiple messages having different priorities, and a network device may associate the aggregate priority of the data packet with the highest priority of a message in the data packet.

In another aspect, active network devices may transmit advertisement packets specifying links available to devices wishing to join the wireless network, so that a certain active network device may operate as a neighbor of a joining device which has accepted the advertisement of the certain active network device. An advertisement packet may specify a join priority of the active network device transmitting the advertisement packet. A joining device may select one or more potential neighbors based, in part, on the join priority specified in the corresponding advertisement packets. In one such embodiment, the joining device may prefer an active network device advertising a lower priority than another active network device.

In another embodiment, the network manager associates at least some of the graphs with a certain priority level. When selecting a suitable path for originating or forwarding a data packet, a network device may select a graph after comparing the one or more priorities of the graph to the priority of the data packet.

DETAILED DESCRIPTION OF THE DRAWINGS

FIG. 1 schematically illustrates a wireless network, connected to a plant automation network via a gateway device, providing communication between field devices and router devices and utilizing the routing techniques of the present disclosure.

Figure 5:
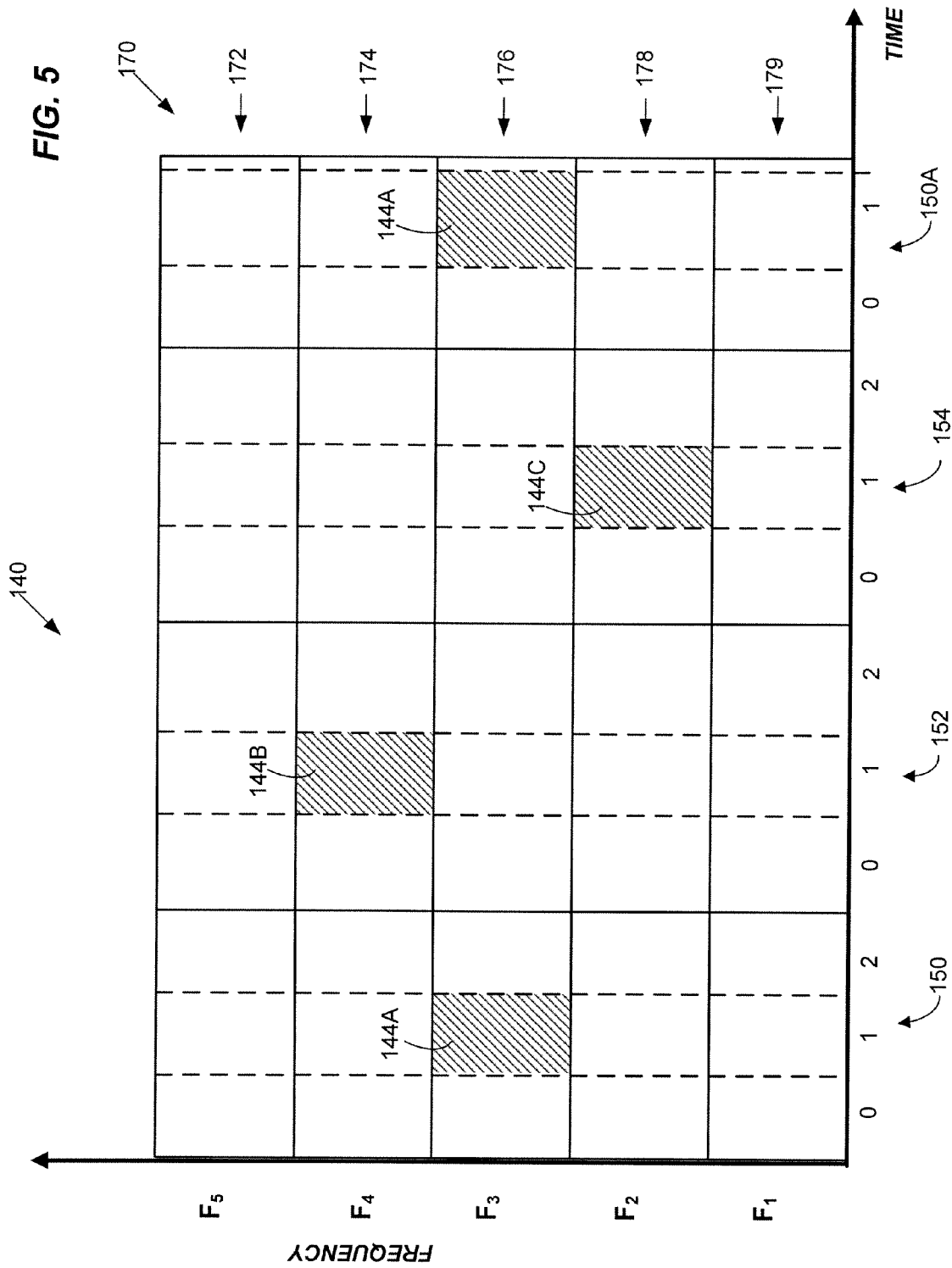

FIG. 5 schematically illustrates association of a timeslot of an exemplary superframe with several communication channels.

Figure 6:
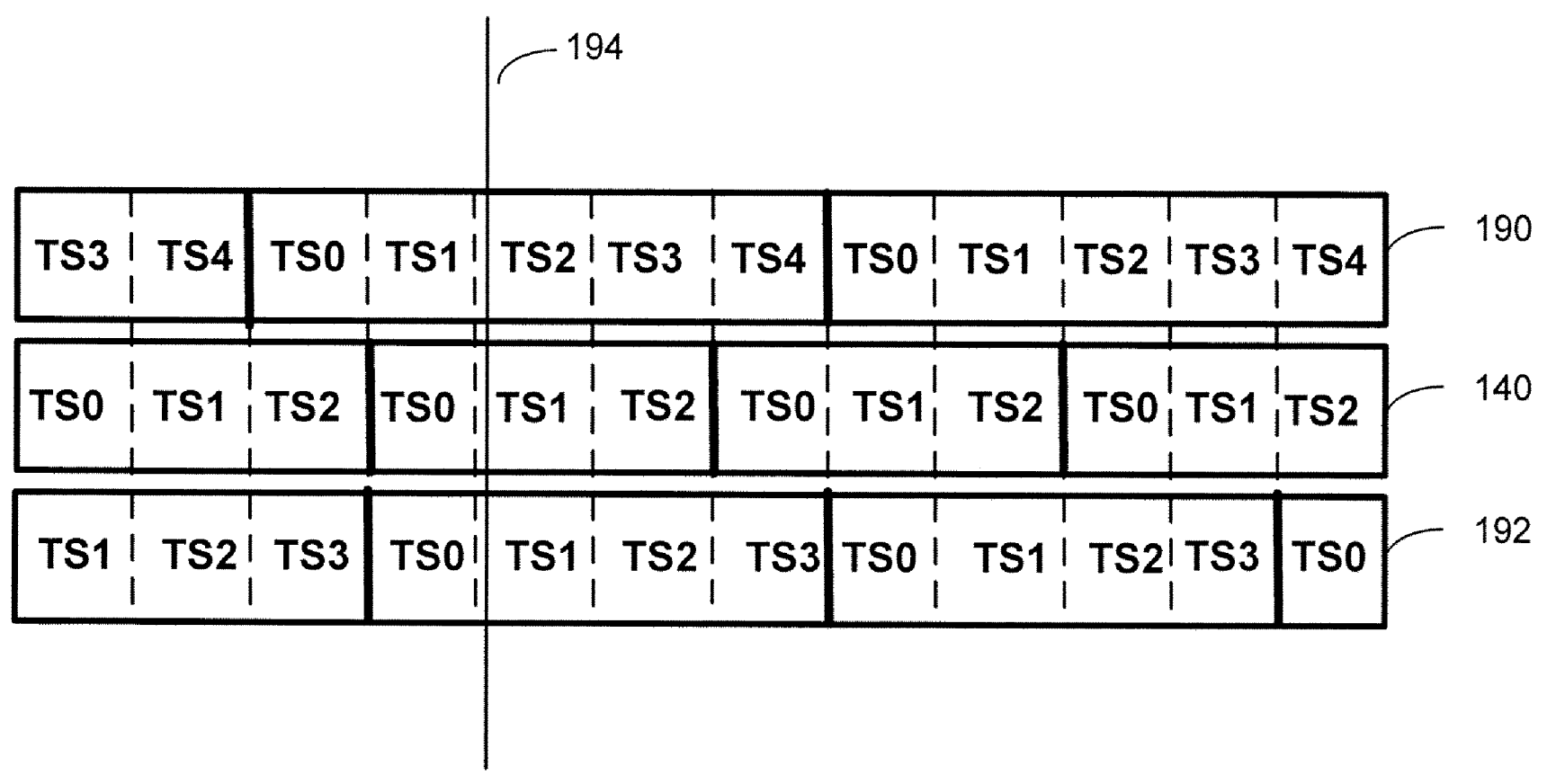

FIG. 6 is a block diagram that schematically illustrates an exemplary superframe definition including several concurrent superframes of different lengths.

Figure 6A:
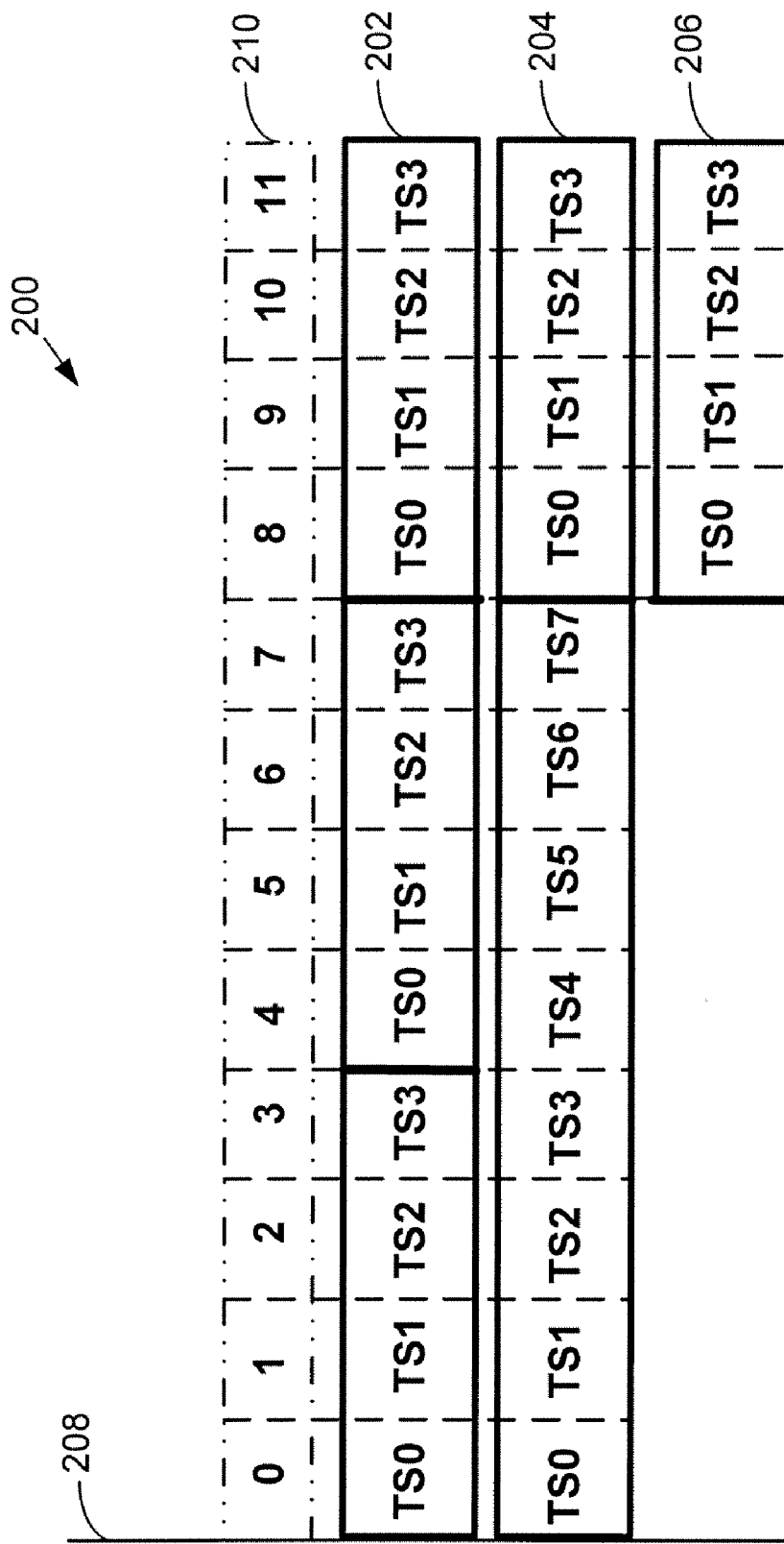

FIG. 6A is another block diagram that schematically illustrates several concurrent superframes of different length in relation to an absolute slot number counter.

Figure 1:
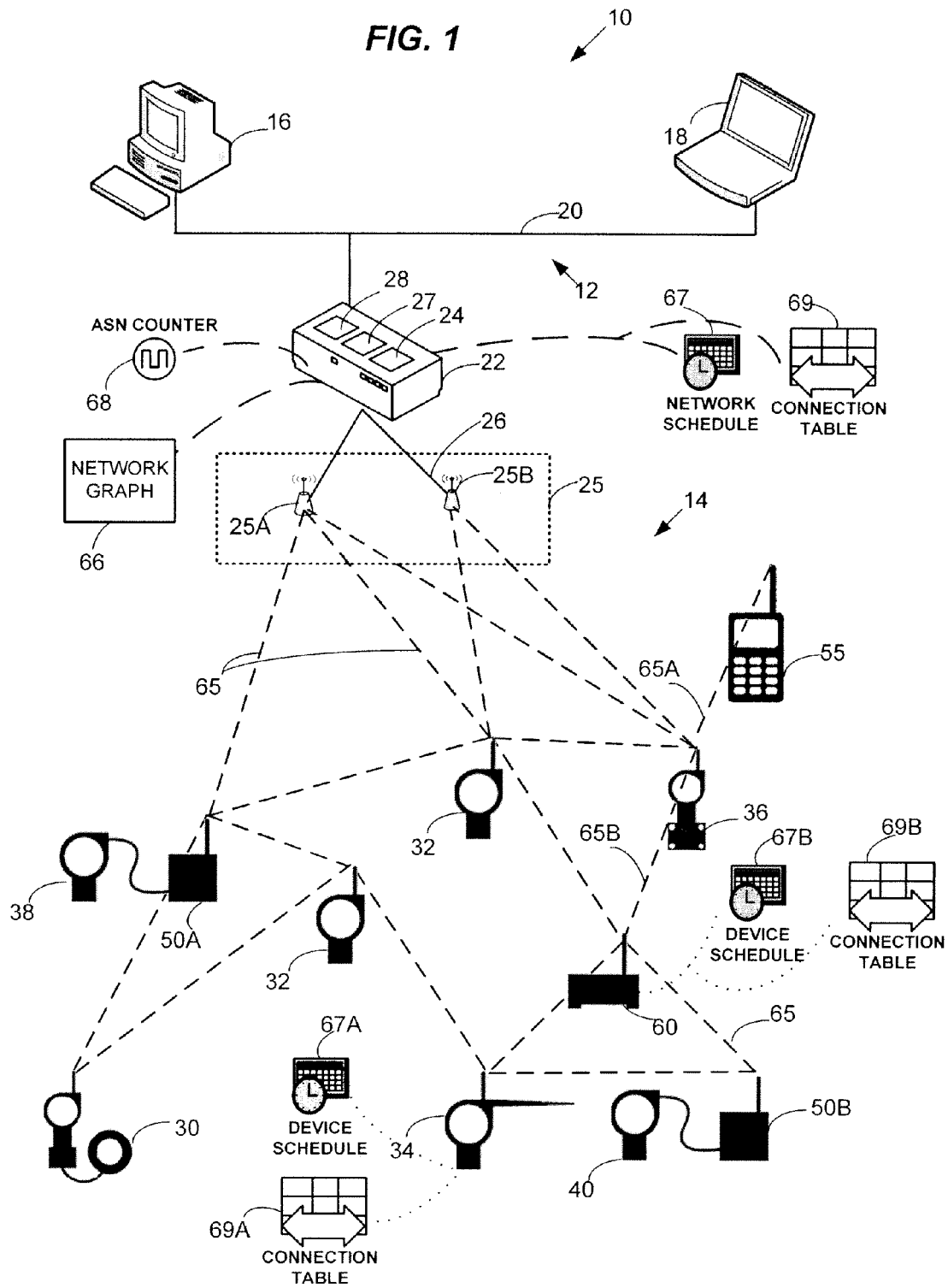
Figure 3:
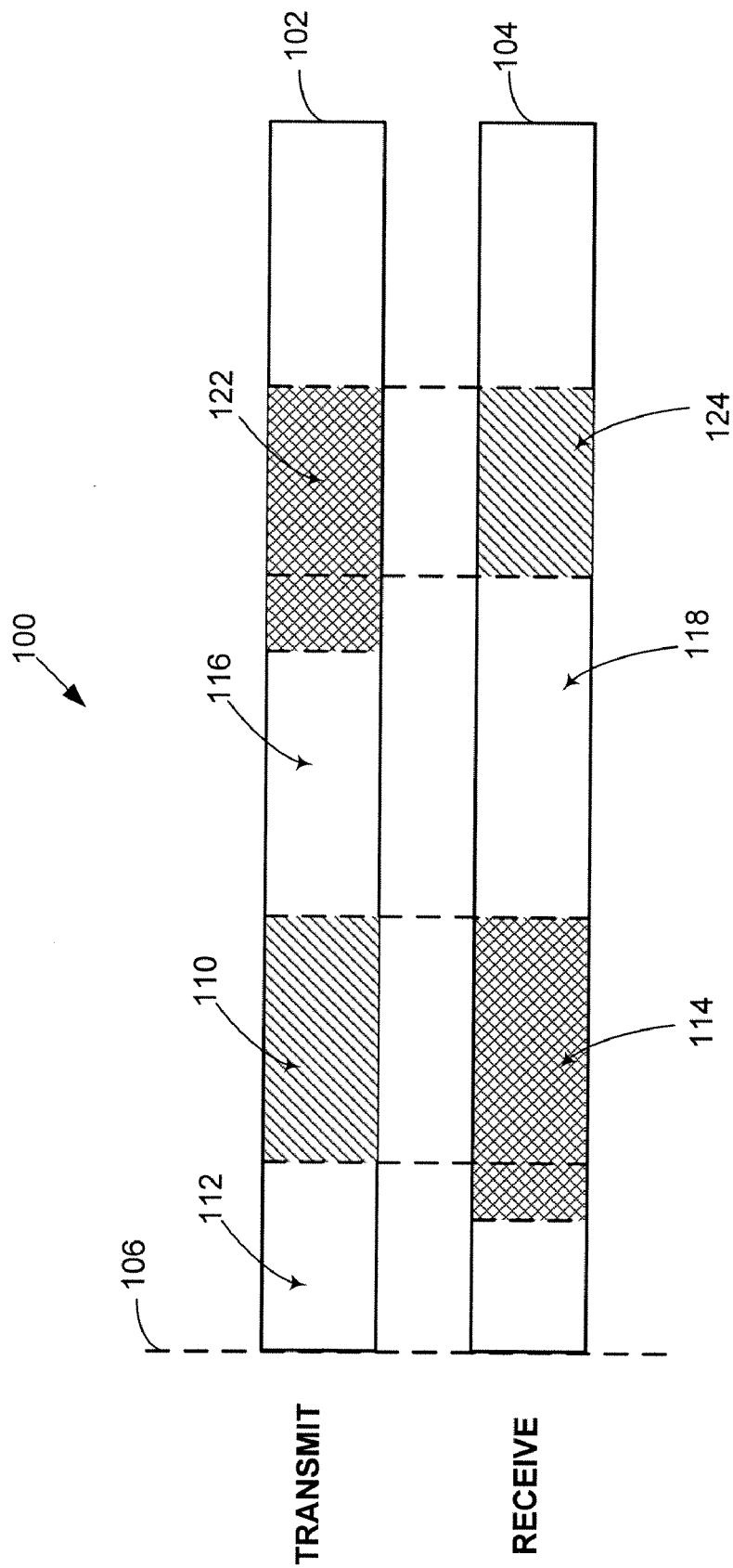
FIG. 3 is a block diagram that illustrates segments of a communication timeslot defined in accordance with one of the embodiments discussed herein.
Figure 7:
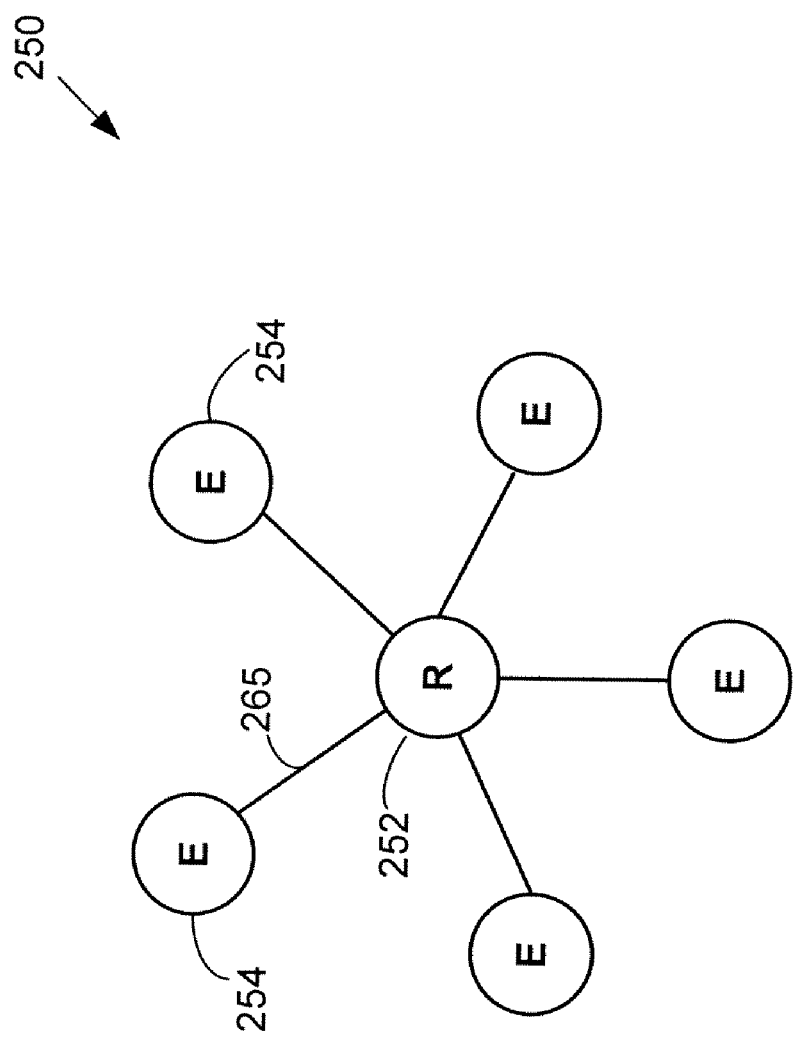

FIG. 7 schematically illustrates a star network topology to which a wireless network such as the network illustrated in FIG. 1 or FIG. 3 may conform.

Figure 8:
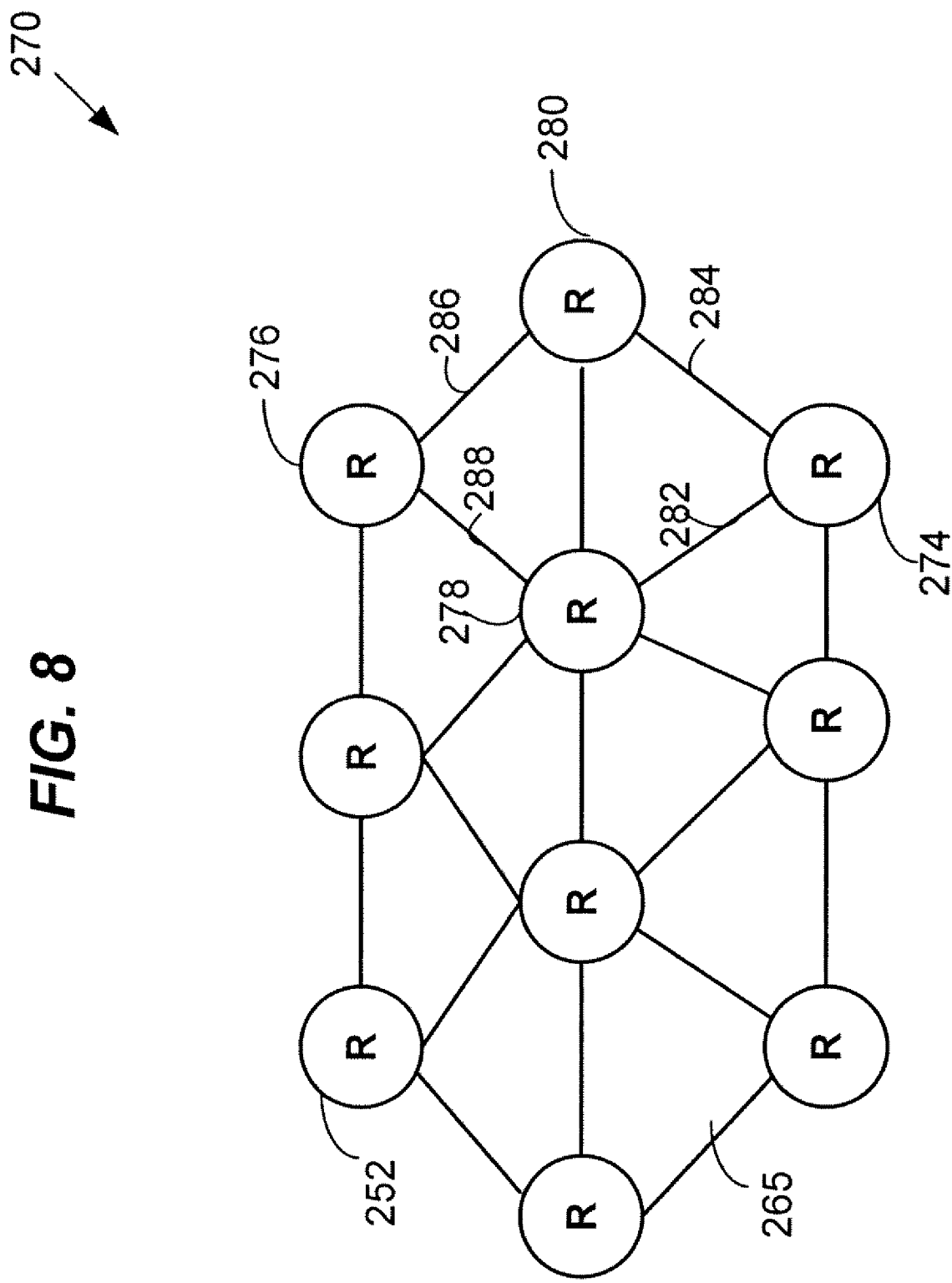

FIG. 8 schematically illustrates a mesh network topology to which a wireless network such as the network illustrated in FIG. 1 or FIG. 3 may conform.

Figure 9:
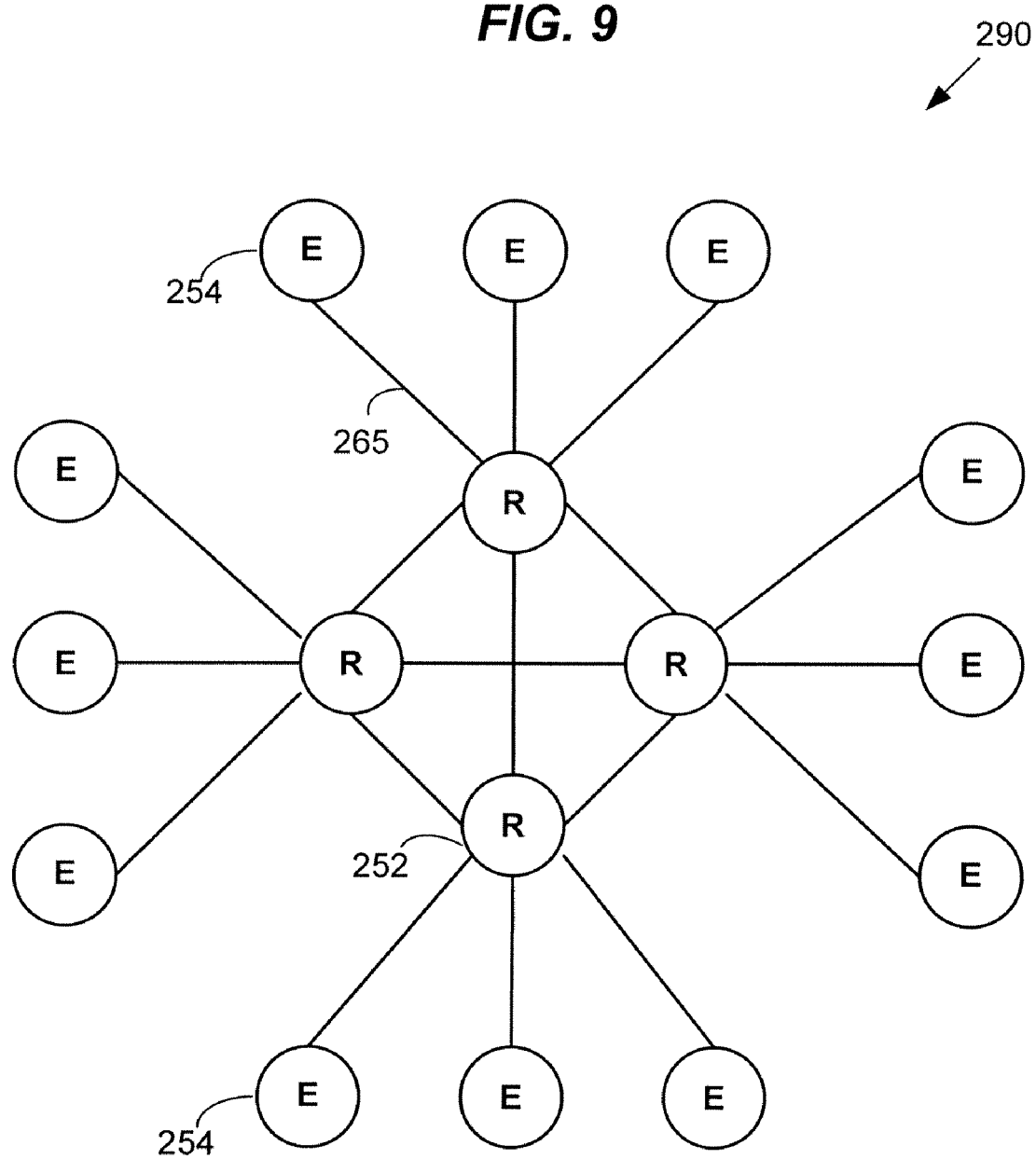

FIG. 9 schematically illustrates a star mesh network topology to which a wireless network such as the network illustrated in FIG. 1 or FIG. 3 may conform.

Figure 10:
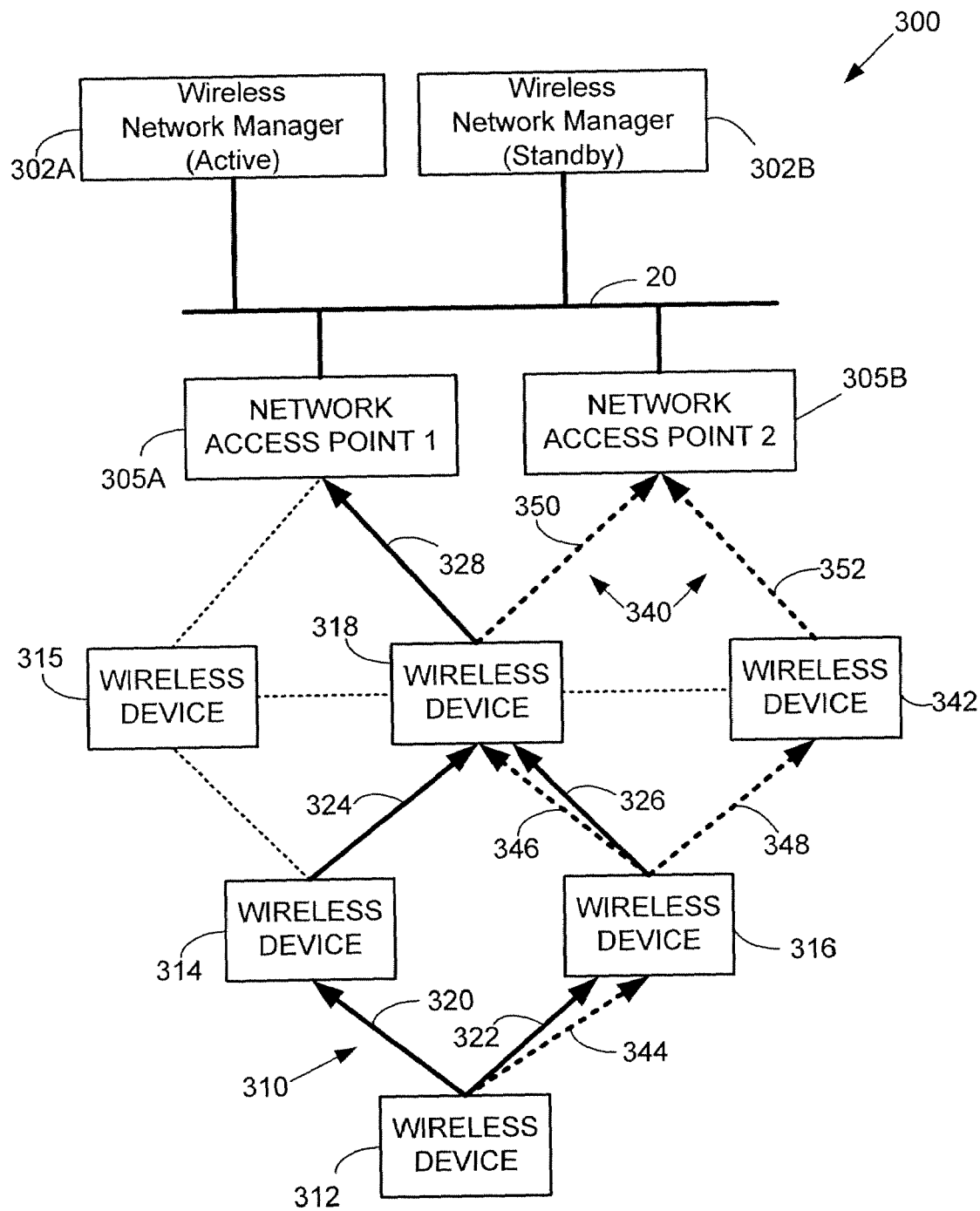

FIG. 10 is a block diagram illustrating redundant upstream data paths in a wireless network utilizing some of the graph routing techniques of the present disclosure.

Figure 11:
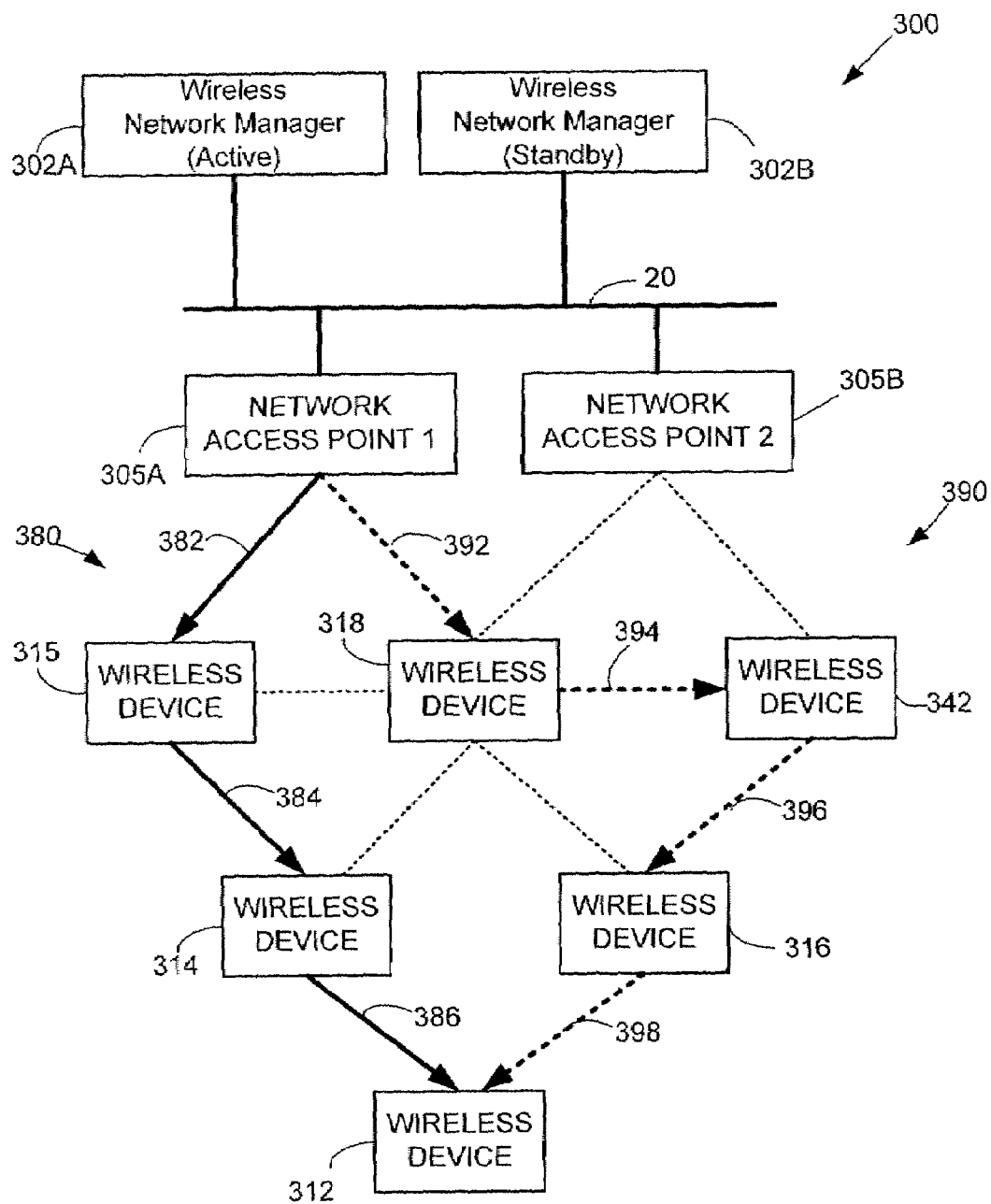

FIG. 11 is a block diagram illustrating redundant downstream data paths in a wireless network utilizing some of the graph routing techniques of the present disclosure.

Figure 12:
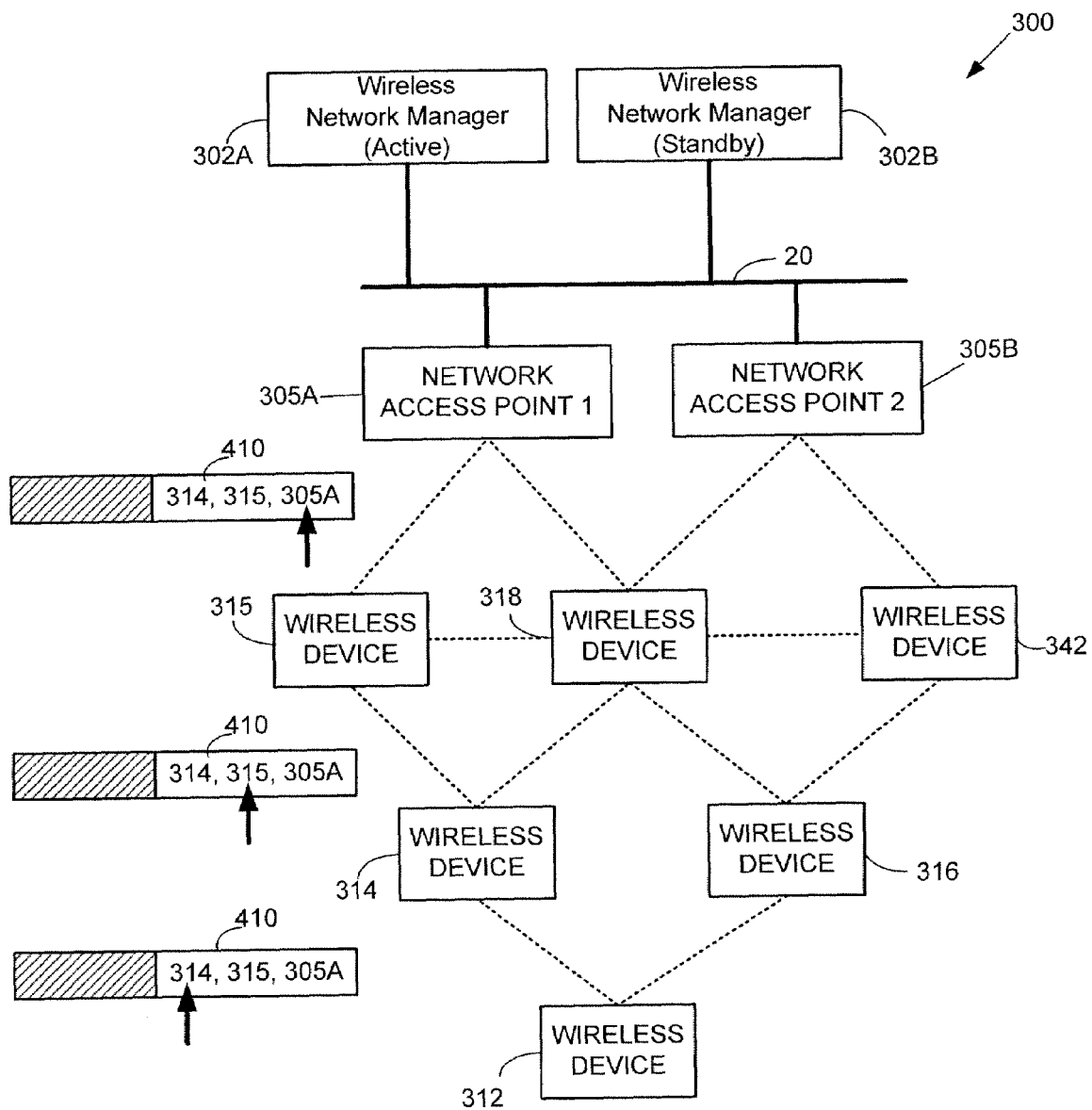

FIG. 12 s a block diagram illustrating downstream and upstream data paths in a wireless network utilizing some of the source routing techniques of the present disclosure.

Figure 13:
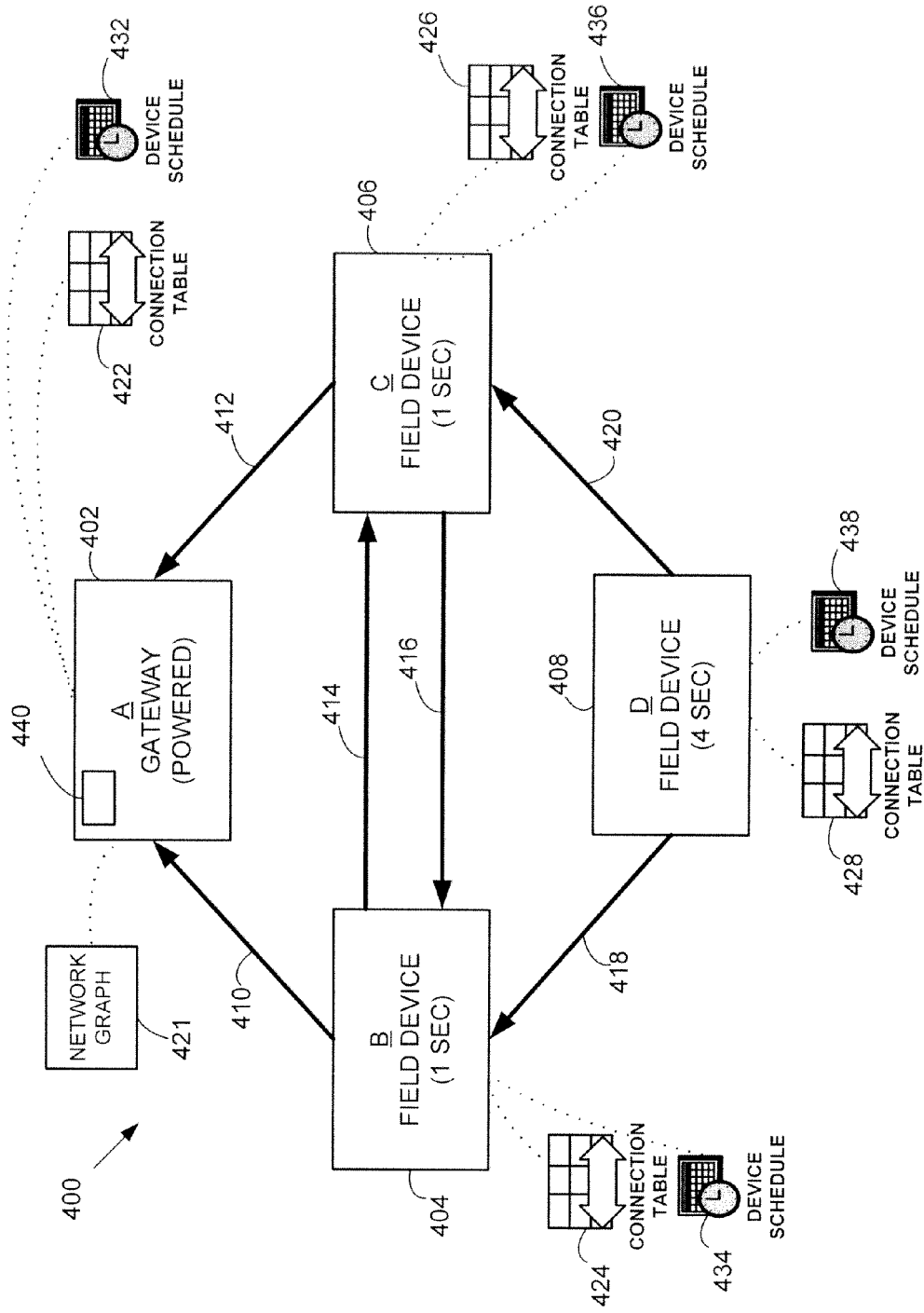

FIG. 13 schematically illustrates a wireless network having several network devices transmitting data according to a device-specific schedule and utilizing some of the routing and scheduling techniques of the present disclosure.

FIG. 14 illustrates example superframe definitions for two devices illustrated in FIG. 13.

Figure 16:
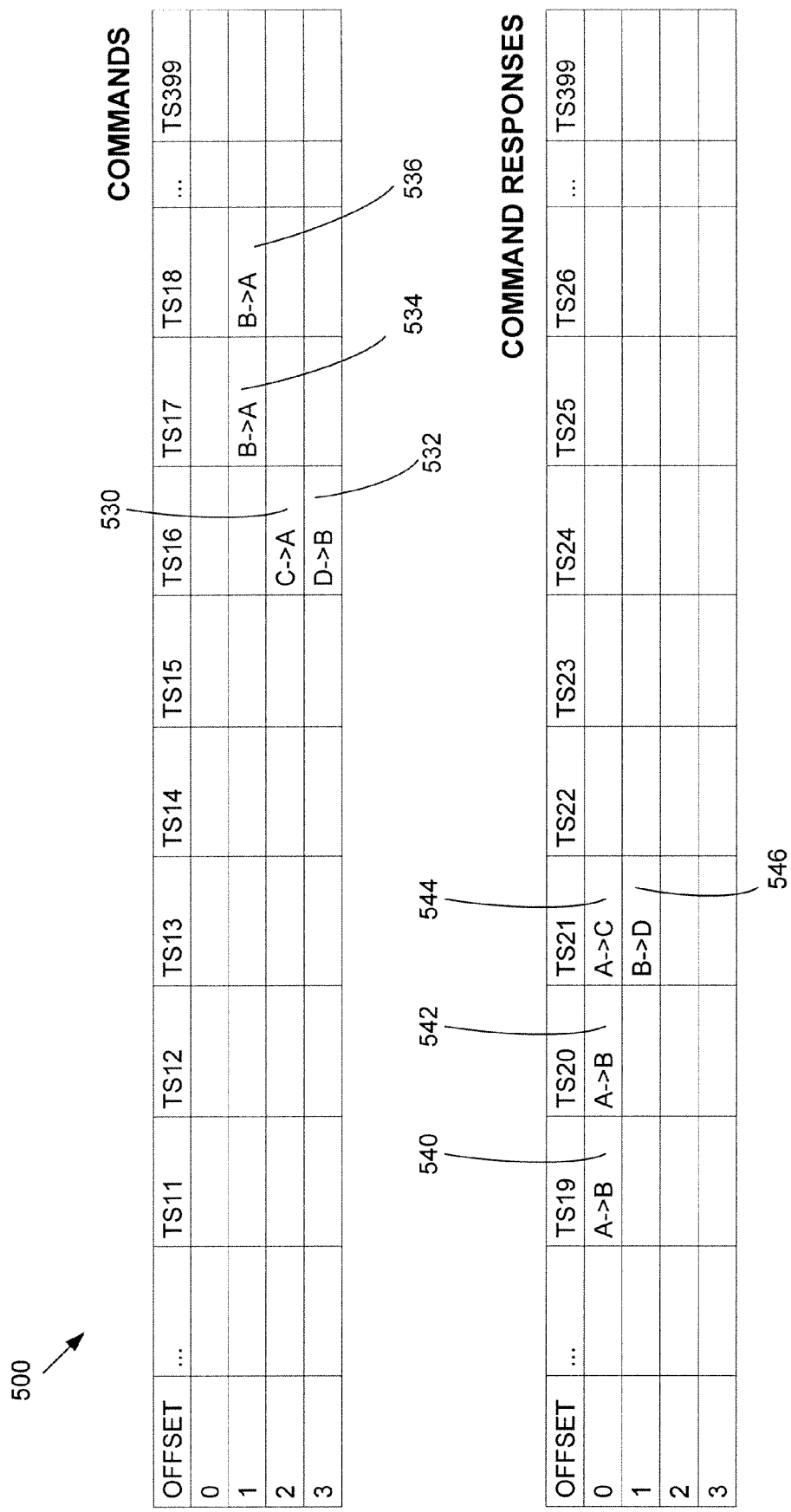

FIGS. 15 and 16 illustrate timeslot allocation for several types of data which may be transmitted in a management superframe of the network illustrated in FIG. 13.

FIGS. 17-20 illustrate an example communication schedule definitions for each of the devices illustrated in FIG. 13.

Figure 21:
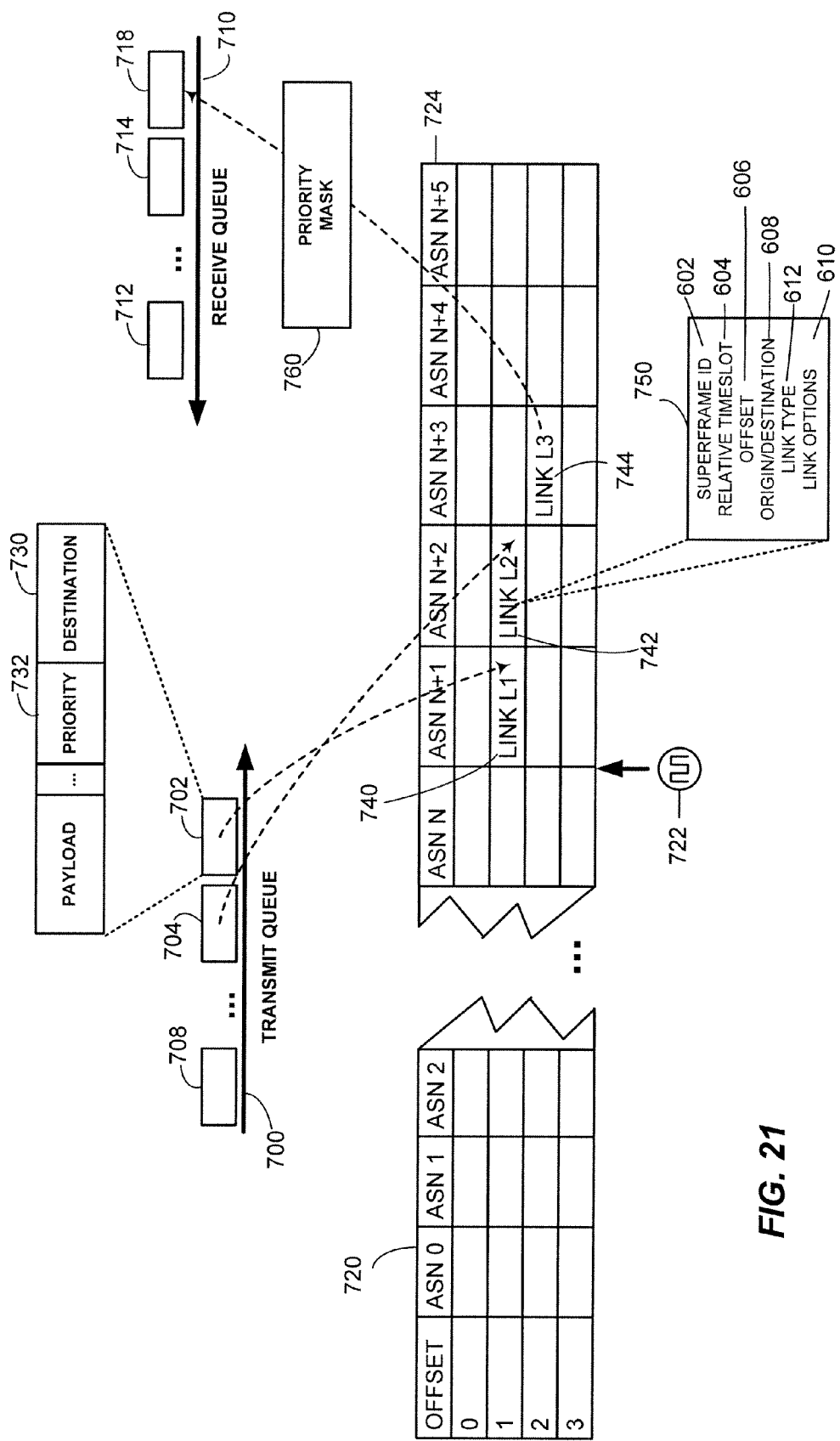

FIG. 21 schematically illustrates scheduling of data packet transmission and reception at an individual network device operating in a wireless network of FIG. 1 or 10-13.

Figure 22:
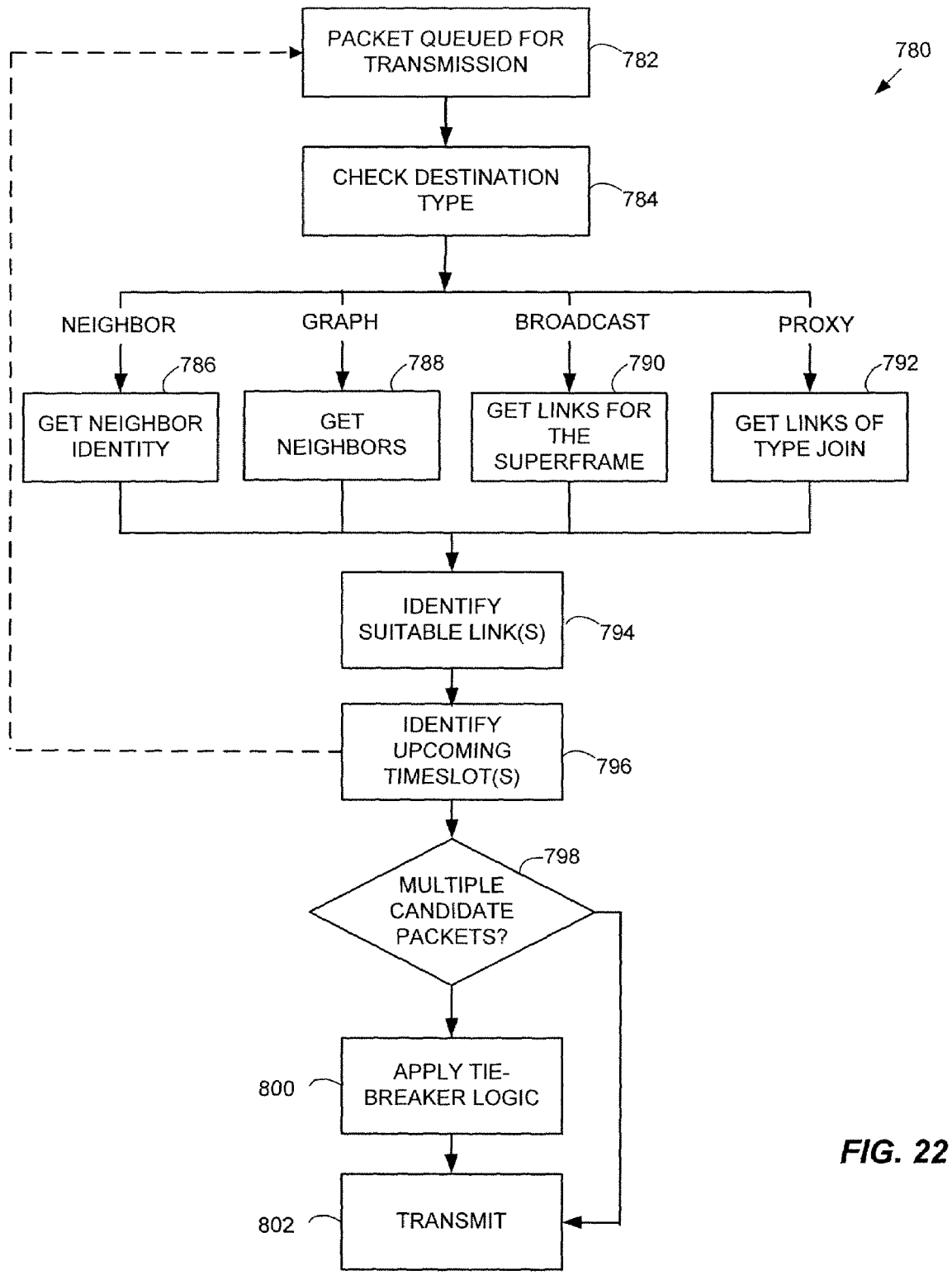

FIG. 22 is an example procedure that a device operating in a wireless network of FIG. 1 or 10-13 may execute to determine an order of sending a queued data packet.

Figure 23:
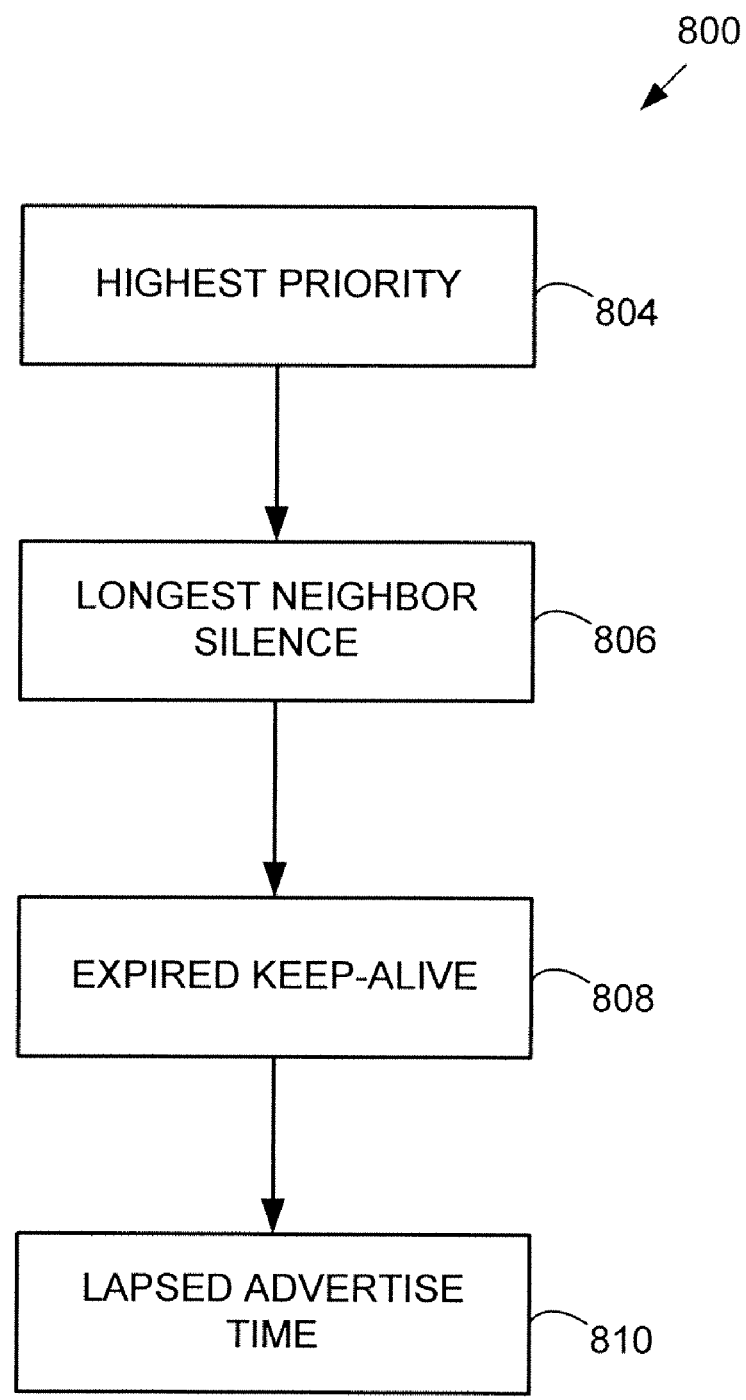

FIG. 23 is an example tie-brake procedure that a device operating in a wireless network of FIG. 1 or 10-13 may execute to select between several queued data packets.

Figure 24:
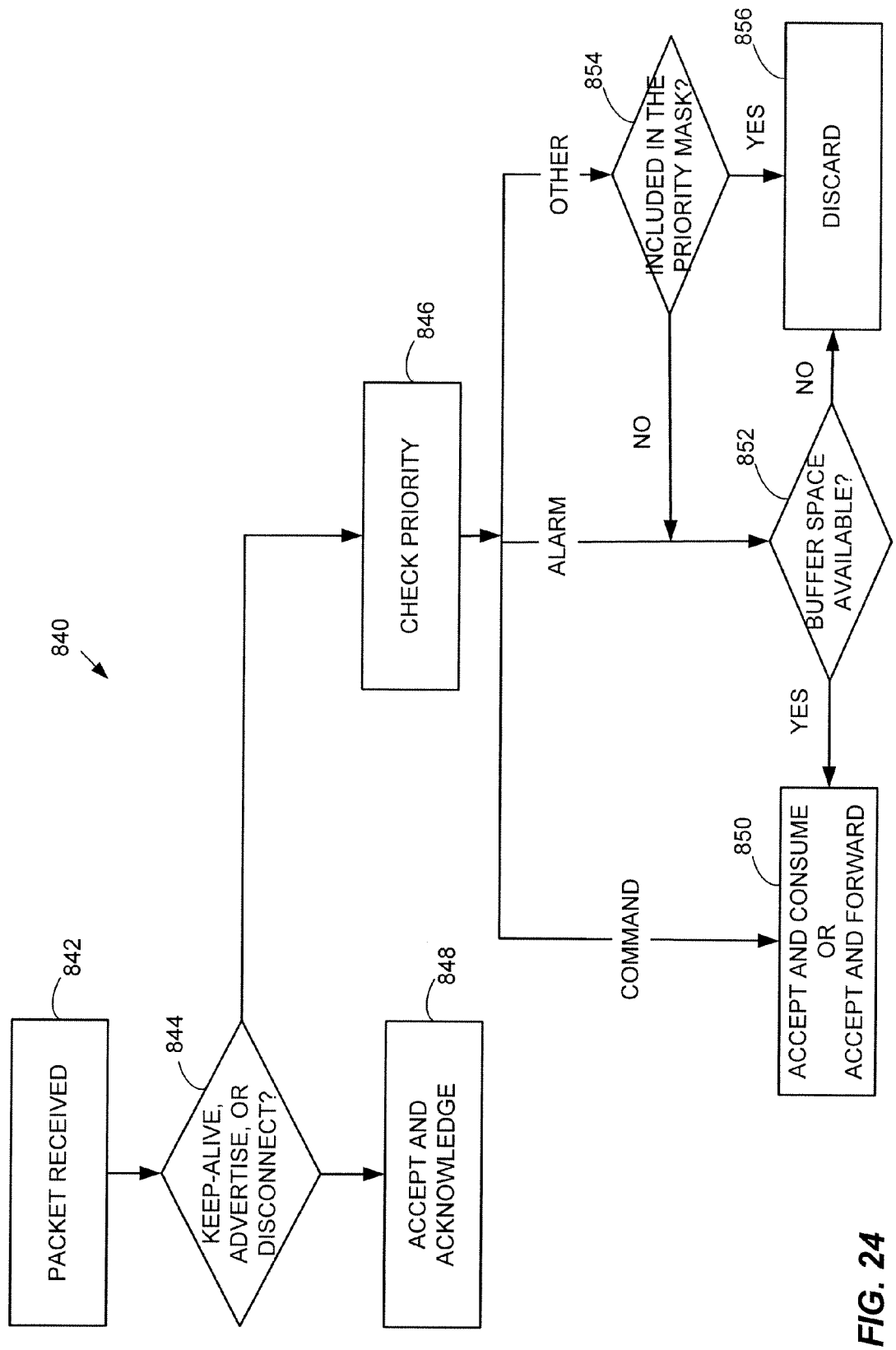

FIG. 24 is an example procedure that a device operating in a wireless network of FIG. 1 or 10-13 may execute when receiving a data packet.

DETAILED DESCRIPTION

FIG. 1 illustrates an exemplary network 10 in which the scheduling and routing techniques described herein may be used. In particular, the network 10 may include a plant automation network 12 connected to a wireless communication network 14. The plant automation network 12 may include one or more stationary workstations 16 and one or more portable workstations 18 connected over a communication backbone 20 which may be implemented using Ethernet, RS-485, Profibus DP, or using other suitable communication hardware and protocol. The workstations and other equipment forming the plant automation network 12 may provide various control and supervisory functions to plant personnel, including access to devices in the wireless network 14. The plant automation network 12 and the wireless network 14 may be connected via a gateway device 22. More specifically, the gateway device 22 may be connected to the backbone 20 in a wired manner and may communicate with the plant automation network 12 using any suitable (e.g., known) communication protocol. The gateway device 22, which may be implemented in any other desired manner (e.g., as a standalone device, a card insertable into an expansion slot of the host workstations 16 or 18, as a part of the input/output (IO) subsystem of a PLC-based or DCS-based system, etc.), may provide applications that are running on the network 12 with access to various devices of the wireless network 14. In addition to protocol and command conversion, the gateway device 22 may provide synchronized clocking used by time slots and superframes (sets of communication time slots spaced equally in time) of a scheduling scheme associated with a wireless protocol (referred to herein as a WirelessHART protocol) implemented in the network 14.

In some configurations, the network 10 may include more than one gateway device 22 to improve the efficiency and reliability of the network 10. In particular, multiple gateway devices 22 may provide additional bandwidth for the communication between the wireless network 14 and the plant automation network 12, as well as the outside world. On the other hand, the gateway 22 device may request bandwidth from the appropriate network service according to the gateway communication needs within the wireless network 14. A network manager software module 27, which may reside in the gateway device 22, may further reassess the necessary bandwidth while the system is operational. For example, the gateway device 22 may receive a request from a host residing outside of the wireless network 14 to retrieve a large amount of data. The gateway device 22 may then request the network manager 27 to allocate additional bandwidth to accommodate this transaction. For example, the gateway device 22 may issue an appropriate service request. The gateway device 22 may then request the network manager 27 to release the bandwidth upon completion of the transaction.

With continued reference to FIG. 1, the wireless network 14 may include one or more field devices 30-36. In general, process control systems, like those used in chemical, petroleum or other process plants, include field devices such as valves, valve positioners, switches, sensors (e.g., temperature, pressure and flow rate sensors), pumps, fans, etc. Generally speaking, field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adapter (WHA) 50A, 50B, respectively. Additionally, each of the WHAs 50A, 50B may support other communication protocols such as Foundation® Fieldbus, PROFIBUS, DeviceNet, etc. In these embodiments, each of the WHAs 50A, 50B supports protocol translation on a lower layer of the protocol stack. Additionally, it is contemplated that a single WHA 50A or 50B may also function as a multiplexer and may support multiple HART or non-HART devices.

In general, the network manager 27 may be responsible for adapting the wireless network 14 to changing conditions and for scheduling communication resources. As network devices join and leave the network, the network manager 27 may update its internal model of the wireless network 14 and use this information to generate communication schedules and communication routes. Additionally, the network manager 27 may consider the overall performance of the wireless network 14 as well as the diagnostic information to adapt the wireless network 14 to changes in topology and communication requirements. Once the network manager 27 has generated the overall communication schedule, all or respective parts of the overall communication schedule may be transferred through a series of commands from the network manager 27 to the network devices.

To further increase bandwidth and improve reliability, the gateway device 22 may be functionally divided into a virtual gateway 24 and one or more network access points 25, which may be separate physical devices in wired communication with the gateway device 22. However, while FIG. 1 illustrates a wired connection 26 between the physically separate gateway device 22 and the access points 25, it will be understood that the elements 22-26 may also be provided as an integral device. Because the network access points 25 may be physically separated from the gateway device 22, the access points 25 may be strategically placed in several different locations with respect to the network 14. In addition to increasing the bandwidth, multiple access points 25 can increase the overall reliability of the network 14 by compensating for a potentially poor signal quality at one access point 25 using the other access point 25. Having multiple access points 25 also provides redundancy in case of a failure at one or more of the access points 25.

In addition to allocating bandwidth and otherwise bridging the networks 12 and 14, the gateway device 22 may perform one or more managerial functions in the wireless network 14. As illustrated in FIG. 1, a network manager software module 27 and a security manager software module 28 may be stored in and executed in the gateway device 22. Alternatively, the network manager 27 and/or the security manager 28 may run on one of the hosts 16 or 18 in the plant automation network 12. For example, the network manager 27 may run on the host 16 and the security manager 28 may run on the host 18. The network manager 27 may be responsible for configuration of the network 14, scheduling communication between wireless devices, managing routing tables associated with the wireless devices, monitoring the overall health of the wireless network 14, reporting the health of the wireless network 14 to the workstations 16 and 18, as well as other administrative and supervisory functions. Although a single active network manager 27 may be sufficient in the wireless network 14, redundant network managers 27 may be similarly supported to safeguard the wireless network 14 against unexpected equipment failures. Meanwhile, the security manager 28 may be responsible for protecting the wireless network 14 from malicious or accidental intrusions by unauthorized devices. To this end, the security manager 28 may manage authentication codes, verify authorization information supplied by devices attempting to join the wireless network 14, update temporary security data such as expiring secret keys, and perform other security functions.

With continued reference to FIG. 1, the wireless network 14 may include one or more field devices 30-36. In general, process control systems, like those used in chemical, petroleum or other process plants, include such field devices as valves, valve positioners, switches, sensors (e.g., temperature, pressure and flow rate sensors), pumps, fans, etc. Field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

In one embodiment, the wireless protocol supporting network devices 30-36 of the wireless network 14 is an extension of the known wired HART protocol, a widely accepted industry standard, that maintains the simple workflow and practices of the wired environment. In this sense, the network devices 30-36 may be considered WirelessHART devices. The same tools used for wired HART devices may be easily adapted to wireless devices 30-36 with a simple addition of new device description files. In this manner, the wireless protocol may leverage the experience and knowledge gained using the wired HART protocol to minimize training and simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, reduces the cost associated with developing and supporting devices that may be used with such networks. Some of the additional benefits of a wireless extension of the well-known HART protocol include access to measurements that were difficult or expensive to obtain with wired devices and the ability to configure and operate instruments from system software that can be installed on laptops, handhelds, workstations, etc. Another benefit is the ability to send diagnostic alerts from wireless devices back through the communication infrastructure to a centrally located diagnostic center. For example, every heat exchanger in a process plant could be fitted with a WirelessHART device and the end user and supplier could be alerted when a heat exchanger detects a problem. Yet another benefit is the ability to monitor conditions that present serious health and safety problems. For example, a WirelessHART device could be placed in flood zones on roads and be used to alert authorities and drivers about water levels. Other benefits include access to a wide range of diagnostics alerts and the ability to store trended as well as calculated values at the WirelessHART devices so that, when communications to the device are established, the values can be transferred to a host. In this manner, the WirelessHART protocol can provide a platform that enables host applications to have wireless access to existing HART-enabled field devices and the WirelessHART protocol can support the deployment of battery operated, wireless only HART-enabled field devices. The WirelessHART protocol may be used to establish a wireless communication standard for process applications and may further extend the application of HART communications and the benefits that this protocol provides to the process control industry by enhancing the basic HART technology to support wireless process automation applications.

Referring again to FIG. 1, the field devices 30-36 may be WirelessHART field devices, each provided as an integral unit and supporting all layers of the WirelessHART protocol stack. For example, in the network 14, the field device 30 may be a WirelessHART flow meter, the field devices 32 may be WirelessHART pressure sensors, the field device 34 may be a WirelessHART valve positioner, and the field device 36 may a WirelessHART pressure sensor. Importantly, the wireless devices 30-36 may support all of the HART features that users have come to expect from the wired HART protocol. As one of ordinary skill in the art will appreciate, one of the core strengths of the HART protocol is its rigorous interoperability requirements. In some embodiments, all WirelessHART equipment includes core mandatory capabilities in order to allow equivalent device types (made by different manufacturers, for example) to be interchanged without compromising system operation. Furthermore, the WirelessHART protocol is backward compatible to HART core technology such as the device description language (DDL). In the preferred embodiment, all of the WirelessHART devices should support the DDL, which ensures that end users immediately have the tools to begin utilizing the WirelessHART protocol.

If desired, the network 14 may include non-wireless devices. For example, a field device 38 of FIG. 1 may be a legacy 4-20 mA device and a field device 40 may be a traditional wired HART device. To communicate within the network 14, the field devices 38 and 40 may be connected to the WirelessHART network 14 via a WirelessHART adapter (WHA) 50A and 50B, respectively. Additionally, each of the WHAs 50A and 50B may support other communication protocols such as FOUNDATION® Fieldbus, PROFIBUS, DeviceNet, etc. In these embodiments, each of the WHAs 50A and 50B supports protocol translation on a lower layer of the protocol stack. Additionally, it is contemplated that a single WHA 50A or 50B may also function as a multiplexer and may support multiple HART or non-HART devices.

Plant personnel may additionally use handheld devices for installation, control, monitoring, and maintenance of network devices. Generally speaking, handheld devices are portable equipment that can connect directly to the wireless network 14 or through the gateway devices 22 as a host on the plant automation network 12. As illustrated in FIG. 1, a WirelessHART-connected handheld device 55 may communicate directly with the wireless network 14. When operating with a formed wireless network 14, the handheld device 55 may join the network 14 as just another WirelessHART field device. When operating with a target network device that is not connected to a WirelessHART network, the handheld device 55 may operate as a combination of the gateway device 22 and the network manager 27 by forming its own wireless network with the target network device.

A plant automation network-connected handheld device (not shown) may be used to connect to the plant automation network 12 through known networking technology, such as Wi-Fi. This device communicates with the network devices 30-40 through the gateway device 22 in the same fashion as external plant automation servers (not shown) or the workstations 16 and 18 communicate with the devices 30-40.

Additionally, the wireless network 14 may include a router device 60 which is a network device that forwards packets from one network device to another network device. A network device that is acting as a router device uses internal routing tables to conduct routing, i.e., to decide to which network device a particular packet should be sent. Standalone routers such as the router 60 may not be required in those embodiments where all of the devices on the wireless network 14 support routing. However, it may be beneficial (e.g. to extend the network, or to save the power of a field device in the network) to add one or more dedicated routers 60 to the network 14.

All of the devices directly connected to the wireless network 14 may be referred to as network devices. In particular, the wireless field devices 30-36, the adapters 50A and 50B, the routers 60, the gateway devices 22, the access points 25, and the wireless handheld device 55 are, for the purposes of routing and scheduling, network devices, each of which forms a node of the wireless network 14. In order to provide a very robust and an easily expandable wireless network, all of the devices in a network may support routing and each network device may be globally identified by a substantially unique address, such as a HART address, for example. The network manager 27 may contain a complete list of network devices and may assign each device a short, network unique 16-bit (for example) nickname. Additionally, each network device may store information related to update (or "scan") rates, connection sessions, and device resources. In short, each network device maintains up-to-date information related to routing and scheduling within the wireless network 14. The network manager 27 may communicate this information to network devices whenever new devices join the network or whenever the network manager 27 detects or originates a change in topology or scheduling of the wireless network 14.

Further, each network device may store and maintain a list of neighbor devices that the network device has identified during listening operations. Generally speaking, a neighbor of a network device is another network device of any type potentially capable of establishing a connection with the network device in accordance with the standards imposed by a corresponding network. In case of the WirelessHART network 14, the connection is a direct wireless connection. However, it will be appreciated that a neighboring device may also be a network device connected to the particular device in a wired manner. As will be discussed later, network devices may promote their discovery by other network devices through advertisement, or special messages sent out during designated periods of time. Network devices operatively connected to the wireless network 14 have one or more neighbors which they may choose according to the strength of the advertising signal or to some other principle.

In the example illustrated in FIG. 1, each of a pair of network devices connected by a direct wireless connection 65 recognizes the other as a neighbor. Thus, network devices of the wireless network 14 may form a large number of inter-device connections 65. The possibility and desirability of establishing a direct wireless connection 65 between two network devices is determined by several factors, such as the physical distance between the nodes, obstacles between the nodes (devices), signal strength at each of the two nodes, etc. In general, each wireless connection 65 is characterized by a large set of parameters related to the frequency of transmission, the method of access to a radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (e.g., 2.4 GHz). While the system and method discussed herein may be applied to a wireless network operating on any designated frequency or range of frequencies, the example embodiment discussed below relates to the wireless network 14 operating in the unlicensed, or shared part of the radio spectrum. In accordance with this embodiment, the wireless network 14 may be easily activated and adjusted to operate in a particular unlicensed frequency range as needed.

With continued reference to FIG. 1, two or more direct wireless connections 65 may form a communication path between nodes that cannot form a direct wireless connection 65. For example, the direct wireless connection 65A between the WirelessHART hand-held device 55 and WirelessHART device 36, along with the direct wireless connection 65B between the WirelessHART device 36 and the router 60, may form a communication path between the devices 55 and 60. As discussed in greater detail below, at least some of the communication paths may be directed communication paths (i.e., permitting or defining data transfer in only one direction between a pair of devices). Meanwhile, the WirelessHART device 36 may directly connect to each of the network devices 55, 60, 32, and to the network access points 25A and 25B. In general, network devices operating in the wireless network 14 may originate data packets, relay data packets sent by other devices, or perform both types of operations. As used herein, the term "end device" refers to a network device that does not relay data packets sent by other devices and term "routing device" refers to a network device that relays data packets traveling between other network devices. Of course, a routing device may also originate its own data or in some cases be an end device. One or several end devices and routing devices, along with several direct connections 65, may thus form a part of a mesh network.

Because a process plant may have hundreds or even thousands of field devices, the wireless network 14 operating in the plant may include a large number of nodes and, in many cases, an even larger number of direct connections 65 between pairs of nodes. As a result, the wireless network 14 may have a complex mesh topology, and some pairs of devices that do not share a direct connection 65 may have to communicate through many intermediate hops to perform communications between these devices. Thus, a data packet may sometimes need to travel along many direct connections 65 after leaving a source device but before reaching a destination device, and each direct connection 65 may add a delay to the overall delivery time of the data packet. Moreover, some of these intermediate devices may be located at an intersection of many communication paths of a mesh network. As such, these devices may be responsible for relaying a large number of packets originated by many different devices, possibly in addition to originating its own data. Consequently, a relatively busy intermediate device may not forward a transient data packet immediately, and instead may queue the packet for a relatively significant amount of time prior to sending the packet to a next node in the corresponding communication path. When the data packet eventually reaches the destination device, the destination device may reply with an acknowledgement packet which may also encounter similar delays. During the time the packet travels to the destination device and the corresponding acknowledgment packet travels back to the originating device from the destination device, the originating node may not know whether the data packet has successfully reached the destination device. Moreover, devices may leave the wireless network 14 due to scheduled maintenance and upgrades or due to unexpected failures, thus changing the topology of the mesh network and destroying some of the communication paths. Similarly, the devices may join the wireless network 14, adding additional direct connections 65. These and other changes to the topology of the wireless network 14 may significantly impact data transmissions between pairs of nodes if not processed in an efficient and timely manner.

Importantly, however, the efficiency of delivering data packets may largely determine the reliability, security, and the overall quality of plant operations. For example, a data packet including measurements indicative of an excessive temperature of a reactor should quickly and reliably reach another node, such as the hand-held device 55 or even the workstation 16, so that the operator or a controller may immediately take the appropriate action and address a dangerous condition if necessary. To efficiently utilize the available direct wireless connections 65 and properly adjust to the frequently changing network topology, the network manager 27 may maintain a complete network map, define a routing scheme that connects at least some pairs of network devices 30-50A-B, and communicate the relevant parts of the routing scheme to each network device that participates in the routing scheme.

In particular, the network manager 27 may define a set of directed graphs including one or more unidirectional communication paths, assign a graph identifier to each defined directed graph, and may communicate a relevant part of each graph definition to each corresponding network device, which may then update the device-specific, locally stored connection table 69. As explained in more detail below, the network devices 30-50A-B may then route data packets based on the graph identifier included in the headers, trailers, etc. of the data packets. If desired, each connection table 69 may only store routing information directly related to the corresponding network device, so that the network device does not know the complete definition of a directed graph which includes the network device. In other words, the network device may not "see" the network beyond its immediate neighbors and, in this sense, the network device may be unaware of the complete topology of the wireless network 14. For example, the router device 60 illustrated in FIG. 1 may store a connection table 69B, which may only specify the routing information related to the neighboring network devices 32, 36, 50B, and 34. Meanwhile, the device 34 may store a connection table 69A, which accordingly may specify the routing information related to the neighbors of the device 34.

In some cases, the network manager 27 may define duplicate communication paths between pairs of network devices to ensure that a data packet may still reach the destination device along the secondary communication path if one of the direct connections 65 of the primary communication path becomes unavailable. However, some of the direct connections 65 may be shared between the primary and the secondary path of a particular pair of network devices. Moreover, the network manager 27 may, in some cases, communicate the entire communication path to be used to a certain network device, which may then originate a data packet and include the complete path information in the header or the trailer of the data packet. Preferably, network devices use this method of routing for data which does not have stringent latency requirements. As discussed in detail below, this method (referred to herein as "source routing") may not provide the same degree of reliability and flexibility and, in general, may be characterized by longer delivery delays.

Another one of the core requirements of a wireless network protocol (and particularly of a wireless network operating in an unlicensed frequency band) is the minimally disruptive coexistence with other equipment utilizing the same band. Coexistence generally defines the ability of one system to perform a task in a shared environment in which other systems can similarly perform their tasks while conforming to the same set of rules or to a different (and possibly unknown) set of rules. One requirement of coexistence in a wireless environment is the ability of the protocol to maintain communication while interference is present in the environment. Another requirement is that the protocol should cause as little interference and disruption as possible with respect to other communication systems.

In other words, the problem of coexistence of a wireless system with the surrounding wireless environment has two general aspects. The first aspect of coexistence is the manner in which the system affects other systems. For example, an operator or developer of the particular system may ask what impact the transmitted signal of one transmitter has on other radio system operating in proximity to the particular system. More specifically, the operator may ask whether the transmitter disrupts communication of some other wireless device every time the transmitter turns on or whether the transmitter spends excessive time on the air effectively "hogging" the bandwidth. Ideally, each transmitter should be a "silent neighbor" that no other transmitter notices. While this ideal characteristic is rarely, if ever, attainable, a wireless system that creates a coexistence environment in which other wireless communication systems may operate reasonably well may be called a "good neighbor." The second aspect of coexistence of a wireless system is the ability of the system to operate reasonably well in the presence of other systems or wireless signal sources. In particular, the robustness of a wireless system may depend on how well the wireless system prevents interference at the receivers, on whether the receivers easily overload due to proximate sources of RF energy, on how well the receivers tolerate an occasional bit loss, and similar factors. In some industries, including the process control industry, there are a number of important potential applications in which the loss of data is frequently not allowable. A wireless system capable of providing reliable communications in a noisy or dynamic radio environment may be called a "tolerant neighbor."

Effective coexistence (i.e., being a good neighbor and a tolerant neighbor) relies in part on effectively employing three aspects of freedom: time, frequency and distance. Communication can be successful when it occurs 1) at a time when the interference source (or other communication system) is quiet; 2) at a different frequency than the interference signal; or 3) at a location sufficiently removed from the interference source. While a single one of these factors could be used to provide a communication scheme in the shared part of the radio spectrum, a combination of two or all three of these factors can provide a high degree of reliability, security and speed.

Still referring to FIG. 1, the network manager 27 or another application or service running on the network 14 or 12 may define a master network schedule 67 for the wireless communication network 14 in view of the factors discussed above.

The master network schedule 67 may specify the allocation of resources such as time segments and radio frequencies to the network devices 25 and 30-55. In particular, the master network schedule 67 may specify when each of the network devices 25 and 30-55 transmits process data, routes data on behalf of other network devices, listens to management data propagated from the network manager 27, and transmits advertisement data for the benefit of devices wishing to join the wireless network 14. To allocate the radio resources in an efficient manner, the network manager 27 may define and update the master network schedule 67 in view of the topology of the wireless network 14. More specifically, the network manager 27 may allocate the available resources to each of the nodes of the wireless network 14 (i.e., wireless devices 30-36, 50A-B, and 60) according to the direct wireless connections 65 identified at each node. In this sense, the network manager 27 may define and maintain the network schedule 67 in view of both the transmission requirements and of the routing possibilities at each node.

The master network schedule 67 may partition the available radio sources into individual communication channels, and further measure transmission and reception opportunities on each channel in such units as Time Division Multiple Access (TDMA) communication timeslots, for example. In particular, the wireless network 14 may operate within a certain frequency band which, in most cases, may be safely associated with several distinct carrier frequencies, so that communications at one frequency may occur at the same time as communications at another frequency within the band. One of ordinary skill in the art will appreciate that carrier frequencies in a typical application (e.g., public radio) are sufficiently spaced apart to prevent interference between the adjacent carrier frequencies. For example, in the 2.4 GHz band, IEEE assigns frequency 2.455 to channel number 21 and frequency 2.460 to channel number 22, thus allowing the spacing of 5 KHz between two adjacent segments of the 2.4 GHz band. The master network schedule 67 may thus associate each communication channel with a distinct carrier frequency, which may be the center frequency in a particular segment of the band.

Meanwhile, as typically used in the industries utilizing TDMA technology, the term "timeslot" refers to a segment of a specific duration into which a larger period of time is divided to provide a controlled method of sharing. For example, a second may be divided into 10 equal 100 millisecond timeslots. Although the master network schedule 67 preferably allocates resources as timeslots of a single fixed duration, it is also possible to vary the duration of the timeslots, provided that each relevant node of the wireless network 14 is properly notified of the change. To continue with the example definition of ten 100-millisecond timeslots, two devices may exchange data every second, with one device transmitting during the first 100 ms period of each second (i.e., the first timeslot), the other device transmitting during the fourth 100 ms period of each second (i.e., the fourth timeslot), and with the remaining timeslots being unoccupied. Thus, a node on the wireless network 14 may identify the scheduled transmission or reception opportunity by the frequency of transmission and the timeslot during which the corresponding device may transmit or receive data.

To properly synchronize the network devices 25A-B and 30-50A-B with the master network schedule 67, the network manager 27 may maintain a counter 68 to keep track of a number of timeslots scheduled since the formation of the wireless network 14, i.e., since a first network device initiated the process of forming the wireless network 14. As indicated above, the first network device may be the gateway device 22, for example. The number of timeslots elapsed since the beginning of the wireless network 14 is referred to herein as the Absolute Slot Number ("ASN"), in contrast to a relative slot number of a timeslot in a particular superframe. The network manager 27 may initialize the ASN counter 68 to zero at the time of formation of the wireless network 14 and increment consequently increment the ASN counter 68 by one with each occurrence of a new timeslot. As discussed in greater detail below, each of the network devices 25A-B and 30-50 A-B may similarly maintain a local copy of the ASN counter 68 and periodically synchronize the local copy with the master ASN counter 68 maintained by the network manager 27.

As part of defining an efficient and reliable network schedule 67, the network manager 27 may logically organize timeslots into cyclically repeating sets, or superframes. As used herein, a superframe may be more precisely understood as a series of equal superframe cycles, each superframe cycle corresponding to a logical grouping of several adjacent time slots forming a contiguous segment of time. The number of time slots in a given superframe defines the length of the superframe and determines how often each time slot repeats. In other words, the length of a superframe, multiplied by the duration of a single timeslot, specifies the duration of a superframe cycle. Additionally, the timeslots within each frame cycle may be sequentially numbered for convenience. To take one specific example, the network manager 27 may fix the duration of a timeslot at 10 milliseconds and may define a superframe of length 100 to generate a one-second frame cycle (i.e., 10 milliseconds multiplied by 100). In a zero-based numbering scheme, this example superframe may include timeslots numbered 0, 1, ... 99.

As discussed in greater detail below, the network manager 27 reduces latency and otherwise optimizes data transmissions by including multiple concurrent superframes of different sizes in the network schedule 67. Moreover, some or all of the superframes of the network schedule 67 may span multiple channels, or carrier frequencies. Thus, the master network schedule 67 may specify the association between each timeslot of each superframe and one of the available channels.

Thus, the master network schedule 67 may correspond to an aggregation of individual device schedules. For example, a network device, such as the valve positioner 34, may have an individual device schedule 67A. The device schedule 67A may include only the information relevant to the corresponding network device 34. Similarly, the router device 60 may have an individual device schedule 67B. Accordingly, the network device 34 may transmit and receive data according to the device schedule 67A without knowing the schedules of other network devices such as the schedule 67B of the device 60. To this end, the network manager 27 may manage both the overall network schedule 67 and each of the individual device schedules 67 (e.g., 67A and 67B) and communicate the individual device schedules 67 to the corresponding devices when necessary. Of course the device schedules 67A and 67B are subsets of and are derived from the overall or master network schedule 67. In other embodiments, the individual network devices 25 and 35-50A-B may at least partially define or negotiate the device schedules 67 and report these schedules to the network manager 27. According to this embodiment, the network manager 27 may assemble the network schedule 67 from the received device schedules 67A-B while checking for resource contention and resolving potential conflicts.

To optimally utilize the available wireless resources and to guarantee efficient and reliable delivery of data, the network manager 27 may further optimize scheduling decisions in view of routing or, alternatively, optimize routing in view of the scheduling decisions. In some particularly useful embodiments, the network manager 27 may conceptually combine routing concepts such as edges of directed graphs with scheduling resources such as timeslots and superframes to define links. The links may further include several distinct types such as dedicated links associated with a known pair of devices, shared links where least one of a transmitter or a receiver is not pre-assigned, broadcast and multicast links used for addressing multiple devices from a single source, etc. In these embodiments, the network manager 27 may efficiently use link resources by analyzing the topology of the network 14, forming a set of directed graphs to specify communication paths between pairs of network devices, defining superframes based on, in part, the update rates at the network devices, and sequentially allocating timeslots within the defined superframes to the directed connections between the devices to define a set of links specifying both the direction and the time of each data transmission. Additionally, each link may specify the channel on which a particular transmission occurs in those embodiments where the network 14 operates on several wireless channels. As discussed in detail below, the network manager 27 may thereby ensure that the network devices communicate both efficiently and reliably. For example, the network manager 27 may ensure that on a multi-hop communication path, a data packet spends as little time as possible before a transfer to the next hop in the path.

Figure 2:
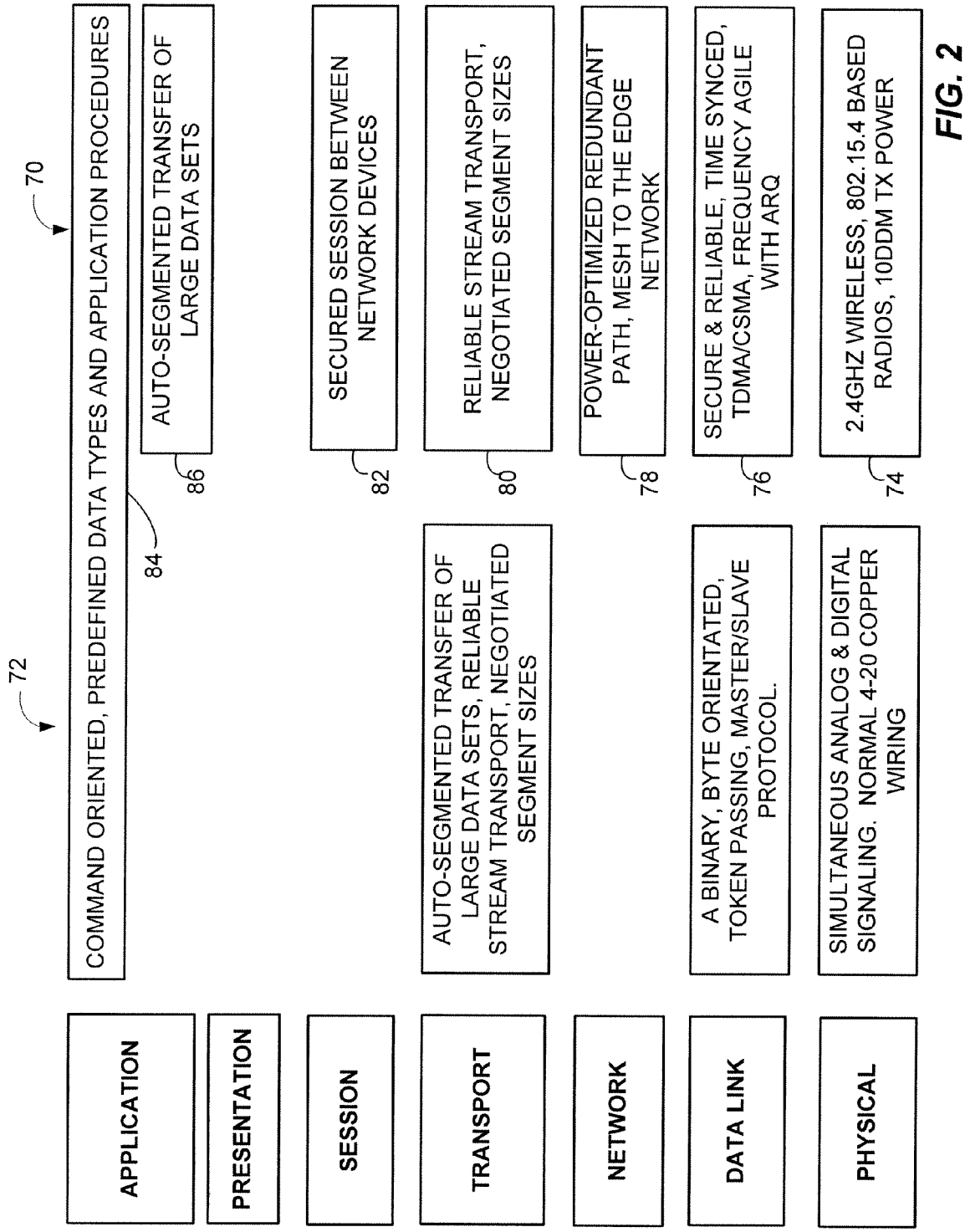
FIG. 2 is a schematic representation of the layers of a wireless HART protocol which may be used in the wireless network illustrated in FIG. 1.

The communication protocol supporting the wireless network 14 generally described above is referred to herein as the WirelessHART protocol 70, and the operation of this protocol is discussed in more detail with respect to FIG. 2. As will be understood, each of the direct wireless connections 65 may transfer data according to the physical and logical requirements of the WirelessHART protocol 70. Meanwhile, the WirelessHART protocol 70 may efficiently support communications within timeslots and on the carrier frequencies associated with the superframes defined by the device-specific schedules 67A, 67B.

FIG. 2 schematically illustrates the layers of one example embodiment of the WirelessHART protocol 70, approximately aligned with the layers of the well-known ISO/OSI 7-layer model for communications protocols. By way of comparison, FIG. 2 additionally illustrates the layers of the existing "wired" HART protocol 72. It will be appreciated that the WirelessHART protocol 70 need not necessarily have a wired counterpart. However, as will be discussed in detail below, the WirelessHART protocol 70 can significantly improve the convenience of its implementation by sharing one or more upper layers of the protocol stack with an existing protocol. As indicated above, the WirelessHART protocol 70 may provide the same or greater degree of reliability and security as the wired protocol 72 servicing a similar network. At the same time, by eliminating the need to install wires, the WirelessHART protocol 70 may offer several important advantages, such as the reduction of cost associated with installing network devices, for example. It will be also appreciated that although FIG. 2 presents the WirelessHART protocol 70 as a wireless counterpart of the HART protocol 72, this particular correspondence is provided herein by way of example only. In other possible embodiments, one or more layers of the WirelessHART protocol 70 may correspond to other protocols or, as mentioned above, the WirelessHART protocol 70 may or may not share even the uppermost application layer with any existing protocols. It is possible to use the stack of the WirelessHART protocol 70 as a network layer under other communication standards such as Foundation Fieldbus, Profinet, Modbus TCP, and Internet IP. In these cases the WirelessHART protocol 70 would be responsible for transferring real-time data, alarms, alerts, trends, and other information consistent with the HART communication standard.

As illustrated in FIG. 2, the wireless expansion of HART technology may add at least one new physical layer (e.g., the IEEE 802.15.4 radio standard) and two data-link layers (e.g., wired and wireless mesh) to the known wired HART implementation. In general, the WirelessHART protocol 70 may be a secure, wireless mesh networking technology operating in the 2.4 GHz ISM radio band (block 74). In one embodiment, the WirelessHART protocol 70 may utilize IEEE 802.15.4b compatible direct sequence spread spectrum (DSSS) radios with channel hopping on a transaction by transaction basis. This WirelessHART communication may be arbitrated using TDMA to schedule link activity (block 76). As such, all communications are preferably performed within a designated time slot. One or more source and one or more destination devices may be scheduled to communicate in a given slot, and each slot may be dedicated to communication from a single source device, or the source devices may be scheduled to communicate using a CSMA/CA-like shared communication access mode. Source devices may send messages to one or more specific target devices or may broadcast messages to all of the destination devices assigned to a slot.

Because the WirelessHART protocol 70 described herein allows deployment of mesh topologies, a significant network layer 78 may be specified as well. In particular, the network layer 78 may enable establishing direct wireless connections 65 between individual devices and routing data between a particular node of the wireless network 14 (e.g., the device 34) and the gateway 22 via one or more intermediate hops. In some embodiments, pairs of network devices 30-50A-B may establish communication paths including one or several hops while in other embodiments, all data may travel either upstream to the gateway device 22 or downstream from the gateway device 22 to a particular node.

To enhance reliability, the WirelessHART protocol 70 may combine TDMA with a method of associating multiple radio frequencies with a single communication resource, e.g., channel hopping. Channel hopping provides frequency diversity which minimizes interference and reduces multi-path fading effects. In particular, the data link 76 may create an association between a single superframe and multiple carrier frequencies which the data link layer 76 cycles through in a controlled and predefined manner. For example, the available frequency band of a particular instance of the WirelessHART network 14 may have carrier frequencies $F_1$, $F_2$, ... Fn. A relative frame R of a superframe S may be scheduled to occur at a frequency $F_1$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

The data link layer 76 of the WirelessHART protocol 70 may offer an additional feature of channel blacklisting, which restricts the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the WirelessHART network 14. In some embodiments, the WirelessHART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple WirelessHART networks 14, the network manager 27 may create an overall schedule for each instance of the WirelessHART network 14. The schedule may be organized into superframes containing time slots numbered relative to the start of the superframe. Additionally, the network manager 27 may maintain a global absolute slot count which may reflect the total of number of time slots scheduled since the start-up of the WirelessHART network 14. This absolute slot count may be used for synchronization purposes.

The WirelessHART protocol 70 may further define links or link objects in order to logically unite scheduling and routing. In particular, a link may be associated with a specific network device, a specific superframe, a relative slot number, one or more link options (transmit, receive, shared), and a link type (normal, discovery, broadcast, join). As illustrated in FIG. 2, the data link layer 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

With continued reference to FIG. 2, the transport layer 80 of the WirelessHART protocol 70 allows efficient, best-effort communication and reliable, end-to-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis. In contrast, reliable communications allow devices to send acknowledgement packets. In addition to guaranteeing data delivery, the transport layer 80 may order packets sent between network devices. This approach may be preferable for request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the WirelessHART network 14 to activate a new superframe. Alternatively, a field device such as the sensor 30 may generate a packet and propagate the request to another field device such as to the portable HART communicator 55. As another example, an alarm or event generated by the field device 34 may be transmitted as a request directed to the gateway device 22. In response to successfully receiving this request, the gateway device 22 may generate a response packet and send the response packet to the device 34, acknowledging receipt of the alarm or event notification.

Referring again to FIG. 2, the session layer 82 may provide session-based communications between network devices. End-to-end communications may be managed on the network layer by sessions. A network device may have more than one session defined for a given peer network device. If desired, almost all network devices may have at least two sessions established with the network manager 27: one for pairwise communication and one for network broadcast communication from the network manager 27. Further, all network devices may have one or more gateway session keys. In one particularly useful embodiment, each network device may have two gateway session keys for unicast and broadcast communications, respectively. The sessions may be distinguished by the network device addresses assigned to them. Each network device may keep track of security information (encryption keys, nonce counters) and transport information (reliable transport sequence numbers, retry counters, etc.) for each session in which the device participates. Finally, both the WirelessHART protocol 70 and the wired HART protocol 72 may support a common HART application layer 84. The application layer of the WirelessHART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Scheduling Communications

Figure 4:
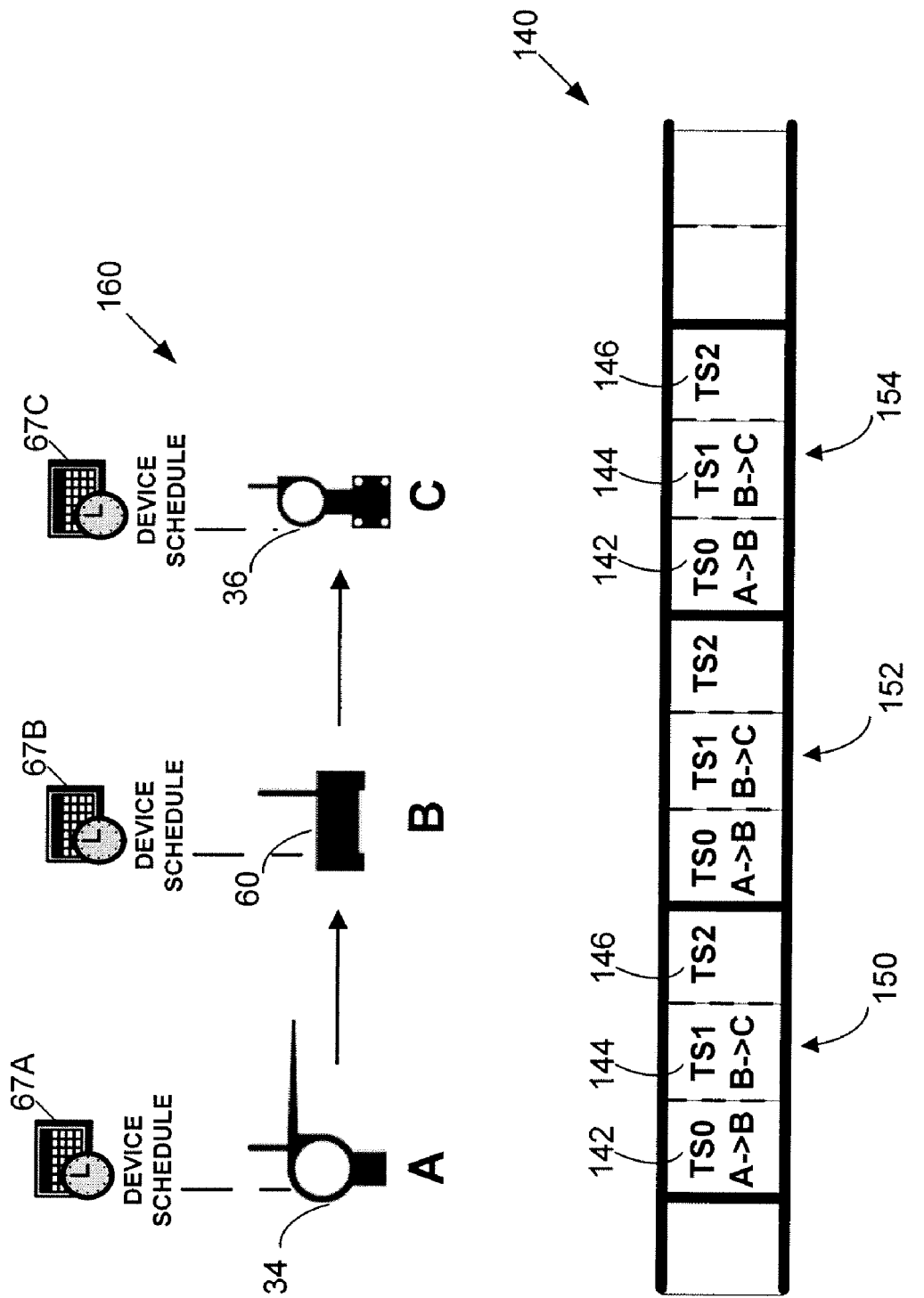
FIG. 4 is a block diagram that illustrates an exemplary association of timeslots of a three-slot superframe with several communicating devices.

FIGS. 3-6 provide a more detailed illustration of channel and timeslot resource allocation supported by the data link layer 76 and the network layer 78 of the WirelessHART protocol 70. As discussed above in reference to FIG. 1, the network manager 27 may manage the definition of one or more superframes and may associate individual timeslots within each of the defined superframes with one of the available channels (e.g., carrier frequencies). By way of one specific example, FIG. 3 illustrates a possible communication scheme within an individual timeslot, while FIG. 4 illustrates an example data exchange between several devices using the timeslots of a certain superframe. Next, FIG. 5 illustrates a possible association between an example timeslot and several available channels, and FIG. 6 is a schematic representation of several concurrent superframes which include the timeslots illustrated in FIGS. 3-5.

Referring specifically to FIG. 3, two or mode network devices may exchange data in a timeslot 100, which may be a dedicated timeslot shared by one transmitting device and one receiving device or a shared timeslot having more than one transmitter and/or one or more receivers. In either case, the timeslot 100 may have a transmit schedule 102 and a receive schedule 104. In other words, one or more transmitting devices may communicate within the timeslot 100 according to the transmit timeslot schedule 102 while one or more receiving devices may communicate within the timeslot 100 according to the receive timeslot schedule 104. Of course, the timeslot schedules 102 and 104 are substantially precisely synchronized and begin at the same relative time 106. Over the course of the timeslot 100, a transmitting network device sends a predetermined amount of data over a communication channel such as that defined by a particular carrier radio frequency. In some cases, the transmitting network device may also expect to receive a positive or negative acknowledgement within the same timeslot 100.

Thus, as illustrated in FIG. 3, the transmit timeslot schedule 102 may include a transmit segment 110 for transmitting outbound data, preceded by a pre-transmission segment 112, and may include a receive segment 122 for receiving an acknowledgement for the data transmitted during the segment 110. The transmit segment 110 may be separated from the receive segment 122 by a transition segment 116, during which the corresponding network device may adjust the hardware settings, for example. Meanwhile, the receive schedule 104 may include segments for performing functions complementary to those carried out in the segments 112-122, as discussed below.

In particular, the transmitting device may send out the entire packet or stream segment associated with a capacity of the timeslot 100 during the segment 110. As mentioned above, the network schedule 67 may include shared timeslots which do not exclusively belong to an individual device schedule 67A or 67B of one of the network devices 25 and 30-55. For example, a shared timeslot may have a dedicated receiver such as the gateway device 22 but no single dedicated transmitter. When necessary, one of the network devices 25-60 may transmit unscheduled information, such as a request for additional bandwidth, over the shared timeslot. In these cases, the potentially transmitting device may check whether the shared timeslot is available by performing Clear Channel Assessment (CCA) in a pre-transmission segment 112. In particular, the transmitting network device may listen to signals propagated over the communication channel associated with the timeslot 100 for the duration of the pre-transmission segment 112 to confirm that no other network device is attempting to use the timeslot 100.

On the receiving end of the timeslot 100, the receiving device may receive the entire packet associated with the timeslot 100 within a packet receive segment 114. As illustrated in FIG. 3, the packet receive segment 114 may begin at an earlier point in time than the transmit segment 110. If desired, the packet receive segment 114 may extend beyond the transmit segment 110 (not shown) to allow for slight timing mismatches. Next, the transmit timeslot schedule 102 requires that the transmitting device transition the radio mode in a transition segment 116. Similarly, the receive timeslot schedule 104 includes a transition segment 118. However, the segment 116 may be shorter than the segment 118 because the transmitting device may start listening for acknowledgement data early to avoid missing a beginning of an acknowledgement.

Still further, the transmit schedule 102 may include an acknowledgement receive segment 122 during which the transmitting device receives an acknowledgement transmitted during an acknowledgement transmit segment 124 associated with the receive schedule 104. The acknowledgement receive segment 122 may start prior to the acknowledgement transmit segment 124 and may, if desired, end later than the acknowledgement transmit segment 124 to reduce missing acknowledgments. The transmitting device may delete the packet transmitted during the transmit segment 110 from an associated transmit queue upon receiving a positive acknowledgement. On the other hand, the transmitting device may attempt to re-transmit the packet in the next scheduled dedicated timeslot or in the next available shared timeslot if no acknowledgement arrives or if the acknowledgement is negative.

Several timeslots 100 discussed above may be organized into a superframe 140, as schematically illustrated in FIG. 4. In particular, the superframe 140 may include a (typically) infinite series of superframe cycles 150-154, each cycle including a set of timeslots, illustrated in FIG. 4 as a timeslot 142 with a relative timeslot number 0 (TS0), a timeslot 144 with a relative timeslot number 1 (TS1), and a timeslot 146 with a relative timeslot number 2 (TS2). Accordingly, the size of the superframe 140 of FIG. 4 is three timeslots. In other words, each of the timeslots 142-146 of the superframe 140 repeats in time at an interval of two intermediate timeslots. Thus, for a 10 millisecond timeslot, the interval between the end of a timeslot with a particular relative slot number and the beginning of a next timeslot with the same relative slot number is 20 milliseconds. Conceptually, the timeslots 142-146 may be further grouped into superframe cycles 150-154. As illustrated in FIG. 4, each superframe cycle corresponds to a new instance of a sequence of timeslots 142-146.

The master network schedule 67 may associate transmission and reception opportunities of some of the network devices participating in the wireless network 14 with particular timeslots of the superframe 140. Referring again to FIG. 4, a network fragment 160 schematically illustrates a partial communication scheme implemented between the network devices 34, 60, and 36 of FIG. 1. To simplify the illustration of the superframe 140, the network devices 34, 60, and 36 are additionally designed in FIG. 4 as nodes A, B, and C, respectively. Thus, according to FIG. 4, the node A transmits data to the node B which, in turn, transmits data to the node C. As discussed above, each of the nodes A-C includes a device schedule 67A-C, which specifies the timeslots and channels (e.g., radio carrier frequencies) for transmitting and receiving data at the corresponding device. The master network schedule 67 may include part of all of the data information stored in the individual device schedules 67A-C. More specifically, the network manager 27 may maintain the master network schedule 67 as an aggregate of the schedules associated with each of the network devices 30-50A-B, including the device schedules 67A-67C.

In this example, the duration of the timeslot 100 (FIG. 3) may be 10 milliseconds and the network device A may report data to the device C every 30 milliseconds. Accordingly, the network manager 27 may set the length of the superframe 140 at three timeslots specifically in view of the update rate of the network device A. Further, the network manager 27 may assign the timeslot 142 with a relative number 0 (TS0) to the network devices A and B, with the device A as the transmitter and the device B as the receiver. The network manager 27 may further allocate the next available timeslot 144, having the relative slot number 1 (TS1), to be associated with the transmission from the device B to the device C. Meanwhile, the timeslot 146 remains unassigned. In this manner, the superframe 140 provides a scheme according to which the network manager 27 may allocate resources in the network fragment 160 for the transmission of data from the device A to the device C in view of the available wireless connections between the devices A, B, and C.

In the example illustrated in FIG. 4, the network device at node A may store information related to the timeslot 142 as part of its device schedule 67A. Similarly, the network device at node B may store information related to the timeslots 142 (receive) and 144 (transmit) as part of its device schedule 67B. Finally, the network device C may store information related to the timeslot 144 in the device schedule 67C. In at least some of the embodiments, the network manager 27 stores information about the entire superframe 140, including an indication that the timeslot 146 is available.

Importantly, the superframe 140 need not be restricted to a single radio frequency or other single communication channel. In other words, the individual timeslots 142-146 defining the superframe 140 may be associated with different radio frequencies on a permanent or floating basis. Moreover, the frequencies used by the various devices need not always be adjacent in the electromagnetic spectrum. In one embodiment, for example, the timeslot 142 of each of the superframe cycles 150-154 may be associated with a carrier frequency $F_1$ and the timeslot 144 of each of the superframe cycles 150-154 may be associated with a carrier frequency $F_2$, with the frequencies $F_1$ and $F_2$ being adjacent or non-adjacent in the electromagnetic spectrum.

In another embodiment, at least some of the timeslots 142-146 may move about the allocated frequency band in a predefined manner. FIG. 5 illustrates an example association of the timeslot 144 of FIG. 4 with channels 172-179 (corresponding to frequency sub-bands $F_1$-$F_5$) in the available frequency band 170. In particular, each of the channels 172-179 may correspond to one of the center frequencies $F_1, F_2, \ldots F_5$ which preferably differ from their respective neighbors by the same offset. The channels 172-179 may form a continuous section of the spectrum covering the entire available frequency band 170, although the channels 172-179 need be contiguous or form a continuous band in all embodiments. The superframe 140 may use at least a portion of the frequency band 170, so that one or more of the timeslots 142-146 are scheduled on different carrier frequencies in at least two consecutive cycles.

As illustrated in FIG. 5, the timeslot 144 may use the channel 176 (frequency $F_3$) during the frame cycle 150, may use the channel 174 (frequency $F_4$) during the frame cycle 152, and may use the channel 178 (frequency $F_2$) during the frame cycle 154. The timeslot 144 may then "return" to the channel 176 in the next superframe cycle 150A, which may similar to the cycle 150. Each of the specific associations of the timeslot 144 with one of the channels 172-179 is illustrated as a timeslot/channel tuple 144A-C. For example, the tuple 144A specifies the timeslot 2 scheduled, in the cycle 150, on the channel 176 associated with the center frequency $F_3$. Similarly, the tuple 144B specifies the timeslot 2 scheduled, in the cycle 152, on the channel 174 associated with the center frequency $F_4$. Meanwhile, the channel 172 associated with the center frequency $F_5$ may not be assigned to the timeslot 2 during any of the cycles 150-152. However, a different timeslot of the superframe 140 such as the timeslot 146, for example, may be associated with the channel 172 during one or more of the cycles 150-152.

In this example, the frequency assignment associated with the superframe cycle 150 may repeat immediately following the cycle 154 (illustrated as a cycle 150A in the FIG. 5), and the timeslot 144 may again correspond to the tuple 144A after two cycles of the superframe 140. Thus, the timeslot 144 may regularly cycle through the channels 176, 174, and 178. It will be appreciated that the timeslot 144 may similarly cycle through a greater or smaller number of channels irrespective of the length of the superframe 140, provided, of course, that enough channels are available in the frequency band 170. The association of a single timeslot with multiple channels during different superframe cycles, discussed above with respect to FIG. 5 and referred to herein as "channel hopping," significantly increases the reliability of the wireless network 14. In particular, channel hopping reduces the probability that a pair of devices, scheduled to communicate in a particular timeslot of a certain superframe, fail to transmit and receive data when a certain channel is jammed or otherwise unavailable. Thus, for example, the failure of the channel 174 prevents the devices using the timeslot 144 from communicating in the frame cycle 152 but not during the frame cycles 150 or 154.

Referring again to FIG. 4, the device schedules 67B and 67C may include the information regarding each of the tuples 144A-144C discussed above in reference to FIG. 5. In particular, each of the device schedules 67B and 67C may store an assignment of the timeslot 144 to one of the channels 172-179 within each of the cycles 150-152. The master network schedule 67 (FIG. 1) may similarly include this information. Meanwhile, the device schedule 67A need not necessarily include the information related to the timeslot 144 because the corresponding node A (the device 34) does not communicate during the timeslot 144 of the superframe 140. In operation, the devices 60 and 36 corresponding to the nodes B and C may prepare for data transmission and reception, respectively, at the beginning of each timeslot 144. To determine whether the timeslot 144 currently corresponds to the tuple 144A, 144B, or 144C, the devices 60 and 36 may apply the global absolute slot count to determine whether the timeslot 144 is currently in the frame cycle 150, 152, or 154.

In the process of defining the network schedule 67, the network manager 27 may define multiple concurrent superframes in view of the update rates of the network devices 25 and 35-50A-B. As illustrated in FIG. 6, the network schedule 67 may include the superframe 140 of length three as well superframes 190 and 192. The superframe 190 may be a five-slot superframe and the superframe 192 may be a four-slot superframe, although the different superframes may have a different number of slots and various different superframes may have the same number of slots. As illustrated in FIG. 6, the superframes need not necessarily align with respect to the relative slot numbers. In particular, at a particular time 194, the superframe 190 may schedule the timeslot with the relative number two (TS2) while the superframes 140 and 192 may schedule the timeslots with the relative number one (TS1). Preferably, the superframes 140, 190, and 192 are time-synchronized so that each transition to a new timeslot within each of these superframes occurs at the same time.

Each of the superframes 140, 190 and 192 may be primarily associated with, or "belong to" an individual one of or a subset of the network devices 30-50A-B. For example, the superframe 140 illustrated in FIG. 4 may belong to the node A (i.e., the network device 34), and the length of the superframe 140 may be advantageously selected so that the node A sends out measurement data to the node B during the timeslot 142 (TS0) once during each of the cycles 150-154. In case the wireless network 14 defines 10 millisecond timeslot, the node A sends data to the node B once every 30 milliseconds. If, however, the node A is reconfigured to report measurements once every 50 milliseconds, the network manager 27, alone or in cooperation with the node A, may reconfigure the frame 140 to have a length of five timeslots instead. In other words, the length of each superframe may reflect a particular transmission requirement of a particular network device 30-50A-B.

On the other hand, more than one network device 30-50A-B may use a superframe for transmitting or receiving data. Referring again to FIG. 4, the node B (the network device 60) may regularly transmit data to the node C (the network device 36) in the timeslot 144 of the superframe 140, although the superframe 140 may be primarily associated with the node A. Thus, different timeslots of a particular superframe may be used by different network devices to originate, route, or receive data. In a sense, the timeslots of each superframe may be understood as a resource allocated to different devices, with a particular priority assigned to the device that "owns" the superframe. Further, it will be appreciated that each network device may participate in multiple superframes. For example, the network device 34 in FIG. 4 may route data on behalf of other network devices (e.g., the network device 32 illustrated in FIG. 1), in addition to propagating its own data via the router device 60. Preferably, a device participating in multiple superframes does not schedule simultaneous communications in different superframes. While only three superframes are illustrated in FIG. 6, the wireless network 14 of FIG. 1 may include any number of superframes, with each of the different superframes having any desired or useful length based on the types and frequencies of communication being performed in or between particular devices and set of devices.

As indicated above, the ASN counter 68 (see FIG. 1) may reflect the total number of timeslots consecutively scheduled since the activation of the wireless network 14. In other words, only those timeslots which occur following another timeslot affect the ASN count, and the number of concurrently scheduled superframes has no impact on the ASN value. To further outline the operation of the ASN counter 68, FIG. 6A illustrates a schedule 200 including several concurrent superframes 202-206 created at or after a network start time 208. The superframe 202 may be a four-timeslot superframe in which the relative slot numbers iterate from zero to three. Similarly, the superframe 204 may similarly start at the network start time 260 but include eight timeslots numbered zero through seven. On the other hand, the superframe 206 may be created at a later time when a new network device joins the wireless network 14, for example, or when the network manager 27 allocates temporary resources for a special purpose such as to accommodate a block mode transfer. The values which the network manager 27 may assign to the ASN counter 68 during the operation of the network schedule 200 are generally indicated as a sequence 210. It will be noted that the value of the ASN counter 68 increases with every new timeslot irrespective of a superframe with which the timeslot is associated.

The methods described above with respect to FIGS. 1-6 may be applied to a process control system, for example, in which various devices report measurements or other data according to individual device schedules, as well during occasional, frequently unpredictable, data "bursts."

Routing Techniques

As generally discussed above in reference to FIG. 1, it is important to consider the location of the network devices 30-50A-B so that the wireless network 14 can establish itself in an efficient and reliable form. In some cases, it may be necessary to add routers 60 in those locations where plant equipment could block or seriously affect a wireless connection or where network devices are spaced far apart from one another. Thus, in this and in similar situations, it is desirable that the wireless network 14 be "self-healing," i.e., capable of automatically addressing at least some of the delivery failures. To meet this and other design requirements, the wireless network 14 may define redundant paths and schedules so that in response to detecting a failure of one or more direct wireless connections 65, the network 14 may route data via an alternate route. Moreover, the paths may be added and deleted without shutting down or restarting the wireless network 14. Because some of the obstructions or interference sources in many industrial environments may be temporary or mobile, the wireless network 14 may be capable of automatically reorganizing itself. More specifically, in response to one or more predetermined conditions, pairs of network devices (e.g., 32 and 34, 60 and 36, etc.) may recognize each other as neighbors and thus create a new direct wireless connection 65 or, conversely, dissolve the existing direct wireless connections 65. Additionally, the network manager 27 may create, delete, or temporarily suspend paths between non-neighboring devices.

Irrespective of whether a particular network configuration is permanent or temporary, the wireless network 14 generally requires a fast and reliable method of routing data between nodes. In one possible embodiment, the network manager 27 may analyze the information regarding the layout of the network, the transmission capability and update rate of each network device 32-50A-B, as well as other relevant information. The network manager 27 may then define routes and schedules in view of these factors. When defining routes and schedules, the network manager 27 may recognize the wireless network 14 as conforming to one of several network topologies compatible with the routing and scheduling techniques of the present disclosure.

FIGS. 7-9 schematically illustrate some of these network topologies. For the sake of clarity, each of FIGS. 7-9 illustrates bidirectional connections between pairs of devices. However, it will be appreciated that each of the topologies illustrated in FIGS. 7-9 is also compatible with unidirectional connections or mixed bidirectional and unidirectional connections (i.e., including both bidirectional and unidirectional connections). Moreover, each connection illustrated in FIGS. 7-9 may support several unidirectional connections in one or both directions, with each unidirectional connection associated with a particular time of transmission, for example. Referring specifically to FIG. 7, a network 250 may have a star network topology. The star network 250 includes a routing device 252 and one or more end devices 254. The routing device 252 may be a network device arranged to route data while the end device 254 may be a network device arranged to send data only on its own behalf and to only receive (or decode) data addressed to the end device 254. Of course, the routing device 252 may also be a recipient and originator of data and may perform routing functions in addition to other tasks. As illustrated in FIG. 7, end devices 254 may have a direct connection 265 to the routing device 252 but end devices 254 cannot be connected directly in a star topology. The direct connection 265 may be a direct wireless connection 65 or a wired connection.

The end device 254 may be the same type of physical device as the routing device 252 and may be physically capable of routing data. The routing capability of the end device 254 may be disabled during the installation of the end device 254 or in operation of a corresponding network (such as the WirelessHART network 14). Moreover, the routing capability of the end device 254 may be disabled by the end device 254 itself or by a dedicated service such as the network manager 27. In some sense, the star network 250 corresponds to the simplest of possible topologies. It may be appropriate for small applications that require low power consumption and low latency. Additionally, it will be noted that the star network 250 is deterministic because there is only one possible route between the routing device 252 and a particular end device 254.

Now referring to FIG. 8, a network 270 is arranged in a mesh network topology. Each network device of the mesh network 270 is a routing device 252. Mesh networks provide a robust network with multiple paths between various devices. In wireless applications, mesh networks are better able to adapt to changing radio environments. For example, the device 274 of the network 270 may send data to the device 276 via an intermediate hop 278 or an intermediate hop 280, provided that the corresponding paths 282-288 allow transmission in this direction. As illustrated in FIG. 8, both a path 282 and a path 284 enable the routing device 274 to send data to the routing device 276, providing redundancy and thus improved reliability to the network 270.

Another type of network topology is illustrated in FIG. 9. The network 290 incorporates elements of both star and mesh topologies. In particular, the star mesh network 290 includes several routing devices 252 (labeled "R") and end devices 254 (labeled "E"). The routing devices 252 may be connected in a mesh format and may support redundant paths. The selection of a particular topology may be performed automatically by a network component, such as the network manager 27, or by a user configuring the network. In particular, the user may choose to override the topology selected by the network manager 27 or the default topology associated with the WirelessHART protocol 70. It is contemplated that in most applications, mesh topology may be the default topology because of the inherent reliability, efficiency, and redundancy of this topology. Clearly, because WirelessHART devices may act as router devices, several different configurations may be compatible with the same physical disposition of field devices and routers.

Both source routing and graph routing may be applied to the topologies discussed in reference to FIGS. 7-9. Although both types of routing may be equally useful in different situations, graph routing will be discussed first. Generally, in mathematical theories and applications, a graph is a set of vertices (nodes such as 252 or 254) and edges (direct connections 65 or 265). The WirelessHART protocol 70 or another protocol servicing the wireless network 14 may use graphs to configure paths connecting communication endpoints such as the device 30 to the gateway 22 illustrated in FIG. 1, for example. In some embodiments, graphs and the associated paths are configured by the network manager 27. The network manager 27 may also configure individual network devices such as field devices 30-40, routers 60, etc. with partial graph and path information, which may be stored in the connection tables 69. The wireless network 14 may contain multiple graphs, some of which may overlap. Further, a certain network device may have paths of multiple graphs going through the device, and some of the paths may direct data to the same neighbor of the device. Preferably, every graph in a network is associated with a unique graph identifier.

The protocol servicing the wireless network 14 (such as the WirelessHART protocol 70) may be configured to operate with a number of different topologies to support various application requirements. As a result, the wireless network 14 may concurrently support several methods of routing, such as unidirectional graph routing and source routing, for example. Although the forthcoming examples of a wireless network support these two approaches, it will be appreciated that the wireless network 14 may additionally support bidirectional graph routing, or may route data using only one of these techniques. However, irrespective of a type and number of concurrent routing techniques, each device on the wireless network 14 may be assigned a unique network address. Once every potential receiver of data acquires some form of unambiguous identification with respect to other network elements, decisions related to routing may be made by individual devices such as field devices 30-40, by a centralized dedicated service such as the network manager 27, or by individual devices acting in cooperation with the centralized service. As indicated above, at least one possible implementation of the wireless network 14 may rely on the network manager 27 to carry out most or all of the routing decisions and to communicate the relevant data to the network devices 30-50A-B to be stored in the connection tables 69. Further, routing decisions can be made at the originating point (i.e. at the source of a data packet) or at a centralized location. Moreover, routing decisions can be adjusted at each intermediate stop, or "hop," in the path of the packet from the source to a destination.

In the examples discussed below, a wireless network provides at least two approaches to routing that may be selected according to the specific requirements and conditions of a given system, such as the physical layout of the network elements that make up the system, the number of elements, the expected amount of data to be transmitted to and from each element, etc. Moreover, the two approaches may be used by the wireless network at the same time and each may be selectively applied to a particular type of data or to a particular host or a set of hosts in view of certain aspects of performance of each of the two approaches. For example, a measurement of a process variable or a command to open a valve may tolerate a relatively small delay in delivery and the wireless network 14 may accordingly apply the faster and the more reliable of the two methods. Meanwhile, a device configuration command or a response may tolerate a longer delay and may be suitable for the other approach.

As briefly indicated above, it is common for a certain distributed control networks and, in particular, to networks connecting devices in the process control industry, to direct data to a certain device for management, diagnostic, log collection, and other purposes. FIGS. 10-12 illustrate several perspectives of a wireless network 300 which implements data transfer in two general directions: toward a gateway 305A or 305B (referred to herein as the "upstream" direction) and away from the 305A or 305B (referred to herein as the "downstream" direction). For security reasons, the network 300 does not allow direct data transfer between peer field devices although the technique described herein could be used in such a situation if so desired.

FIG. 10 illustrates upstream routing in the network 300. In particular, the network manager 302A (or the stand-by network manager 302B) may define several directed graphs, each graph including either the gateway device 305A or a second gateway device 305B as the terminal node. In other words, the paths of each graph in the exemplary network 300 lead to and terminate at one of the two gateway devices 305A or 305B. Specifically, a graph 310 (shown in solid bold arrows) may include network devices 312, 314, 316, 318, and the gateway 305A wherein the paths associated with the graph 310 may include direct wireless connections 320, 322, 324, 326, and 328. A graph 340 (shown in dotted bold arrows) may include network devices 312, 316, 318, 342, and the gateway 305B, with a path that includes direct wireless connections 344, 346, 348, 350, and 352. In the directed graph 310, the network device 312 may be called the head of the directed graph 310 and the gateway device 305A may be called the tail of the directed graph 310. Similarly, the network device 312 is the head of the directed graph 340 and the gateway device 305B is the tail of the directed graph 340. The network manager 302A or, under certain operating conditions, a backup network manager 302B may define the graphs 310 and 340 and may communicate complete or partial definitions of these graphs 310 and 340 to the network devices 312-318 and 342. As discussed above in reference to FIG. 1, the network devices 312-318 and 342 may maintain up-to-date versions of the connection tables 69 storing these partial path definitions. In some embodiments, the gateway devices 305A-B may not require the information regarding the graphs 310 and 340 if the corresponding communication path terminates at one of the gateway devices 305A-B. However, it will be appreciated that the gateway devices 305A-B may also originate data and may store information regarding one or more graphs with paths originating at the gateway devices 305A-B. It will be further noted that, in general, a path of a certain graph may traverse the gateway device 305A or 305B as an intermediate node. However, the exemplary network 300 defines paths that always either originate or terminate at one of the gateway devices 305A or 305B.

To send a data packet along a certain graph, a source network device may include an identifier of the graph in the header or trailer of the data packet. The data packet may travel via the paths corresponding to the graph identifier until it either reaches its destination or is discarded. To be able to route packets in the graph 310, for example, a connection table 69 of each network device that belongs to the graph 310 may contain entries that include the graph identifier and address of a neighbor network device which (1) belongs to the same graph, and (2) is one hop closer to the destination. For example, the network device 316 may store the following connection table:

| GRAPH IDENTIFIER | NODE |
|---|---|
| GRAPH_310 | 318 |
| GRAPH_340 | 318 |
| GRAPH_340 | 342 | while the network device 342 may store the following information in the connection table:

| GRAPH IDENTIFIER | NODE |
|---|---|
| GRAPH_340 | 305B |

While the exemplary connection tables above simply list the devices associated with a particular entry, it will be noted that the NODE column of the connection table may store the address of the neighboring device as defined in the addressing scheme of the network 300 or WirelessHART network 14.

In another embodiment, the NODE column may store the nickname of the neighboring device, an index into an array storing full or short addresses of the neighbors, or any other means of unambiguously identifying a network device. Alternatively, the connection table may store graph identifier/wireless connection tuples as illustrated below:

| GRAPH IDENTIFIER | CONNECTION |
|---|---|
| GRAPH_310 | 326 |
| GRAPH_340 | 346 |
| GRAPH_340 | 348 |

In other words, the connection table may list one or more direct wireless connections 65 corresponding to a particular graph. The network device 316 may, for example, consult the connection table and transmit a packet carrying the graph identifier 340 via the direct wireless connection 346 or 348.

As illustrated in FIG. 10 and in the tables above, redundant paths may be set up by having more than one neighbor associated with the same graph identifier. Thus, a data packet arriving at the network device 316 and containing the graph identifier 340 in the header or trailer may be routed to either the network device 318 or to the network device 342. While executing a routing operation, the network device 316 may perform a lookup in the connection table by the graph identifier 340, and send the packet to either (or both) of the network devices 318 or 342. Moreover, the routing selection between two or more possible hops may be random or may be carried out according to a predefined algorithm. For example, the selection may be made in consideration of a load balancing objective or in view of the delivery statistics. Thus, the network device 316 may learn, through a peer network device or from the network manager 27, that selecting the network device 318 as the next hop while routing packets along the graph 340 has a lower probability of delivering the packet successfully or has a longer expected or average delay in delivery. The network device 316 may then attempt to route more or possibly all of the packets associated with the graph 340 to the network device 342.

In one embodiment, a neighbor device acknowledges the receipt of a data packet by sending a confirmation packet. In the example above, once the neighboring network device 318 or 342 acknowledges receipt of the packet, the network device 316 may immediately release it. If, on the other hand, the acknowledgement is not received within a predefined time period, the network device 316 may attempt to resend the packet or to route the packet via the alternate hop or path. Additionally, the network device 316 may collect statistics of both successful delivery attempts and of failed delivery attempts. The subsequent routing decisions, such as selecting between the hops 318 and 342, may include or be based on the adjusted statistical data. Of course, the network device 316 may apply the statistics related to network devices 318 and 342 to other relevant graphs and may also communicate the statistics to other network devices, either directly or via the network manager 27.

As discussed above, in the graph routing approach, a network device sends packets with a graph identifier in a network header along a set of paths to the destination. Importantly, a graph identifier alone is sufficient for routing packets and, while other routing information may be also included in the header, each packet can be properly delivered based solely on the graph identifier. All network devices on the way (i.e., on the path) to the destination may be pre-configured with graph information that specifies the neighbors to which the packets may be forwarded. Because graph routing requires pre-configuration of intermediate network devices for each potential destination, graph routing may be better suited for communications from a network device to a gateway and from a gateway to a network device.

Now referring to FIG. 11, the network manager 302A or 302B may also support routing downstream with respect to one or both of the gateways 305A-B. In particular, a graph 380 (shown in solid bold arrows) may include the nodes 305A, 315, 314, and 312, and the direct wireless connections 382-386. The gateway device 305A is the head of the graph 380 and wireless device 312 is the tail of the graph 380. Meanwhile, a graph 390 (shown in dotted bold arrows) may similarly connect the gateway device 305A to the wireless device 312, with the gateway device 305A as the head of the graph 390. However, the graph 390 may include the nodes 305A, 318, 342, 316, and 312, and the direct connections 392-298. Thus, to send a data packet to the wireless device 312, the gateway device 305A may include a graph identifier in the header or the trailer of the data packet which corresponds to either the graph 380 or 390. It will be appreciated that each of the graphs 380 or 390 may also include duplicate connection paths to ensure reliability and that, in general, the network manager 302A or 302B may use techniques similar to those discussed above in reference to FIG. 10. Also, it will be noted that the connection table 69 of each of the wireless devices 312-318 and 342 may include graph route information related to both downstream and upstream graphs used for routing purposes.

As illustrated in FIG. 12, the wireless network 300 may additionally use source routing. In source routing, pre-configuration of the relaying devices is not necessary. To send a packet to its destination using source routing, the source network device may include, in the header of a data packet, for example, an ordered list of devices through which the data packet must travel. The ordered list of devices may effectively define a communication path for the data packet. As the packet traverses the specified path, each routing device may extract the next node address from the packet to determine where the data packet should travel next, i.e., where the next data packet should be sent in the next hop. Consequently, source routing requires advance knowledge of the topology of the network 14. If, however, a certain network device does not find itself on the routing list, the network device may send the packet back to the first device specified in the source routing list. Source routing allows packets to go to an arbitrary destination without an explicit or preconfigured setup of intermediate devices.

For example, the network device 312 may send a packet to the gateway device 305A by specifying the complete path in the packet header or the packet trailer. As illustrated in FIG. 12, the network device 312 may generate a list 410 containing the addresses of network devices 314, 315, and 305A and send the list 410 along with the packet to the first hop or device on the list, i.e., the network device 314. The network device 314 may then traverse the list 410, locate the identity of the network device 314, extract this field from the list 410, identify the network device 315 as the next hop for the received packet, and finally send the data packet to the network device 315. The source routing list may reside in the optional area of the network header, and may be of variable size depending on number of hops to the destination. Similarly, the network device 315 may traverse the list 410, locate its own address or identity, and send the data packet to the next hop or device in the list 410 (in this case, the gateway device 305A).

In general, only those network devices that have obtained full network information from the network manager 27 or 302A-B use source routing because only the network manager 27 or 302A-302B knows the complete topology of the network. An additional limitation of source routing is that it provides no redundancy at intermediate network devices because each packet is originated with a header or a trailer that explicitly specifies each intermediate hop and does not provide any routing alternatives. Thus, if one of the intermediate network devices fails to relay the packet as specified by the packet header or trailer, the delivery of the packet fails. It is therefore the responsibility of the network manager 27 or 302A-302B to detect the failure and reprogram or reconfigure the source with an alternate route. To facilitate the detection of such error cases, the wireless network 14 or 300 may require network devices to send a routing failure notification to the network manager 27 or 302A-302B. Accordingly, a protocol such as the WirelessHART protocol 70 may provide a message type or an information element in the protocol definition for reporting this and other types of delivery failures. In another embodiment, the routing list 410 (referring to FIG. 12) may specify alternate routes in addition to the route selected by the sender. In yet another embodiment, primary and one or more alternate routes may be partially merged to avoid duplication of common parts of the path in the packet header or trailer.

Referring generally to FIGS. 1, 3, and 10-12, the network manager 27 or 302A-302B may maintain a list of all devices in the network. The network manager 27 or 302A-B may also contain the overall network topology including a complete graph of the network and the up-to-date portions of the graph that have been communicated to each device. The network manager 27 or 302A-302B may generate the route and connection information using the information that the network manager 27 receives from the network devices 30-40, 50A-B, 60, 55, etc. The network manager 27 or 302A-302B may then build the graph of the network from the list of network devices and the neighbors reported by each network device. Referring back to FIG. 1, for example, the network device 50B may report "seeing" the neighbor devices 60 and 34. The network manager may be also responsible for generating and maintaining all of the route information for the network. In one embodiment, there is always one complete network route and several special purpose routes which are used to send setpoint and other settings from the gateways 305A or 305B to the final control commands (FIGS. 7-9). Further, broadcast routes (which flow through most or all of the devices in the network) may be used to send broadcast messages from the network manager 27 or 302A-B to all of the devices of the network 14 or 300. Still further, the network manager 27 or 302A-302B may also carry out the scheduling of network resources once the routing information and burst mode update rates are known.

When devices are initially added to the network 14 or 300, the corresponding network manager may store all neighbor entries as reported from each network device. The network manager 27 or 302A-302B may use this information to build an initial complete network graph 66 and to revise the graphs during operation. The network graph 66 is put together optimizing several properties including hop count, reporting rates, power usage, and overall traffic flow as reflected by the statistics gathering discussed above. One key aspect of the topology is the list of connections that connect devices together. Because the presence and health of individual connections may change over time, the network manager 27 or 302A-302B may be additionally programmed or configured to update the overall topology, which may include adding and deleting information in each network device. In some embodiments, only the network manager 27 or 302A-302B and the gateway 22 or 302A-302B may know enough information to use source routing. More specifically, it may be desirable to prevent peer-to-peer communication between any two arbitrary devices for security purposes. Moreover, while graph and source routing have been described herein as occurring between a field device and a gateway device, both of these types of routing can be used between any two devices in the network, including, for example, between any two field or network devices in the network any two gateway devices, etc.

In short, graph routing may direct traffic both upstream and downstream with respect to the network manager 27 or gateway 22 and both graph and source routes can be optimized to satisfy applications with low latency requirements, which includes measurement information that is transferred from network devices to the gateway and control information that is transferred from gateway devices to final control commands such as regulating valves, on-off valves, pumps, fans, dampers, as well as motors used in many other ways.

In some embodiments, path redundancy may be a matter of policy of the network manager 27 or 302A-302B rather than a coincidental overlap of graphs. In other words, the network manager 27 or 302A-302B may attempt to define at least two neighbors for each device. Thus, the network manager 27 or 302A-302B may be configured to actively pursue a mesh or a star mesh topology. The supporting protocol, such as the WirelessHART protocol 70, may thus provide a very high end-to-end data reliability. From the physical perspective, each field device or other network device should he within communication range of at least two other devices that can receive messages from the field device and forward these messages.

The network manager 27 or 302A-302B may additionally verify each graph definition in order to ensure that no loops have been formed. In those embodiments where the network manager 27 or 302A-302B actively pursues path redundancy and defines many graphs of various size, a communication path may be sometimes erroneously defined to direct data packets from a source back to the same source. In accordance with such faulty graph definition, a packet may be routed back to the source directly from the source or may visit one or more intermediate hops prior to arriving back at the source. Loop verification may be performed each time the topology of the associated network changes, such as due to an addition or removal of a device, or whenever the network manager 27 adjusts the routing graphs and schedules for any reason. Alternatively, the network manager 27 may perform loop checking periodically as a background task.

Combining Routing and Scheduling Decisions

In a wireless network such as the wireless network 14 or 300, the same graph route may be used with several schedules. In particular, a packet may be transmitted along the same route while the network schedule changes and the time at which the packet is sent from and to a certain node is updated. In this sense, routing and scheduling may be conceptually and functionally separate to facilitate network management. On the other hand, however, the network manager 27 may execute routing and scheduling substantially in parallel to achieve robustness and improve the performance and reliability of the wireless network 14 or 300. More specifically, the network manager 27 may make at least some scheduling decisions in view of the relevant routing constraints and, conversely, make routing decisions in view of the scheduling constraints. In some particularly useful embodiments, the network manager 27 may analyze the topology of the network 14 or 300 first, construct the network graph 66, and then proceed to build a network schedule 67 in view of the network graph 66 and device-specific parameters such as transmission rate, power capability, etc.

When making scheduling decisions in view of a network topology, the network manager 27 may conceptually combine a timeslot in a particular superframe with an edge of a particular direct graph (which is a direct connection 65 in the examples discussed herein) to define a convenient combination space and time unit, i.e., a link. In particular, a link may be associated with a direct connection 65 between two communication endpoints as well as with a time during which these two communication endpoints exchange data.

Further, the network manager 27 may associate slots with several types corresponding to different principles of allocating and using the slots. In particular, a dedicated unicast link may be shared by a particular pair of network devices 32-50A-B, so that one of the pair of network devices transmits information to the other one of the pair of network devices with a specified timeslot. Of course, as discussed above with respect to FIG. 3, a network device transmitting certain information during a timeslot may also receive a corresponding acknowledgement from the device receiving this information and in this sense, each of the pair of network devices acts as a transmitter and a receiver in the course of a single timeslot. However, for the sake of simplicity, the device transmitting a block of information in a timeslot is referred to herein as a "talker" and the device receiving this block of information accordingly is referred to as a "listener."

In contrast to a dedicated link, a shared link may have more than one talker but only one listener. In a sense, a shared link is still a unicast link because this link has only one listener. On the other hand, broadcast and multicast links may have one talker and many listeners. Further, directed links have one talker and a limited set of listeners.

In another aspect, a particular network device may view a dedicated, shared, directed, or broadcast link as a transmit link or as a receive link. Referring back to FIG. 10, for example, the wireless devices 312 and 314 may share a dedicated link associated with some particular timeslot and the direct wireless connection 320, so that the wireless device 312 transmits data via this link and the wireless device 314 receives data via this link. Accordingly, the wireless device 312 may consider this link a transmit link whereas the wireless device 314 may consider the same link a receive link. Thus, classification of links into transmit and receive links is a matter of a device perspective. It will be also noted that some links may be defined and used as transmit/receive links if the devices at either end of a graph edge associated with the link transmit information at some point during the corresponding timeslot.

As indicated above, each link may be associated with a certain timeslot irrespective of a link type. In operation of the wireless network 14 or 300, the network manager 27 or 302A-302B may assign links to network devices 30-50A-B, 312, 314, 316, 318, etc. Depending on the link type, the network device associated with the link may transmit a packet, receive a packet, or remain idle. A network device that operates with a transmit link or a transmit/receive link may send a packet within the appropriate segment of the link if the destination of the packet matches the one or more neighbors on the other end of the link. On other hand, a network device that has a receive link, or a transmit/receive link with no packet to send, listens for one or more incoming packets within the timeslot associated with the link. In those embodiments that also use shared links, a device preferably performs a clear channel assessment (CCA) or another method of preventing resource contention before the device begins to transmit via a shared link. In at least some embodiments, all devices that participate in either dedicated or shared links must be awake and listening during the timeslots associated with these dedicated or shared links.

As explained above in reference to FIG. 3, in the course of a single timeslot, one network device may send a data packet and another device may reply with an acknowledgement. Similarly, a communication session via a link may include transmission of a data packet and of an acknowledgement which may be positive ("ACK") or negative ("NACK"). In general, a positive acknowledgement may indicate that the receiver has successfully received the data packet and has assumed ownership of the data packet for further routing if the receiver is not the final destination for this packet. Meanwhile, a negative acknowledgement may indicate that the receiver cannot accept the data packet at this time but has detected the packet with no errors. Further, both ACK's and NACK's may carry timing information so that the corresponding devices may properly maintain network synchronization. In some embodiments, packets sent to a unicast network device address may require a link-layer acknowledgement within the same timeslot while packets sent to a broadcast network device address (e.g., 0xFFFF) may not require an acknowledgement.

When the network manager 27, for example, defines direct connections 65 between network devices 30-50A-B, these network devices receive link assignments. The devices may accordingly define and maintain the respective device schedules 67 (see FIGS. 1 and 4). A link assignment may specify, in part, how the network device should use a certain slot in a superframe. Thus, each link may include exactly one timeslot, type assignment (i.e., transmit and/or receive), neighbor information or other data identifying the edge of a bidirectional or unidirectional graph with which the link is associated, and additional transmit and/or receive attributes.

In some embodiments, the device schedule 67A, 67B of each network device 30-50A-B may maintain additional flags or indicators to properly maintain links of various types. For example, a device schedule 67A, 67B may set a shared flag for each shared link so that the corresponding network device 30-50A-B may properly access this link for transmissions. Further with respect to shared links, the network 14 or 300 may use the well-known slotted Aloha contention management algorithm to define the lifecycle of shared link. Accordingly, the network devices 30-50A-B, 305A-305B, 312, 314, 316, 318, etc. may use a collision-avoidance scheme with a backoff (delay) in collision situations. In some embodiments, the delay may be implemented as a time measure unrelated to the duration of a single timeslot. In other particularly useful embodiments, the backoff may be implemented as a delay measured in an integer number of timeslots. In particular, a device that has encountered a collision may back off by the duration of a single timeslot, two timeslots, etc. starting at the beginning of the next scheduled timeslot. By synchronizing backoff intervals with timeslots, devices may optimize the retry mechanism and ensure that retry attempts happen only when there is a possibility of transmission. Using shared links may be desirable when bandwidth requirements of devices are low, and/or traffic is irregular or comes in bursts. In some situations, using shared links may decrease latency because the network device does not need to wait for dedicated links, although this generally true only when chances of collisions are relatively low.

Forming Efficient Schedules and Routing Schemes

In addition to optimizing routing by analyzing the network topology, the network manager 27 may define graphs and allocate resources during scheduling also in view of the type of data that a particular network device may transmit and, for each type of data, the expected frequency of transmission at each particular device. More specifically, the WirelessHART protocol 70 may support several types of network communication traffic. Both the existing HART protocol 72 and the WirelessHART protocol 70 support exchanging request/response data, publishing of process data, sending broadcast messages, and block data transfer of large data files. The WirelessHART protocol 70 may also support transmission of management data, such as network configuration data, and device communications, such as periodic measurements reported by field devices, using the same protocol and the same pool of resources, thus allowing for greater efficiency in scheduling and routing.

The network manager may allocate communication resources to each network device according to the amount of data which the network device may publish per unit of time. For example, the WirelessHART flowmeter 30 in the WirelessHART network 14 may have an update rate of four seconds while the WirelessHART pressure sensor 32 may have an update rate of ten seconds. An operator may configure the network devices 30 and 32 with these values according to the specific needs of the process control system in which the WirelessHART network 14 is implemented. As indicated above, multiple superframes may be used to define a different communication schedule for various network devices or groups of network devices. Initially, the network manager 27 may reserve a particular superframe for all network manager requests. Upon accepting network devices such as the flowmeter 30 and the pressure sensor 32, the network manager 27 may allocate additional superframes for the communication rates of four and ten seconds and assign the additional superframes to the network devices 30 and 32. The network manager 27 may also define superframes for alarms and network events prior to or after adding the network devices 30 and 32 to the WirelessHART network 14, respectively. The network devices 30 and 32 may, but are not required to, participate in one or more superframes simultaneously. By configuring a certain network device to participate in multiple overlapping superframes of different sizes, it is possible to establish multiple communication schedules and connectivity matrices which may work concurrently without scheduling conflicts. Moreover, because some key applications such as asset management and device specific applications often require considerable bandwidth for short durations of time, the network manager 27 may also create additional temporary superframes as needed. For example, a user may issue a request to view or change the configuration of a device or create a diagnostic screen. The network manager 27 may support this temporary increase in demand for communication slots by defining additional superframes which may stay active for, by way of example only, several minutes.

The network manager 27 may consider both the update rates of the network devices and the topology of the WirelessHART network 27 when creating directed graphs. However, the network manager 27 may also carry out graph routing decisions separately from scheduling. For example, the network manager may add, delete, or update graphs while keeping the network schedule intact. More specifically, the network schedule may have available timeslots in the defined superframes which the network manager 27 may use as resources when defining new graphs or updating the existing graphs. In this sense, the WirelessHART protocol 70 allows graph configuration decisions to proceed separately from scheduling decisions. This feature of the WirelessHART protocol 70 can make the WirelessHART network 14 more responsive to changes in the environment and in the operational states of the network devices because the WirelessHART protocol 70 may quickly and non-intrusively adjust the routing by changing only part of the existing configuration.

It will be appreciated that some of the methods discussed above need not be restricted to data packets and may be applied to other communication techniques. For example, a network may use a circuit-switched approach and instead of traveling in packets of a finite size, the data may be transmitted as a stream over a dedicated channel between communication endpoints.

By way of a simplified example, FIGS. 13-20 and the accompanying description illustrate the formation of an efficient routing scheme and of a corresponding communication schedule applying the concepts discussed above to a four-node mesh network. In particular, FIG. 13 schematically illustrates a network 400, several direct wireless connections formed between nodes A, B, C, and D (or network devices 402-408) of the network 400, and the edges 410-420 of several directed graphs which may be formed in the network 400 in view of such as factors as network topology, signal strength and/or quality, latency requirements, etc. To further simplify this example, only upstream (i.e., device-to-gateway) data propagation is discussed in reference to FIGS. 13-20. For the sake of clarity, the network nodes are referred to below as nodes A-D whereas the devices corresponding to these nodes are referred to below as the gateway device 402 or the field devices 404-408. As further illustrated in FIG. 13, the nodes A-D may store, maintain, and update device-specific connection tables 422-428. Next, FIGS. 14-16 illustrate the formation of several superframes to support data exchange between the nodes A-D. Finally, FIGS. 17-20 illustrate example device-specific communication schedules 432-438 which may correspond to the nodes A-D of FIG. 13.

Referring specifically to FIG. 13, the wireless network 400 may include the gateway device 402 operating in the network 400 as the node A and connecting the wireless network 400 to an external network (not shown) or a standalone external device (not shown). Because of the typical traffic requirements, the gateway device may be a powered device, i.e., connected to a substantially unlimited power source via a power cable or wire. On the other hand, the nodes B-D may be battery-operated field devices. Of course, some or all of the nodes B-D may also be connected to power lines or other sources of energy in other embodiments. As also illustrated in FIG. 13, each of the field devices 404-408 may have a particular update rate at which the device sends data to another node such as the gateway device 402. For example, the field devices 404 and 406 may originate outbound data every second and the field device 408 may originate outbound data every four seconds.

In general, the nodes B-D may also correspond to any type of devices used for communication or equipped with communication capabilities. It is contemplated, for example, that the nodes B-D may be personal computers operating in a home network. However, because the routing and scheduling techniques therein are particularly useful in process control and in sensor mesh networks, the nodes B-D in this particular example are field devices operating in a process control environment and performing various sensing and measurement functions (e.g., temperature, pressure, flow, acidity, valve actuator position, etc.) or control functions (actuation, positioning, etc.). The field devices 404-408 may exchange the measurement and control data over any protocol supporting the routing and scheduling techniques discussed above in reference to FIGS. 3-12. In one embodiment, the protocol supporting these functions may be the WirelessHART protocol 70 illustrated in FIG. 12.

A network manager 440 may be a software module operating within the node A. Similar to the network manager 27 illustrated in FIG. 1 or the network manager 302A-302B illustrated in FIGS. 10-12, the network manger 440 may be responsible for making routing and scheduling decisions in the network 440. In particular, the network manager 440 may initially collect device and signaling information from each of the nodes B-D, as well as the information related to its own host node A, and define an initial network graph 421 for the network 400 in view of these factors. More specifically, each of the nodes A-D may report, for each of its potential neighbors, a received signal strength indication (RSSI) value specifying the energy of a signal. Alternatively, the nodes A-D may report the measured quality of the signal or any other measurement which may be used to assess relative signal quality. Additionally, each of the nodes A-D may report to the network 400 such parameters as power capability (e.g., battery-powered, power line-powered, etc.), projected or actual transmission requirements (e.g., measurement update every second, every four seconds, etc.; no regular automatic updates scheduled; updates only in response to a request; etc.) and other information regarding the operation of the field device in the network 400.

Upon collecting the device information from the nodes A-D, the network manager 440 may establish the topology of the network 400 by selecting direct wireless connections between pairs of neighboring devices to define one or more directed graphs between pairs of nodes A-D. In the particular example illustrated in FIG. 13, each of the directed graphs has node A as either a head or a tail. The network manager 440 may thereby enable the flow of data in the network upstream or downstream relative to the gateway device 402.

When defining direct wireless connections, the network devices 402-404 or, if desired, the network manager 440 may compare the strength or quality of a wireless signal, transmitted by one of the nodes A-D and measured by another one of the nodes A-D, to a threshold value to decide this signal is sufficient to support a direct wireless connection. In at least some embodiments, each of the network devices 402-404 autonomously determine with which of the other network devices 402-404 the network device may establish a direct connection to thereby consider the corresponding device its neighbor. To this end, each of the network devices 402-404 may execute the same routine for collecting and analyzing signal measurements. Referring to FIG. 13, for example, the network device 408 may determine that the signal emitted by a transceiver of the gateway device 402 cannot provide a sufficiently strong direct wireless connection between these devices or, in other words, between the nodes A and D. On the other hand, the network device 404 at the node B may measure the same signal from the node A to obtain a better (e.g., greater strength or higher quality) measurement due to the closer proximity of the device 404 to the device 402, fewer obstacles between the devices 402 and 404, or other factors. The network device 404 may accordingly determine that there is a potential direct wireless connection between the nodes A and B. Preferably but not necessarily, the network device 402 makes a similar determination and also decides that there is a potential direct wireless connection between the nodes A and B.

Next, each of the network devices 402-408 may report the collected measurements and the potential direct connections to the network manager 440. Alternatively, the network 400 may form iteratively so that node A initially forms a complete and operational single-node network, the nodes B and C then join the network 400 to form a complete and operational three-node network, and the node D finally joins the network 400 as a neighbor of the nodes B and C to form a complete and operational four-node network. In some cases, and particularly in large networks having numerous network devices, a certain node could establish direct connections with many potential neighbors. According to some embodiments, the network manager 400 may direct the network devices to disable some of these superfluous direct connections based on the relative quality of these direct connections, for example.

In the formed network 400 illustrated in FIG. 13, each of the nodes B and C may have a direct wireless connection to the node A (supporting the directed connections 410 and 412, respectively). In other words, each of the field devices 404 and 406 may be one hop away from the gateway device 402. Moreover, the nodes B and C may also share a direct wireless connection to support a directed B-to-C connection 414 and a directed C-to-B connection 416. Meanwhile, the node D may be connected to the node A only through the node B, node C, or both. The node D may thus be two (D to B to A) or three (D to B to C to A) hops away from the node A.

To arrive at the definition of directed connections 410-420 and further of the directed routing graphs of the network 400, the network manager 440 may consider several factors in addition to the set of available direct wireless connections between the neighboring network devices. In particular, the network manager 440 may attempt to define directed graphs from the nodes B-D and terminating in the node A by using the least possible number of hops. As a result, the directed graph from the node B to the node A includes a single directed connection 410. Similarly, the directed graph from the node C to the node A includes a single directed connection 412. A directed graph from the node D to the node A requires at least a single intermediate node B or C but may also include two intermediate nodes. Applying the hop-number minimization principle stated above, the network manager 440 may define a directed graph connecting D to A including a sequence of the connections 418 and 410, for example. It will be noted that a directed graph connecting A to D need not include the same intermediate hop B (as discussed in greater detail above in reference to FIGS. 10-12).

Further, the network manager 440 may prefer powered devices as intermediate nodes. If, for example, the node B were battery-powered while the node C had an unlimited source of power, the network manager 440 would define the graph from the node D to the node A via the node C if other factors were the same. However, in the example illustrated in FIG. 13, only the node A is coupled to an unlimited source of power.

In some embodiments, the network manager 440 may also compare the relative signal strengths of the available direct connections, as reported by the network devices, to choose between similar paths. Assuming for example that the node D reported a stronger signal from the node B than from the node C, the network manager 440 may prefer a directed path from the node D to the node A which includes the node B as an intermediate hop.

With continued reference to FIG. 13, the network 400 may thus include the following directed graph definitions for upstream (i.e., device-to-gateway) data propagation:

| Identifier | Source | Destination | Definition |
|---|---|---|---|
| $G_1$ | B | A | B->A |
| $G_2$ | C | A | C->A |
| $G_3$ | D | A | D->B->A |
| $G_4$ | D | A | D->C->A |

In accordance with the principles discussed above, each of the device-specific connection tables 422-428 may store a corresponding part of these graph definitions.

The network manager 440 may apply further principles to define efficient directed routing graphs for the network 400. In some embodiments, the network manager 440 may limit the number of hops in a graph to three or less. Of course, other limits are also possible. In some embodiments, the network manager 440 may also enforce a limit on the number of neighbors of a network device. If, for example, a network device could detect signals transmitted by ten neighboring devices, the network manager 440 may prune this number to allow the network device to establish direct connections with only three or four network devices, selected on the basis of the signal strength or some other principle.

Upon defining the directed graphs between some of the nodes A-D, the network manager 440 may proceed to define a network schedule based on the graph decisions made above. In this example, the network manager 440 may enforce the following additional limitations and/or principles: 1) limiting the number of concurrent active communication channels to 16; 2) not allowing any of the network devices 402-408 to listen twice within the same timeslot; 3) allowing more than one device to transmit to the same target device (e.g., allowing the broadcast links and dedicated links to coexist in the same network schedule; 4) scheduling early hops prior to later hops on multi-hop paths; and 5) supporting update rates that conform to the formula update rate=$2^x$, where x is a positive or a negative integer values (i.e., making the update rate selections of 1 sec., 2 sec., 4 sec., 8 sec., 16 sec., 32 sec., etc. possible).

It will be also noted that in the example discussed in reference to FIGS. 13-20, the network manager 440 is aware of the "raw" network topology (i.e., of all the measurements of signal from the potential neighbors reported from every network device), that each of the network devices 402-408 stores and maintains a connection table 422-428, and that the network manager 440 knows the data update rate of each of the network devices 402-408. As an additional requirement, the network 400 may implement a redundancy scheme whereby each transmission is configured with one retry on one path and one retry on another path. Of course, other update rates, routing restrictions, redundancy schemes, etc. are also possible, and it will be appreciated that the principles listed above are provided by way of example only.

In general, the network manager 440 may use the following strategy when defining superframes: 1) set the length of a superframe according to the data update rate of a device with which the superframe is associated; 2) allocate timeslots starting with the fastest update rate; 3) staring from a non-remote device most distant from the gateway 402, allocate one link for each intermediate network device in the path to the gateway 402; 4) schedule each transmission with a retry on the primary link and, whenever possible, schedule another retry on the redundant link; 5) schedule each network device to receive at most once in a timeslot; and 6) start with faster update rates when assigning timeslots.

In addition to device-specific superframes, the network manager 440 may define a network management superframe to propagate network management through the network 400 and receive service requests from the network devices 402-408. In particular, the network manager 440 may set the network management superframe length to be equal to the longest device superframe. In some embodiments, it may be desirable to further enforce a low management superframe length limit such as 600 timeslots, for example (i.e., one minute in a ten-millisecond timeslot embodiment). Further, the network manager 440 may reserve a set of timeslots for advertisement so that potential network devices wishing to join the network 400 may transmit join request messages during these advertisement timeslots. Next, the network manager 440 may traverse the network graph 421 according to the breath-first search starting from the gateway device 402 and number each encountered device $N_0, N_1, \ldots N_n$.

As illustrated in FIG. 14, the network manager 440 may define a 100-timeslot superframe 450 for the one-second update of the nodes B and C. It will be noted that, in this example embodiment, the network manager 440 creates a single superframe for two nodes having the same update rate. However, in other embodiments, each node may be associated with a separate superframe. To improve the reliability of transmissions, the superframe 450 may operate over several channels (as discussed with respect to FIG. 5, for example), illustrated as offsets 0-3 in column 452. Meanwhile, each of the columns 454 specifies a particular timeslot within the 100-slot superframe 450. Each cell in the table illustrating the superframe 450 accordingly specifies one or more talkers and one or more listeners for each offset/timeslot tuple.

With continued reference to FIG. 14, the network manager 440 may begin to assign timeslots for the directed graph terminating at the node A by starting with the node B because the node B has the fastest update rate of one second. (Of course, the node C in this example has the same update rate and is also located one hop away from the node A. In this and similar cases, the network manager 440 may apply any desired tie-braking technique to choose between the two or more equal candidates). Because the node B has a direct connection 410 to the node A as part of the directed graph $G_1$, the network manager 440 may allocate the timeslots T0 and T1 on the 0-offset channel to the node B for transmission of the periodic update data to the node A. In particular, the node B may use the timeslot T0 for the scheduled transmission of data and the timeslot T1 for a retry. FIG. 14 illustrates these channel-timeslot-directed connection assignments as dedicated links 460 and 462. In view of the discussion provided above, it will also be appreciated that the node B will view the dedicated links 460 and 462 as dedicated transmit links while the node A will view these links as dedicated receive links.

It will be appreciated that although the timeslots T0 and T1 are associated with the same channel in this particular example, the retry may also be allocated to a different channel (e.g., offset 1) to diversify channel usage. Alternatively, the network manager 440 may instruct each of the nodes A-B to perform channel hopping according to a predefined order and with respect to a network schedule that does not directly specify frequency hopping. For example, each of the nodes A-B may always shift the channel offset by one with each superframe cycle, thus ensuring that the relative order specified by the network schedule stays the same.

Next, the network manager 440 may allocate the timeslots TS3 and TS4 on the 1-offset channel to the directed connection 412 from the node C to the node A. Similar to the links 460 and 462, the dedicated links 464 and 466 may correspond to the same scheduled update in a redundant manner. Also, as part of diversifying channel usage, the links 464 and 466 in this example are allocated on a different channel than the links 460 and 462.

To continue with this example, the network manager 440 may then define a 400-timeslot superframe 470 for the four-second update of the node D. Because the superframes 450 and 470 may start at the same time, the timeslots TS0 and TS1 on the 0-offset channel may be considered occupied and therefore unavailable. Also, because the node D may transfer its update data to the node A via the node B along the graph G$_3$, the timeslots T0 and T1 may not be allocated to the directed connection 418 at all, irrespective of the channel offset. This limitation can be easily understood by observing that during the timeslots T0 and T1, the node B already engages in communications, i.e., transmitting data in the links 460 and 462. For this reason, the earliest timeslots that the network manager 440 may allocate to the directed connection 418 are TS2 and TS3. Of course, the 1-offset channel is already occupied in the timeslots TS2 and TS3 by the communicating nodes A and C, and the directed connection 418 may therefore reserve the still-available channel with the offset 0 (links 472 and 474 in FIG. 14).

As the next step, the network manager 440 may schedule the directed connection 420 associated with the secondary path from the node D to the node A (illustrated above as graph G$_4$). The dedicated link 476 may accordingly receive the assignment of the timeslot TS4 on the 0-offset channel. In the same timeslot TS4, the link 478 associated with the directed connection 410 may reserve the adjacent channel (offset 1). It will be noted that the node B may use the link 478 to forward the data to the node A which the node B received in the timeslot TS2 or TS3 from the node D. In other words, the link 478 may be associated with the graph G3. Applying similar principles, the network manager 440 may then define the links 480-484 also illustrated in FIG. 14.

Now referring to FIG. 15, the network manager 440 may also define a 400-timeslot management superframe 500 in accordance with the length of the longest data superframe 470. Unlike the superframes 450 and 470, the management superframe 500 may include several shared links 502-508 reserved for advertisement, several dedicated links 510-516 reserved for propagating join requests to the network manager 440 residing at the node A, and several dedicated links 520-526 reserved for propagating join responses from the network manager 440 residing at the node A to the end nodes B-D of the network 400.

Specifically with respect to the shared links 502-508, it will be noted that each of the nodes A-D expects to receive data from any potential devices via these shared links except from one of the existing nodes of the network 400. Thus, in at least some of the embodiments, the links 502-508 provide an opportunity for the external devices to submit requests to join the network 400 and to eventually become new network nodes. Meanwhile, the links 510-516 service the respective paths for delivering these requests from the end nodes B-D to the node A.

FIG. 16 illustrates other links which the network manager 440 may reserve in the management superframe 500. More specifically, the links 530-536 may transfer command data from the nodes B-D to the network manager 440 at the node A. The links 540-546 may accordingly support the transfer of command responses in the opposite (i.e., downstream) direction with respect to the node A.

Additionally, the network manager 440 may assign unique superframe identifiers to each of the superframes 450, 470, and 500. To simplify maintenance work, debugging, and visual presentation, the network manager 440 may assign the identifier '0' to the management superframe, the identifier '1' to the one-second superframe, and the identifier '4' to the four-second superframe. In this manner, the frame identifier may conveniently convey at least some information about the frame to the engineer or operator.

Generally with respect to the superframes 450, 470, and 500, it will be appreciated that the particular manner in which the network manager 440 assigns timeslots within these superframes prevents overlap conflicts in the frame cycles following the first cycle. In particular, the superframe 450 goes through four frame cycles during a single cycle of the superframe 470 or the superframe 500. Therefore, if all superframes initially start at the same time, the timeslot TS0 of the superframe 450 will coincide with the timeslots TS0, TS100, TS200, and TS300 of the superframes 450 and 500. The method of allocating timeslots described above may ensure a conflict-free superposition of multiple superframes such as 400, 450, and 500 by making the participating network devices conform to the $2^x$ update rate which provides for optimal divisibility of the superframe lengths. In the more general case, the length of superframes should follow a harmonic chain, i.e., all periods should divide into each other. Examples of harmonic chains are 1, 2, 4, 8, 16, . . . and 3, 6, 9, 12, 24, . . . and as well as any other period that conforms to the expression $ab^n$.

Thus, in the manner described above, the network manager 440 may generate several directed graphs G$_1$-G$_4$ to efficiently route data in the network 400, define several data superframes 450 and 470 for data updates, define at least one management superframe 500 for propagating advertisement information, join requests and responses, commands and command responses, and other types of network management data, and subsequently schedule dedicated, shared, and possibly other types of links based on the directed graphs G$_1$-G$_4$ and on the schedules superframes 450, 470, and 500. It will be appreciated that the allocation of timeslots illustrated above minimizes the amount of time a transient data packet spends between the arrival at an intermediate node and departure for the next node in the communication path. For example, a packet leaving the node D in the direction of the node A via the node B in the timeslot TS2 may travel from the node B to the node A as early as in the timeslot TS4.

To enable the operation of every node A-D in accordance with these definitions, the network manager 440 may then distribute the graph and scheduling definitions to each node A-D. FIGS. 17-20 illustrate several example device-specific schedules 432-438 (see FIG. 13) consistent with the definitions illustrated in FIGS. 14-16.

Referring to FIG. 17, the node A device-specific schedule 432 may specify, for each entry, a frame identifier 602, a time slot number 604, a channel offset 606, a peer device identifier 608, link options 610, and a link type 612. In other embodiments, the schedule 432 may include alternative or additional information such as, for example, a MAC address of a neighboring device. In this particular example, each line of the schedule 432 may specifically indicate which action, if any, the device 402 performs in a particular timeslot. To simplify readability, FIG. 17 lists the entries of the schedule 432 in the ascending order of timeslots. However, each of the nodes A-D can store the corresponding schedule in any suitable manner, e.g., an array, a linked list, a binary tree, etc.

Referring by way of example to the entry 620 of the schedule 432, the node A may know that in the timeslot TS4, the node A must switch its transceiver to the receive mode, tune to the channel with the offset 1, and expect to receive data from the node B via a normal, dedicated link. Moreover, the node A may know that this transmission is associated with the superframe 4 (i.e., the 400-slot superframe). To take another example, the entry 626 may correspond to the timeslot 8 and may specify the association with the management superframe. Because the node A is scheduled to receive join requests from candidate network devices, the node A may not know the sender of the data (marked by an asterisk).

It will be noted that the example schedule 432 only illustrates the allocation of timeslots 0-21. However, the superframes 450 may have timeslots TS0, TS1, ... TS99 and the superframes 470 and 500 may have timeslots TS0, TS1, ... TS399. Although FIGS. 17-20 do not illustrate each of the unassigned timeslots, it will be appreciated that node A, to take one example, neither receives nor transmits data for the duration of timeslots TS22 through TS99 of the shorter superframe 450.

FIGS. 18-20 illustrate the respective device-specific schedules 434, 436, and 438. As can be seen from these illustrations, each of the schedules 432-438 specifies only the scheduling information relevant to a particular node A-D. Similarly, each of the connection tables 422-428 may store relatively little information which may nevertheless specify all routing actions relevant to the corresponding device. Thus, the node B need not know the routing or scheduling information at the node C, to take one example. This approach may significantly reduce the amount of management traffic transported over the network because the network manager 440 does not need to share the entire formed topology or the complete network schedule with every device. Moreover, the network 400 may become more secure because none of the nodes A-D may know where or when the rest of the network 400 transfers information (with a possible exception of the node A which may, at least in this example, host the network manager 440). While the description of the scheduling and routing performed in the wireless networks described herein are described in detail, for the sake of simplicity, for a four node wireless network, the principles described herein are applicable to any size of network, having any number of nodes, graphs, etc. Likewise, the graphs may be of any desired or needed size or length.

Priority-Based Scheduling and Routing

Referring back to FIG. 2, the data link layer 76 may specify one of several levels of priority for each data packet data link protocol data unit (DLPDU), also referred to herein as a data packet. To continue with the example illustrated in FIG. 13, each network device 402-408 may assign an appropriate priority to some or all originated data packets to further improve the reliability and latency characteristics of the wireless network 400. In particular, the network devices 402-408 may select links, hops, or graphs for forwarding the data packet based, in part, on the priority of the data packet. Moreover, the network manager 440 may dynamically adjust the priority settings of links, hops, or graphs to adjust to respond to network congestion, an emergency conditions, or another the changing condition in the wireless network 400. To further illustrate priority-based scheduling and routing which some or all of the wireless networks 14, 300, or 400 may use to increase reliability and decrease latency in packet delivery, FIG. 21 includes a diagram of assigning data packets in a transmit queue of a network device to available communication links. Additionally, FIG. 21 illustrates receiving data packets in the communication links and selectively accepting the received data packets into a receive queue. Further, FIGS. 22-24 illustrate some of the example procedures which the network devices 402-408 may execute when processing outgoing and incoming data packets at the data link layer.

Referring specifically to FIG. 21, a network device operating in the network 14, 300, or 400 (e.g., the network device 32, the network device 404, etc.) may support a transmit queue 700 storing candidate outgoing data packets 702-708. The transmit queue 700 may be associated with the data link layer 76 of the wireless protocol 70 and the network device may assign priorities to data packets at the network link layer 78. Of course, it is also possible to associate data packet priority with another layer of the protocol stack. A receive queue 710 may store incoming data packets 710-718 for sequential processing by the network link layer 78. Each of the data packets 702-708 and 712-718 may include a header or a trailer including a destination field 730 and a priority field 732, as illustrated in an enlarged view of the data packet 702. The values stored in these two fields may determine, at least in part, the selection of a communication link for transmitting the data packets 702-708 to one or several neighbor network devices. Further, the destination field 730 and a priority field 732 may determine whether an incoming packet 712-718 should be processed or rejected at the network device associated with the receive queue 710.

A network manager (not shown) may define a device-specific link map 720 and a global ASN counter 722 to track timeslots with absolute slot numbers 724. As discussed above, dedicated or shared links may occur in the timeslots of one or more overlapping concurrent superframes, and a network device of the wireless network 14, 300, or 400 may use the value of ASN counter 722 to determine the relative slot numbers in the one or more relevant superframes to thereby identify the links available for reception and/or transmission in the immediate future. The link map 720 may include link entries 740-744, each including a link descriptor 750.

It will be appreciated that the network devices in the wireless networks 14, 300, or 400 need not store the link map 720 as a separate data structure. Referring back to FIGS. 17-20, the device schedules 432-438 may specify at least several parameters of the link descriptor 750. In particular, each link schedule 432-438 may specify the frame identity 602, the relative timeslot 604, etc. In this sense, the link map 720 may be considered a derivation from one of the schedules 432-438 which a network device may use to efficiently identify upcoming links for transmission or reception. The link map 720 may conveniently align the device schedule 432-438 with a timeline measured in ASN values and maintain an indication of a current position in time with respect to the device schedule 432-438.

In one particularly useful embodiment, the priority field 732 may store one of four priority levels listed in the table below in the descending order of priority:

| |
|---|
| Command (Highest priority) |
| Process Data |
| Normal |
| Alarm (Lowest priority) |

The command priority may be used to send data related to network diagnostics, configuration, or control information. The process data priority may be used for process data (e.g., data HART command 3 or 9). In this embodiment, only network maintenance may be more important than delivery of measurements from process transmitters to control devices, for example. Meanwhile, the alarm priority may be used for alarm and event data. Because this data is typically processed in post-time by data historians and/or human operators, the priority of alarm data may be the lowest. Moreover, alarms and events typically carry timestamps which make late delivery of the corresponding data packets more acceptable. Finally, network devices may assign normal priority to all other data. Other priorities may be used as well.

With continued reference to FIG. 21, the transmit queue 700 and the receive queue 710 may be buffers with a finite amount of memory. In an embodiment, network devices buffer a limited amount of low-priority data. For example, a network device may store at most one DPLDU of alarm priority. At the same time, the network device may store a greater number of data packets having a higher priority. It will be also appreciated that network device may implement any suitable algorithm for resolving buffer overflow issues if the buffer contains data packets having different priorities. For example, command priority data may always displace normal priority data in cases of memory shortage but may displace a limited amount of process data. Moreover, because a single DLPDU may contain multiple commands, the DLPDU may assume the priority of the highest-priority command in the DLPDU. Thus, if a data packet includes a command priority message and a normal priority message, the aggregate priority of the data packet may be on the level of a command.

The values stored in the priority field 732 and in the destination field 730 may affect the scheduling of the corresponding data packets in transmit links. For example, the packet 704 may be scheduled for transmission ahead of the data packet 702 even if both packets 702 and 704 share the same next hop. The data packet 702 may have normal priority while the data packet 704 may have process data priority, and the data link 76 may effectively re-order the packets 702 and 704 in the transmit queue 700. Meanwhile, an insufficiently high priority of an incoming data packet may prevent the packet from entering the receive queue 710. As illustrated in FIG. 21, the data layer 76 may compare the priority of each incoming data packet to a priority mask 760 and, if the priority mask does not include the priority of the data packet, the data layer 76 may reject the data packet and preferably originate a negative acknowledgment (see FIG. 3) with an informative error code within the same link 744.

As the name suggests, the priority mask 760 may specify one or several priorities which the network device accepts at the data link 76. For example, the priority mask 760 may include command and process data priorities but exclude the normal and alarm priorities. In other embodiments, the priority mask 760 may include additional information such as conditional exclusion of certain priorities depending on an amount of available buffer space, the availability of links for forwarding low-priority data, etc.

Now referring to FIG. 22, a network device in the wireless network 14, 300, or 400 may execute a procedure 780 to process a data packet 702-708. In a block 782, the procedure 780 may check whether the transmit queue 700 includes one or more packets queued for transmission. For example, the data link layer 76 may periodically poll a dedicated buffer for data supplied from the network layer 78. For each packet 702-708 present in the transmit queue 702, the procedure 780 may check the destination field 730 to identify whether the data packet travels to a specified neighbor device, along a specified graph, along a specified broadcast superframe, or along a proxy route. Of course, these four destination types are provided by way of example only and other embodiments of the procedure 780 and/or of the wireless protocol 70 may specify more or fewer destination types. As used herein, the neighbor destination type may correspond to data packets traveling to a neighbor explicitly specified by the network layer 78. Because the network layer 78 may specify only a nickname of the neighbor, the procedure 780 may retrieve a complete neighbor identify in a block 786. In some cases, the procedure 780 may skip the block 786 if the identity information is already sufficient.

In many cases, the network layer 78 may specify only a graph identity (see FIGS. 10 and 11) and the procedure 780 may get a list of one or more neighbors associated with the specified graph (block 788). If, on the other hand, the destination field 730 specifies a broadcast data packet, the procedure 780 may retrieve a list of links associated with a broadcast superframe specified by the network layer 78 (block 790). In a block 792, the procedure 780 may identify all links of type join if the destination field 730 specifies a proxy route. A non-network device joining the wireless network 14, 300, or 400 may receive data packets via a link of type join because a joining device may not yet be aware of or allowed to use links within other superframes.

In a block 794, the procedure 780 may identify all links potentially suitable for transmitting the data packet. The procedure 780 may then (block 796) use the ASN counter 722 to identify the upcoming timeslots which correspond to the links identified in the block 794. For example, the procedure 780 may check the link map 720 for all links connecting the network device to the neighbor identified in the block 786 and locate the timeslots proximate in time. As illustrated in FIG. 22, the procedure may iterate through the blocks 782-796 several times if multiple data packets are queued in the transmit queue 700. Next (block 798), the procedure 780 may check whether more than one data packet have been processed in the blocks 784-796 and, if multiple candidate packets may be scheduled for the same timeslot (in absolute slot number terms), the procedure 780 may apply a tie-breaker logic in a block 800 prior to transmitting the selected data packet in a block 802.

FIG. 23 illustrates the tie-breaker logic of the block 800 in more detail. In a block 804, the procedure 780 may select a data packet having the highest priority. If the priorities of at least two candidate data packets are the same, the procedure 780 may check which neighbor to which at least one of the candidate data packets may travel has been silent for the longest time (block 806). In this manner, the procedure 780 may attempt to more equally distribute the traffic among the neighbor devices. In a block 808, the procedure 780 may check whether any of the candidate packets are keep-alive messages and select the link corresponding to a neighbor which has been silent longer than the other neighbors. Finally, the procedure 780 may check whether an advertise timer has lapsed and generate an advertisement packet if necessary (block 810).

When placing incoming data packets 712-718 into the receive queue 710, the data link layer 76 may execute a procedure 840 illustrated in FIG. 24. In a block 842, the procedure 840 may receive a data packet from the physical layer 74. In this particular embodiment, the procedure 840 may check for one of several message types in a block 844 prior to checking DLPDU priority in a block 846. In particular, the procedure 840 may unconditionally process the data packet in a block 848 (i.e., verify message contents, generate an acknowledgement, etc.) if the message included in the DLPDU is one of a keep-alive, an advertisement, or a disconnect. Because of the importance of these messages to the overall health of the wireless network 14, 300, or 400, the procedure 840 may not apply the priority mask 760 in these cases. Moreover, at least some of keep-alive, advertisement, and disconnect messages may be associated with the data link layer 76 and the procedure 840 need not propagate the received message through the protocol stack up to the network layer 78.

As illustrated in FIG. 24, the procedure 840 may identify the data packet as having one of the several priority types discussed above. In this example embodiment, the procedure 840 may always process messages of command priority in a block 850. If the message is of an alarm priority, the procedure 840 may check whether the one or more buffers of the receive queue 710 can accommodate the received data packet (block 852). In an embodiment, the receive queue 710 may reserve enough memory for only one data packet of alarm priority. For other priority levels, the procedure 840 may apply the priority mask 760 at a block 854 to see whether the network device accepts the data packets of this particular priority. Of course, the procedure 840 of other embodiments may also apply the priority mask 760 to data packets of alarm priority and/or to the keep-alive, advertise, and disconnect messages. In a block 856, the procedure 840 may discard the DLPDU filtered out by the priority mask 760.

It will be appreciated that the network manager 27, 302A-B, or 440 may dynamically adjust the priority mask 760 at one or more network devices 25A-B, 30-50A-B, 302-312, or 402-408 to thereby control the flow of data in the corresponding wireless network. For example, the network manager 27, 302A-B, or 440 may detect general network congestion and may temporarily suspend the transfer of alarm and event data to propagate the more critical information. In some cases, the network manager 27, 302A-B, or 440 may detect a localized congestion and update the priority mask 760 in several network devices to exclude data associated with one or more priorities. Alternatively, a network device 25A-B, 30-50A-B, 302-312, or 402-480 may independently control the priority mask 760. In yet another embodiment, a network device 25A-B, 30-50A-B, 302-312, or 402-408 may negotiate the update of the priority mask 760 with the corresponding network manager.

In one aspect, the network manager 27, 302A-B, or 440 may raise the priority threshold to improve the delivery time of high-priority data packets. Because an updated priority mask 760 may reduce a number of data packets in the transmit queue 700, the receive queue 710, or both, the processing time of each of the data packets in these queues may decrease. Preferably, the network manager 27 restores the original value of each updated priority mask 760 upon cancellation of the temporary condition which triggered the update.

In an alternative embodiment, each network device 25A-B, 30-50A-B, 302-312, or 402-408 may store the priority mask 760 for each neighbor device. Accordingly, in response to receiving a command from the corresponding network manager to update the priority mask 760, the network device 25A-B, 30-50 A-B, 302-312, or 402-408 may inform each of its neighbors of the update to keep the priority information accurate. In these embodiments, a network device may further reduce the amount of traffic propagated in the network by checking whether the neighbor device will accept a data packet of a certain priority prior to sending the data packet.

In yet another embodiment, the wireless network 14, 300, or 400 may associate priority masks 760 with individual links rather than with the network devices 25A-B, 30-50 A-B, 302-312, or 402-408. For example, the network 400 (see FIG. 13) may have several links directed from network device 404 to the network device 406. In some sense, the link type 612 of a certain link (see FIGS. 17-21) effectively limits the data packets which can travel over the link to certain priorities. However, because a broadcast link may be used for network management commands and for less important messages, the link type attribute may not always properly limit the transported data to a certain priority. For this reason, a priority masks 760 may specify the priority of a link so that the network manager 27, 302A-B, or 440 may control the flow of data in a manner similar to network-based priority updates discussed above.

In a still further embodiment, the network manager 27, 302A-B, or 440 may define graphs associated with a particular priority. For example, a certain directed graph connecting devices 402 and 408 may be a command-priority graph while another graph supporting the same pair of devices and providing the same direction of communication may be an alarm-priority graph. Moreover, these two graphs may include different network nodes so that data having different priorities travels via different routes to the same destination.

In several possible embodiments, a network device may issue a certain management command to a network device to specify the join priority which the advertisement messages from the network device should include. In general, join priority may indicate the ability of the advertising device to support child devices. In one such embodiment, a joining device may prefer an advertisement packet specifying a lower priority when other factors are the same or similar. In this manner, the wireless network 14, 300, or 400 may dynamically manage the network expansion by directing, via the join priority of each advertising device, to which potential neighbors the joining devices should attempt to connect. Further, each network device 25A-B, 30-50A-B, 302-312, or 402-408 may be provisioned with a default join priority via a maintenance port, for example.

In some embodiments, a network device may refuse data packets having a certain priority if a certain percentage of the data buffers of the network device are occupied. For example, the network device may refuse all packets of a normal or lower priority when the buffers are 50% occupied. It will be noted, however, that a rejected data packet does not necessarily fail to reach the destination node. In particular, the network device at the preceding hop may attempt to re-transmit the packet via an alternate route which may have a sufficiently priority to accept the packet. In this manner, network manager 27 may control the data flow in the wireless network 14.

It will be further noted that in some embodiments, a single data packet may carry multiple messages, with two or more of these message having different priorities on the data link level. The entire DLPDU may assume the priority of the message having the highest priority.

From the foregoing, it will be appreciated that by updating a priority mask 760 at a certain network device, the network manager 27, 203A-B or 440 may effectively update network routing in addition to scheduling because a data packet may be indirectly forced around the network node having an elevated priority threshold setting (i.e., a priority mask 760 excluded more priorities). Thus, the wireless network 14, 300, or 400 may use the priority mask 760 for partially or completely disabling certain communication paths.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method of routing data in a mesh communication network including a plurality of network devices and operating in a process control environment, the method comprising:
   assigning one of a plurality of priority levels associated with the communication network to a data packet;
   sending the data packet from a source network device included in the plurality of network devices to a destination network device included in the plurality of network devices; and
   routing the data packet to a destination network device via at least one intermediate network device included in the plurality of network devices, including:
   comparing, at each at least one intermediate network device upon reception of the data packet at the each at least one intermediate network device, the priority level of the data packet to a priority mask of the each at least one intermediate network device, wherein the priority mask indicates one or more priorities of data packets that are accepted at the each at least one intermediate network device,
   accepting the data packet at the each at least one intermediate network device if the comparison of the priority level of the data packet to the priority mask indicates that the priority level of the data packet is accepted at the each at least one intermediate network device, and
   modifying at least one of scheduling or routing of the data packet if the comparison of the priority level of the data packet to the priority mask indicates that the priority level of the data packet is not accepted at the each at least one intermediate network device.

2. The method of claim 1, wherein modifying at least one of scheduling or routing of the data packet includes rejecting the data packet at the each at least one intermediate network device to trigger re-routing of the data packet to the destination network device via another intermediate network device.

3. The method of claim 1, wherein modifying at least one of scheduling or routing of the data packet includes delaying the transmission of the data packet.

4. The method of claim 1, further comprising:
   adjusting the priority mask in response to detecting a change in a network condition.

5. The method of claim 4, wherein detecting the change in the network condition includes detecting a network congestion;
   wherein modifying the at least one of scheduling or routing of the data packet includes rejecting the data packet; and
   wherein adjusting the priority mask includes adjusting the priority mask to indicate that data packets of at least one priority level are not accepted at the each at least one intermediate network device.

6. The method of claim 1, wherein modifying at least one of scheduling or routing of the data packet includes rejecting the data packet, and the method further comprises:
   adjusting the priority mask of at least one of the priority of network devices to improve performance of the communication network, including:
   collecting statistical data indicative of a latency of delivering data packets; and
   modifying the priority mask of the each at least one intermediate network device to thereby cause another network device to route data around the each at least one intermediate network device.

7. The method of claim 1, wherein the mesh communication network is a wireless network, the method further comprising:
   transmitting a first advertisement packet from a first one of the plurality of network devices, including specifying a first join priority of the first one of the plurality of network devices;
   transmitting a second advertisement packet from a second one of the plurality of network devices, including specifying a second join priority of the first one of the plurality of network devices;
   receiving the first advertisement packet and the second advertisement packet at a joining device not included in the plurality of network devices; and
   selecting, at the joining device, a neighbor device between the first one of the plurality of network devices and the second one of the plurality of network devices, including:
   comparing the first join priority to the second join priority;
   wherein the neighbor device shares a direct wireless connection with the joining device.

8. The method of claim 1, wherein sending the data packet from a source network device includes including a plurality of messages in the data packet, wherein at least two of the plurality of messages have distinct priority levels; and
   wherein comparing the priority level of the data packet to the priority mask of the each at least one intermediate network device includes:
   associating an aggregate priority level with a highest priority level among the plurality of messages; and
   comparing the aggregate priority level to the priority mask of the each at least one intermediate network device.

9. A method of routing data in a wireless mesh communication network including a plurality of network devices and operating in a process control environment, the method comprising:
   assigning a priority level of a plurality of priority levels associated with the communication network to a data packet;
   sending the data packet from a source network device included in the plurality of network devices to a destination network device included in the plurality of network devices; and
   routing the data packet to a destination network device from the source network device to the destination network device, including:

selecting, at a network device associated with the communication path, a particular communication link of a set of communication links to another network device included in at least one communication path to the destination network device in view of the priority level of the data packet, including:
  identifying a set of neighbor devices included in the plurality of network devices, the set of neighbor devices including the another network device, each neighbor device included in the set of neighbor devices having a direct wireless connection to the source network device, and the each neighbor device included in at least one communication path to the destination network device;
  comparing the priority level of the data packet to a priority mask of the each neighbor device included in the set of neighbor devices; and
  excluding, from the set of neighbor devices, each neighbor device whose priority mask does not indicate that the priority level of the data packet is accepted at the each neighbor device.

10. The method of claim 9, wherein selecting the communication link further includes:
  identifying the set of communication links, wherein each communication link of the set of communication links specifies a direct wireless connection to a neighbor device included in the plurality of network devices;
  comparing the priority level of the data packet to a priority mask corresponding to the each communication link; and
  excluding, from the set of communication links, each communication link whose corresponding priority mask does not indicate that the priority level of the data packet is accepted for travel thereon.

11. The method of claim 10, wherein the each communication link in the set of communication links is associated with a communication timeslot of a certain duration, a radio frequency, and a respective priority mask.

12. The method of claim 9, further comprising:
  adjusting a priority mask corresponding to at least one of a specific network device or a specific communication link in response to detecting a change in a network condition.

13. The method of claim 9, the method further comprising:
  defining at least one directed routing graph, including, for each directed routing graph included in the at least one directed routing graph:
  associating a communication path of the each directed routing graph with a plurality of direct wireless connections between pairs of the plurality of nodes; and
  associating a respective one of the plurality of network devices with a respective source of the each directed routing graph; and
  associating a different respective one of the plurality of network devices with a destination of the each directed routing graph, wherein data travels only in a direction from the source of the each directed routing graph to the destination of the each directed routing graph, wherein:
  routing the data packet further includes routing the data packet via a particular direct routing graph; and
  the source network device is the source of the particular directed routing graph and the destination network device is the destination of the particular directed routing graph.

14. A method of routing data in a mesh communication network including a plurality of network devices and operating in a process control environment, the method comprising:
  defining a communication timeslot of a certain duration;
  defining at least one superframe having a plurality of the communication timeslots;
  associating a data packet with one a plurality of priority levels; and
  routing the data packet at a first one of the plurality of network devices, including:
    selecting a communication timeslot within a particular superframe for communicating with another one of the plurality of network devices,
      the selecting based on the priority level of the data packet, a priority of a communication link including the communication timeslot, and a priority mask,
      the priority mask specifying the priority of the communication link, and
      the communication link defining a connection between the first one of the plurality of network devices and the another one of the plurality of network devices,
      wherein the priority mask indicates one or more priorities of data packets that are accepted by the another one of the plurality of network devices and that are accepted for travel over the communication link; and
    transmitting the data packet over the communication link in the selected communication timeslot.

15. The method of claim 14, further comprising, for the at least one superframe:
  associating a first one of the plurality of communication timeslots with a first communication link connecting the first one of the plurality of network devices to a second one of the plurality of network devices and associated with a first link-specific priority mask; and
  associating a second one of the plurality of communication timeslots with a second communication link connecting the first one of the plurality of network devices to a third one of the plurality of network devices and associated with a second link-specific priority mask.

16. The method of claim 15, wherein each of the second one of the plurality of network devices and the third one of the plurality of network devices is associated with a respective one of a plurality of directed graphs for routing data to a destination of the data packet; and wherein selecting a communication timeslot within the particular superframe includes selecting between the second one of the plurality of network devices and the third one of the plurality of network devices.

17. A method of routing data in a mesh communication network including a plurality of nodes and operating in a process control environment, the method comprising:
  establishing a plurality of direct connections, wherein each of the plurality of direct connections is a unidirectional wireless connection having a transmitting node and a receiving node, wherein each of the transmitting node and the receiving node are included in the plurality of nodes;
  generating a plurality of directed graphs defining communication paths between pairs of nodes based on a topology of the wireless network, wherein each directed graph includes at least one of the plurality of direct connections;
  defining a plurality of concurrent superframes as repeating cycles of consecutively scheduled communication timeslots of a certain duration;
  defining a plurality of links to generate a communication schedule of the wireless mesh network, including:

associating each of the plurality of links with one of the plurality of direct connections associated with at least one of the plurality of directed graphs; and allocating an individual timeslot associated with one of the plurality of superframes to each primary link; and routing a data packet from a first one to a second one of a pair of the plurality of nodes along at least one of the plurality of directed graphs, including:

selecting, at the first one of the pair of the plurality of nodes, one of the plurality of links in view of a priority level of the data packet and a priority mask, including:

identifying a set of neighbor nodes included in the plurality of nodes, each neighbor node included in the set of neighbor nodes having a direct connection to the first one of the pair of the plurality of nodes, and the each neighbor node included in at least one communication path to the second one of the pair of the plurality of nodes;

comparing the priority level of the data packet to a priority mask of the each neighbor node included in the set of neighbor nodes; and excluding, from the set of neighbor nodes, each neighbor node whose priority mask does not indicate that the priority level of the data packet is accepted at the each neighbor node.

18. The method of claim 17, wherein selecting the one of the plurality of links further includes:

selecting a set of candidate links from the plurality of links, wherein each one in the set of candidate links is associated with at least one of the plurality of directed graphs including the second one of the plurality of nodes and is associated with a priority mask indicating the priority level of the data packet is accepted at the second one of the pair of the plurality of nodes; and selecting a link from the set of candidate links, wherein the selected link is most proximate in time.

19. The method of claim 17, wherein selecting the one of the plurality of links further includes comparing the priority level of the data packet to a priority filter, wherein the priority filter corresponds to each of the plurality of nodes associated with each of the plurality of links.

20. The method of claim 17, wherein selecting the one of the plurality of links further includes comparing the priority level of the data packet to a priority mask that indicates a priority of the one of the plurality of links.

21. The method of claim 17, wherein selecting the one of the plurality of links further includes comparing the priority of the data packet to a priority of each one of the plurality of graphs including the first one and the second one of the pair of the plurality of nodes.

* * * * *